(12) United States Patent  
Shaw

(10) Patent No.: US 9,187,174 B2  
(45) Date of Patent: Nov. 17, 2015

(54) AIRCRAFT WITH WINGS AND MOVABLE PROPELLERS

(76) Inventor: Donald Orval Shaw, El Segundo, CA (US)

( * ) Notice: Subject to any disclaimer, the term of this patent is extended or adjusted under 35 U.S.C. 154(b) by 382 days.

(21) Appl. No.: 13/267,883

(22) Filed: Oct. 6, 2011

(65) Prior Publication Data

US 2012/0261523 A1    Oct. 18, 2012

Related U.S. Application Data

(60) Provisional application No. 61/390,611, filed on Oct. 6, 2010.

(51) Int. Cl.
*B64C 27/22* (2006.01)
*B64C 29/00* (2006.01)
*B64C 27/28* (2006.01)

(52) U.S. Cl.
CPC .............. *B64C 29/0033* (2013.01); *B64C 27/28* (2013.01)

(58) Field of Classification Search
CPC .... B64C 29/0033; B64C 27/20; B64C 27/26; B64C 27/28; B64C 27/24; B64C 29/02; B64C 29/0075
USPC ... 244/7 A–7 C, 7 R, 17.23, 23 A, 23 B, 12.4
See application file for complete search history.

(56) References Cited

U.S. PATENT DOCUMENTS

| | | | | |
|---|---|---|---|---|
| 2,651,480 A * | 9/1953 | Pullin | ........................ | 244/17.23 |
| 3,107,882 A * | 10/1963 | Matteson et al. | ............. | 244/7 C |
| 3,181,810 A * | 5/1965 | Olson | ........................... | 244/7 R |
| 3,591,109 A * | 7/1971 | McLarty | ..................... | 244/17.23 |
| 3,666,209 A * | 5/1972 | Taylor | ........................... | 244/7 C |
| 5,054,716 A * | 10/1991 | Wilson | ........................... | 244/56 |
| 5,085,315 A * | 2/1992 | Sambell | ......................... | 244/7 R |
| 5,096,140 A * | 3/1992 | Dornier | ......................... | 244/7 C |
| 5,839,691 A * | 11/1998 | Lariviere | ...................... | 244/7 R |
| 6,030,177 A * | 2/2000 | Hager | ............................ | 416/87 |
| 6,260,793 B1 * | 7/2001 | Balayn et al. | ................. | 244/7 R |
| 6,607,161 B1 * | 8/2003 | Krysinski et al. | ............. | 244/7 A |
| 6,655,631 B2 * | 12/2003 | Austen-Brown | ............. | 244/12.4 |
| 6,719,244 B1 * | 4/2004 | Gress | ............................ | 244/7 R |
| 6,808,140 B2 * | 10/2004 | Moller | ......................... | 244/12.5 |
| 7,143,973 B2 * | 12/2006 | Ballew | .............................. | 244/6 |
| 7,150,429 B2 * | 12/2006 | Kusic | ........................ | 244/17.23 |
| 7,472,863 B2 * | 1/2009 | Pak | .............................. | 244/12.5 |
| 7,753,310 B2 * | 7/2010 | Kusic | ........................ | 244/17.25 |
| 7,857,254 B2 * | 12/2010 | Parks | ........................... | 244/12.4 |
| 7,861,967 B2 * | 1/2011 | Karem | ......................... | 244/12.4 |
| 7,871,033 B2 * | 1/2011 | Karem et al. | ................. | 244/7 A |
| 8,083,172 B2 * | 12/2011 | Karem | ........................... | 244/7 C |
| 8,091,825 B2 * | 1/2012 | Kusic | ............................ | 244/56 |
| 8,240,601 B2 * | 8/2012 | Rampal et al. | ................. | 244/54 |
| 8,308,522 B2 * | 11/2012 | Van de Rostyne et al. | ..... | 446/37 |
| 8,342,441 B2 * | 1/2013 | Yoeli | ........................... | 244/12.4 |
| 8,376,264 B1 * | 2/2013 | Hong et al. | .................. | 244/7 A |
| 2002/0060268 A1 * | 5/2002 | Smith et al. | ..................... | 244/54 |
| 2003/0080242 A1 * | 5/2003 | Kawai | ........................... | 244/12.4 |
| 2003/0094537 A1 * | 5/2003 | Austen-Brown | ............. | 244/7 R |

(Continued)

*Primary Examiner* — Tien Dinh
*Assistant Examiner* — Assres H Woldemaryam
(74) *Attorney, Agent, or Firm* — Richard B. Cates

(57) ABSTRACT

The invention is a flight vehicle, and methods of operation thereof, having wings and movable propeller assemblies which can be rotated to provide vertical and/or horizontal thrust. The propeller assemblies are configured to maximize available engine/propeller thrust and to prevent propwash from striking the wings of the aircraft.

9 Claims, 45 Drawing Sheets

(56) References Cited

U.S. PATENT DOCUMENTS

| | | | |
|---|---|---|---|
| 2004/0026563 A1* | 2/2004 | Moller | 244/12.4 |
| 2006/0097103 A1* | 5/2006 | Atmur | 244/7 C |
| 2007/0034739 A1* | 2/2007 | Yoeli | 244/23 R |
| 2009/0266942 A1* | 10/2009 | Karem | 244/7 C |
| 2010/0051740 A1* | 3/2010 | Yoeli | 244/12.1 |
| 2010/0120321 A1* | 5/2010 | Rehkemper et al. | 446/36 |
| 2010/0171001 A1* | 7/2010 | Karem | 244/7 R |
| 2010/0193644 A1* | 8/2010 | Karem | 244/7 R |
| 2010/0270419 A1* | 10/2010 | Yoeli | 244/12.1 |
| 2010/0330866 A1* | 12/2010 | Suzuki | 446/57 |
| 2011/0168834 A1* | 7/2011 | Yoeli | 244/12.3 |

* cited by examiner

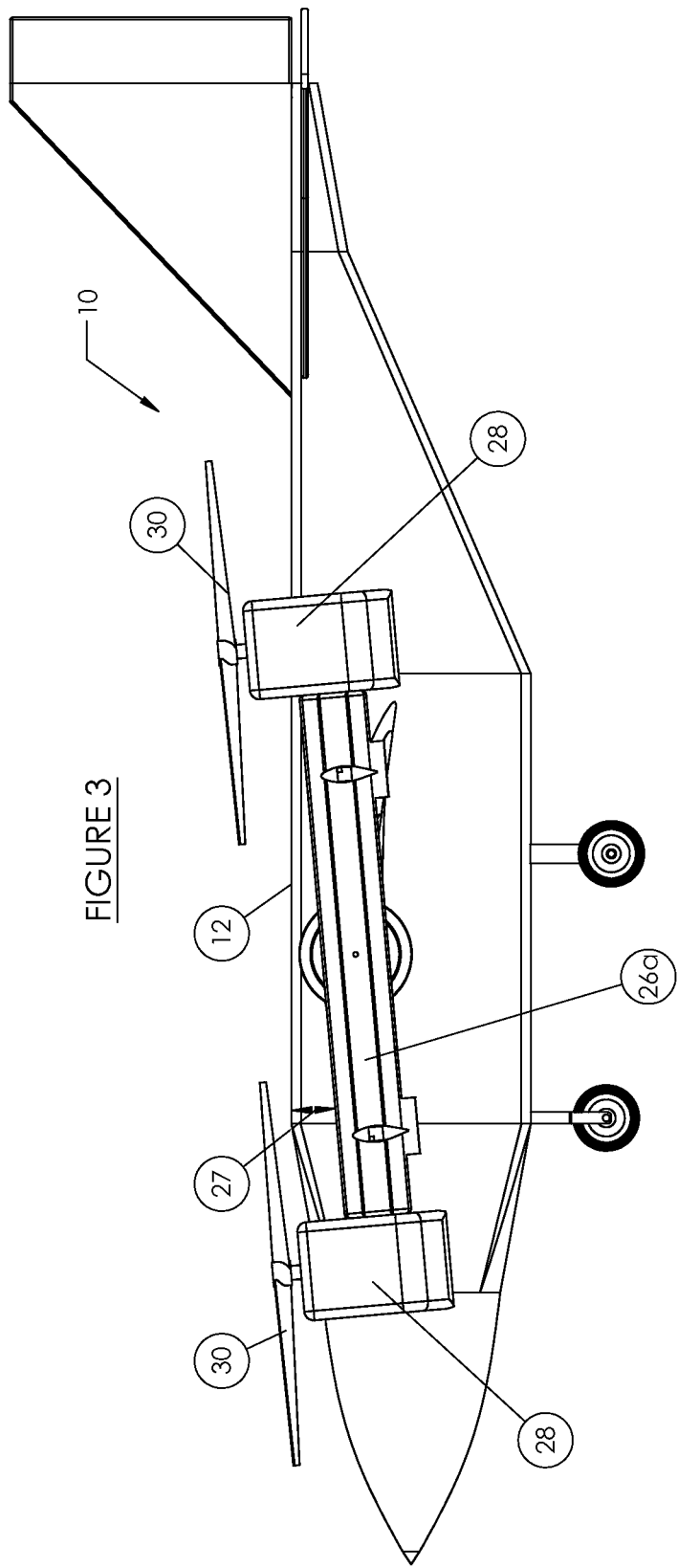

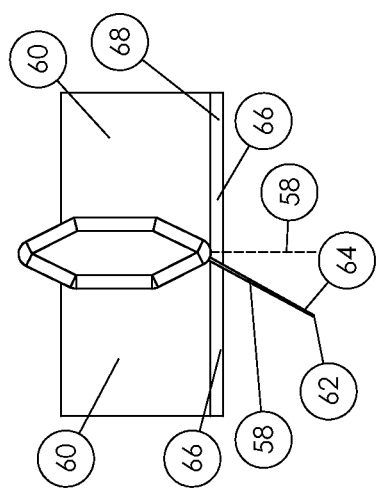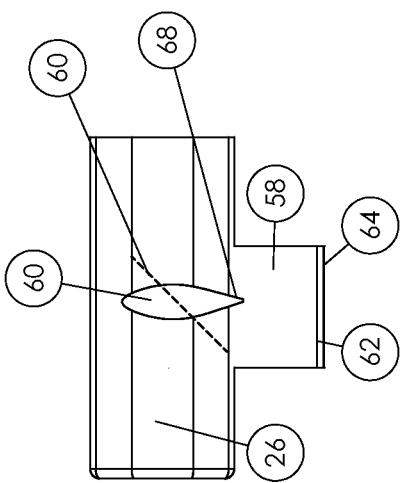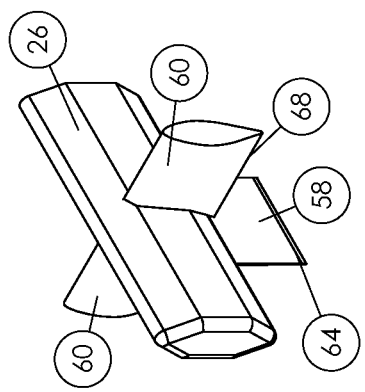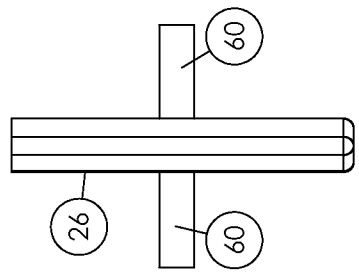

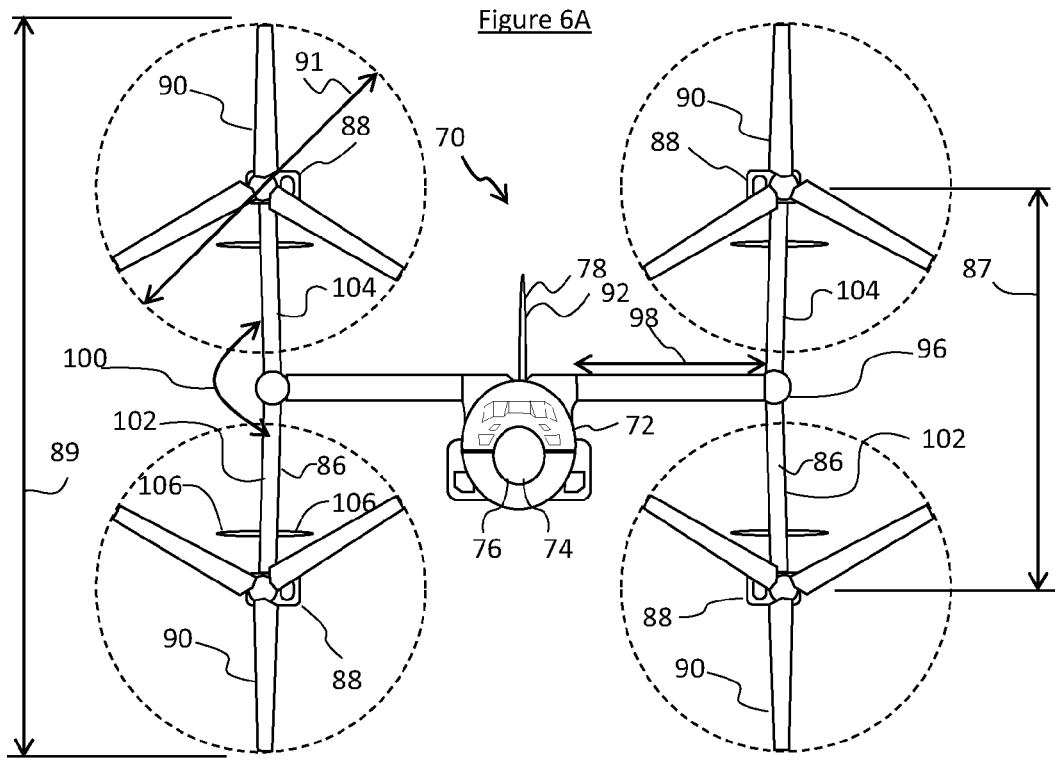
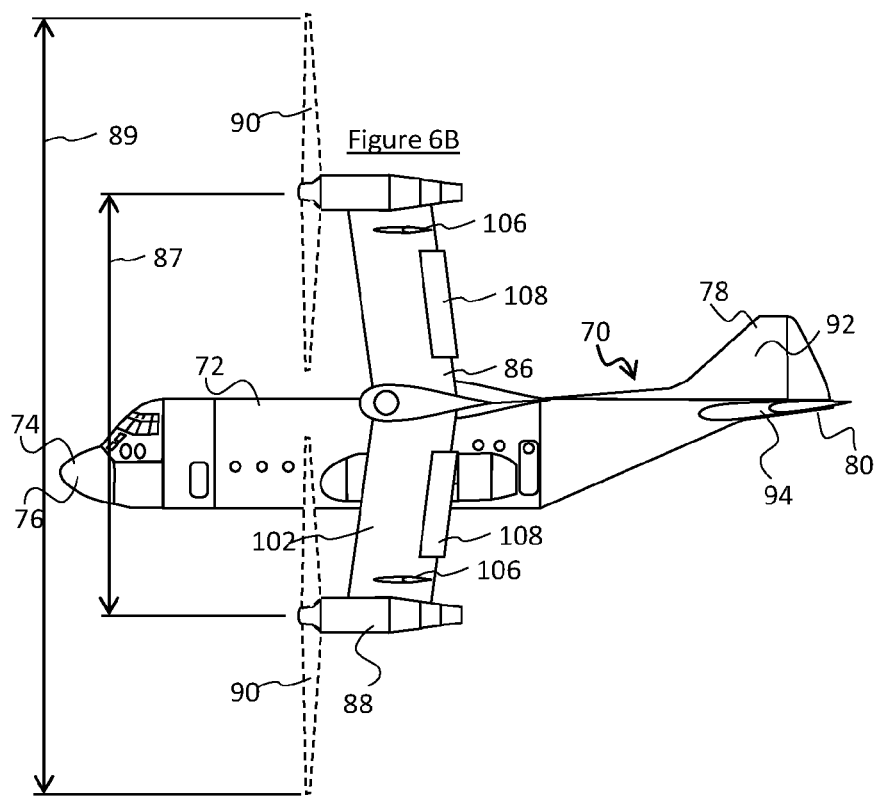

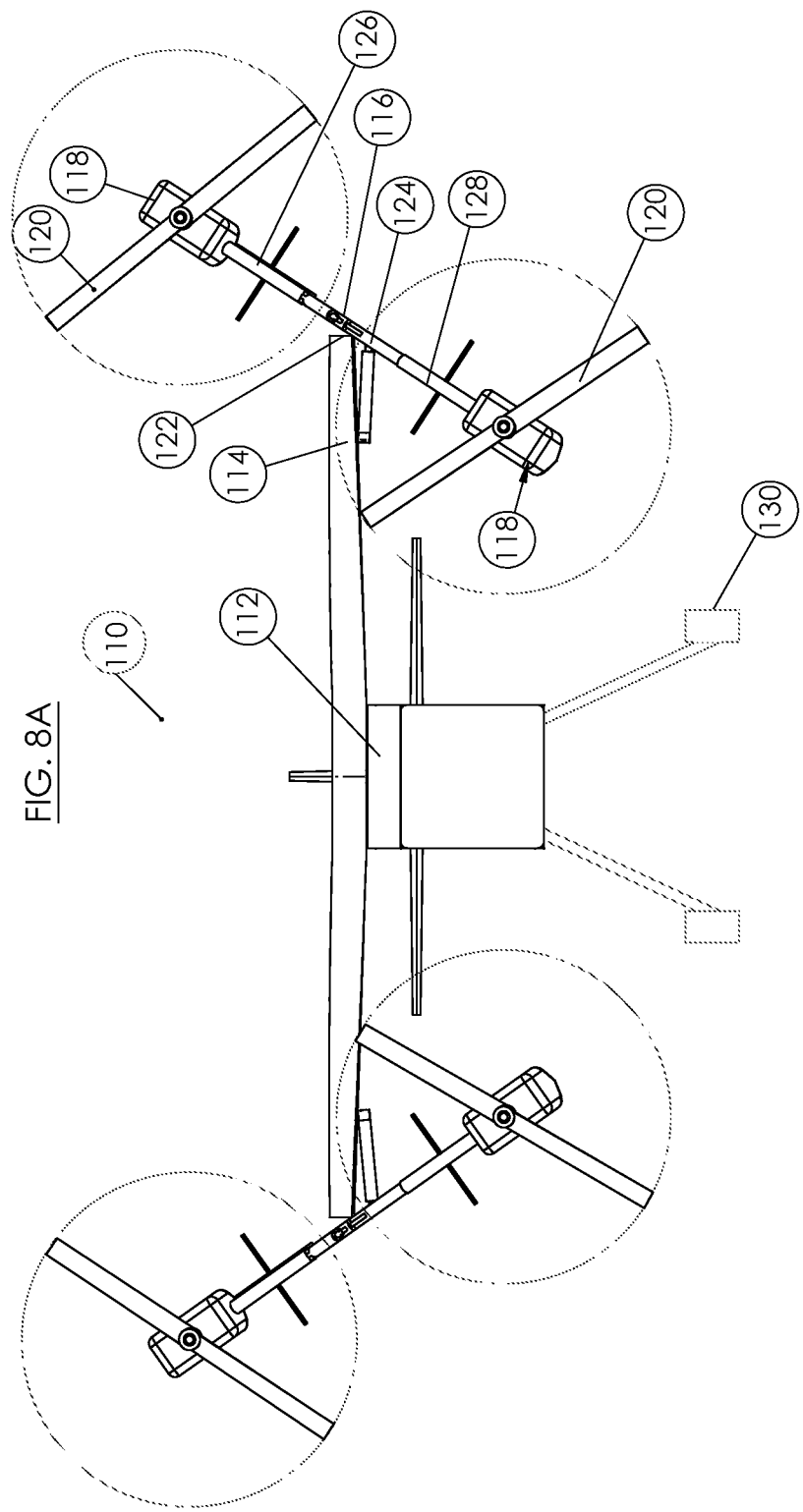

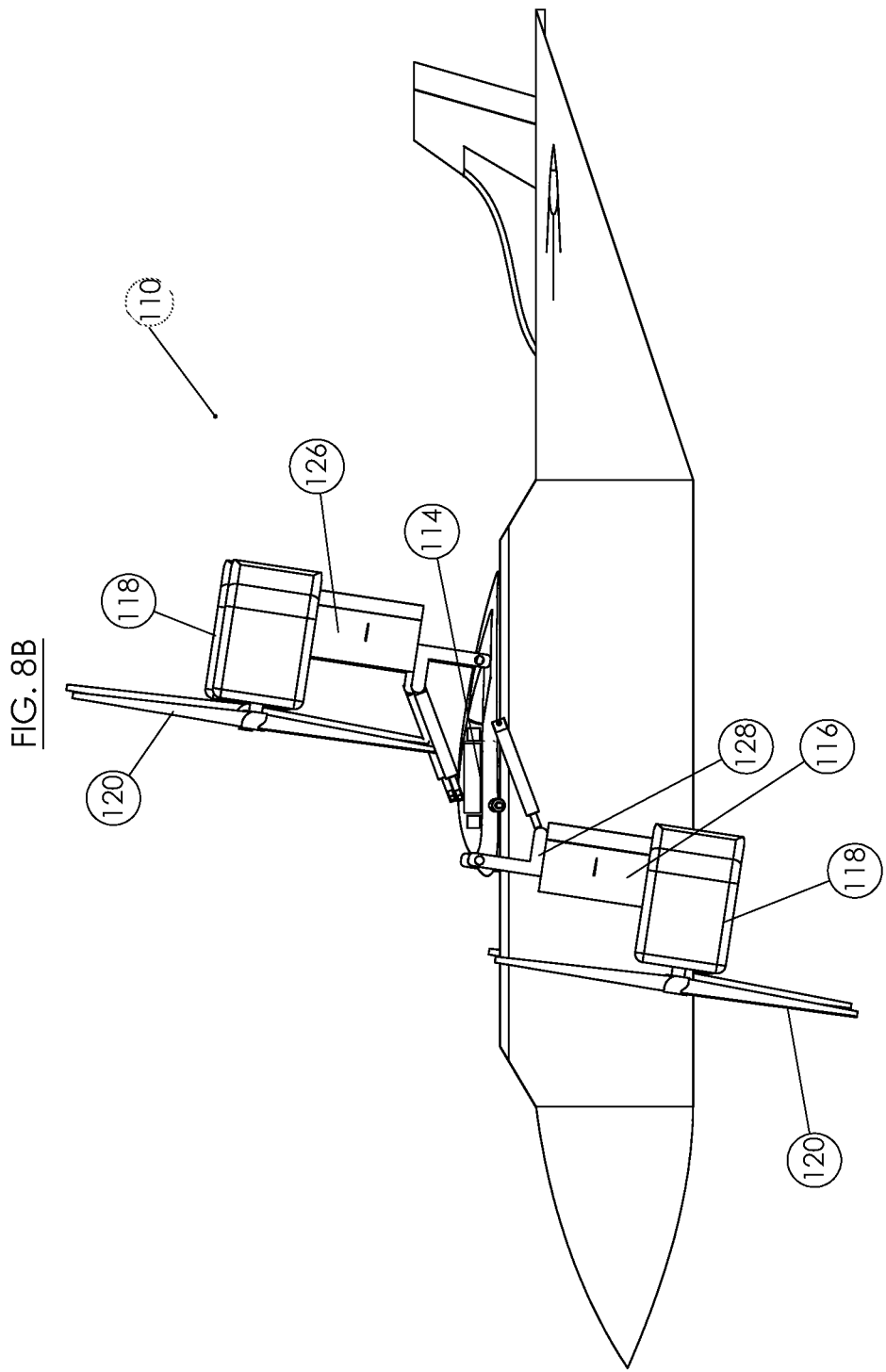

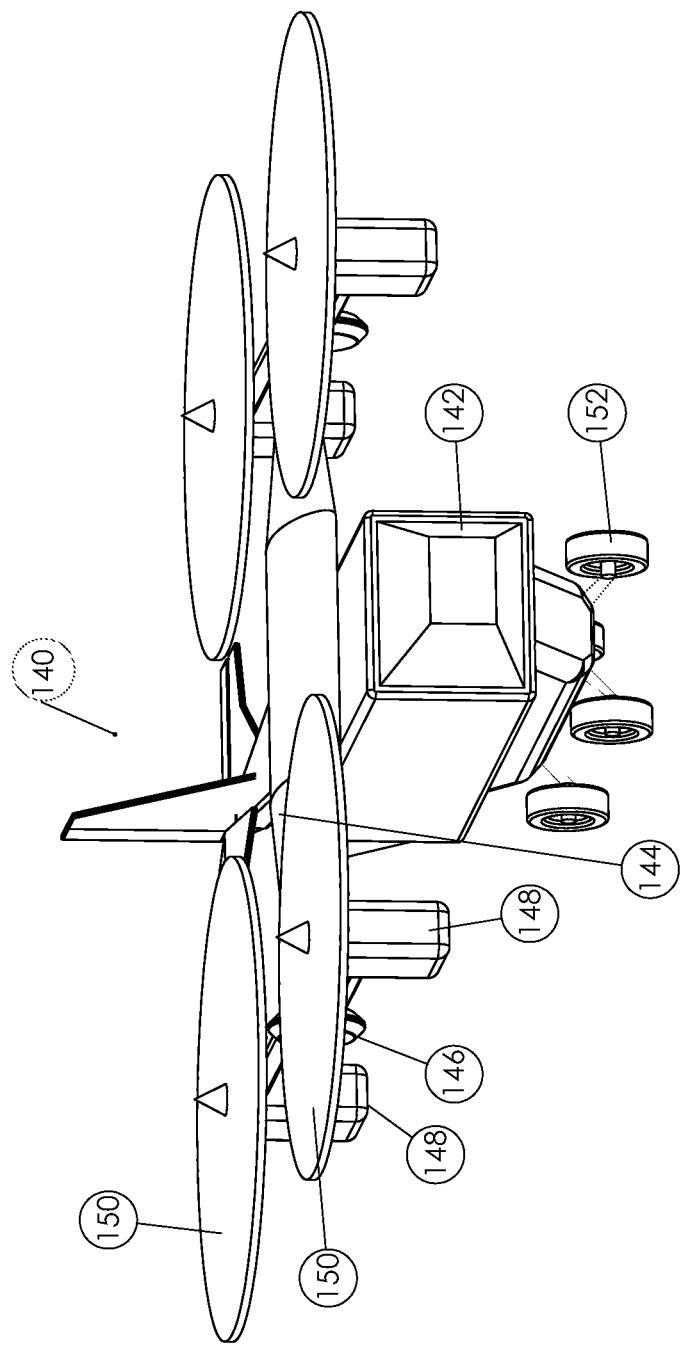

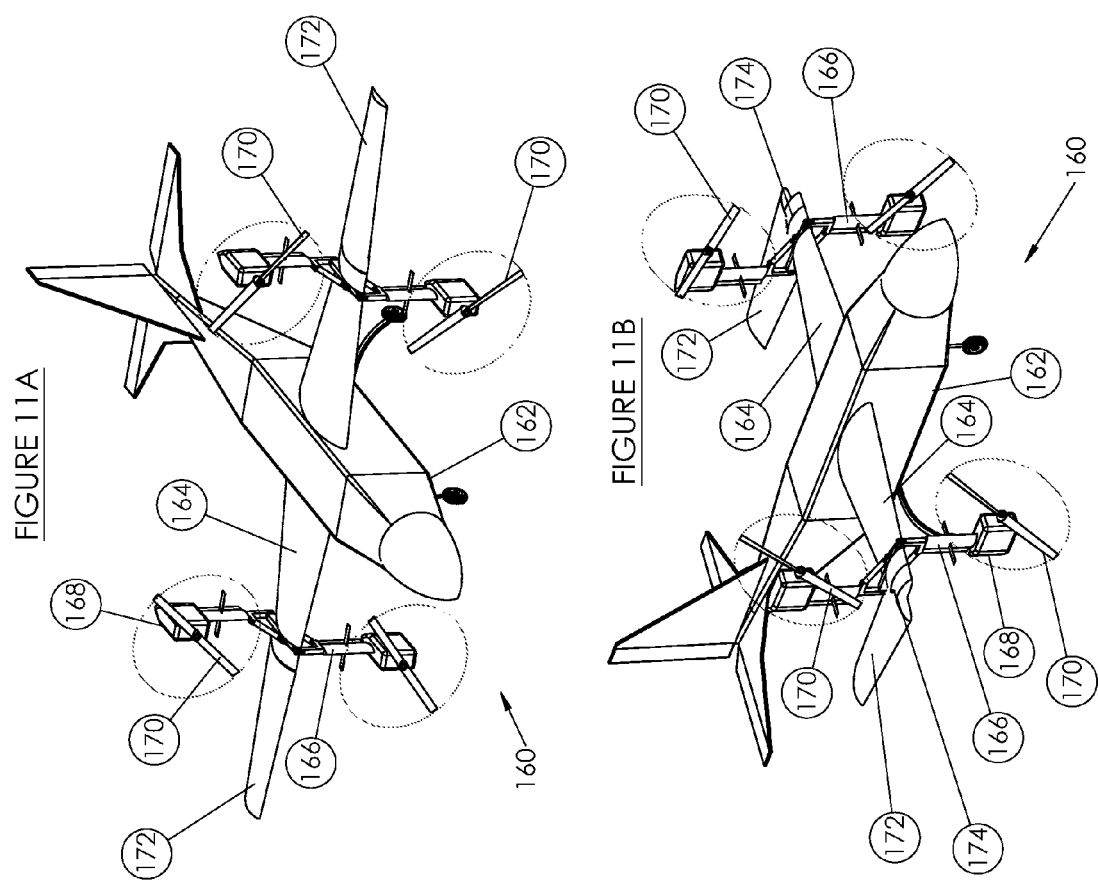

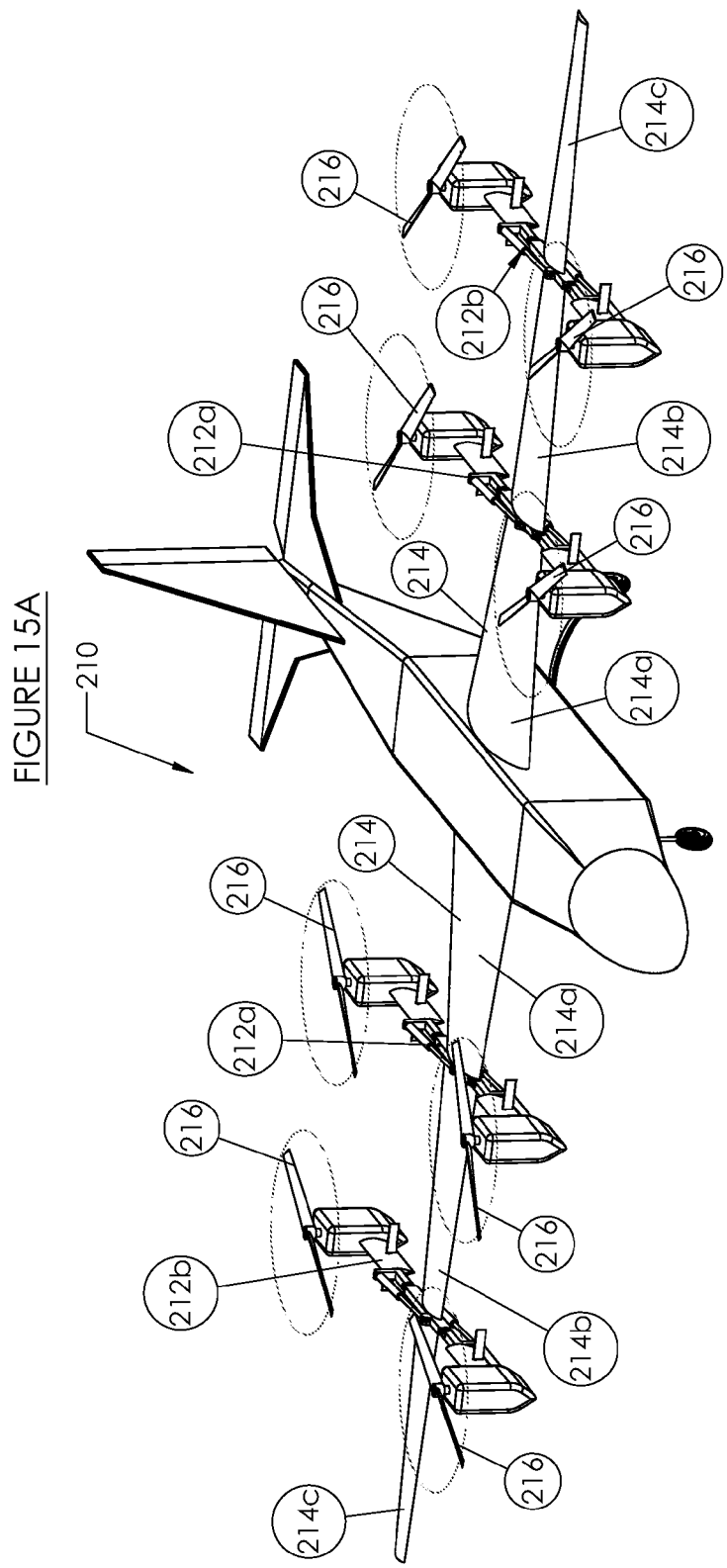

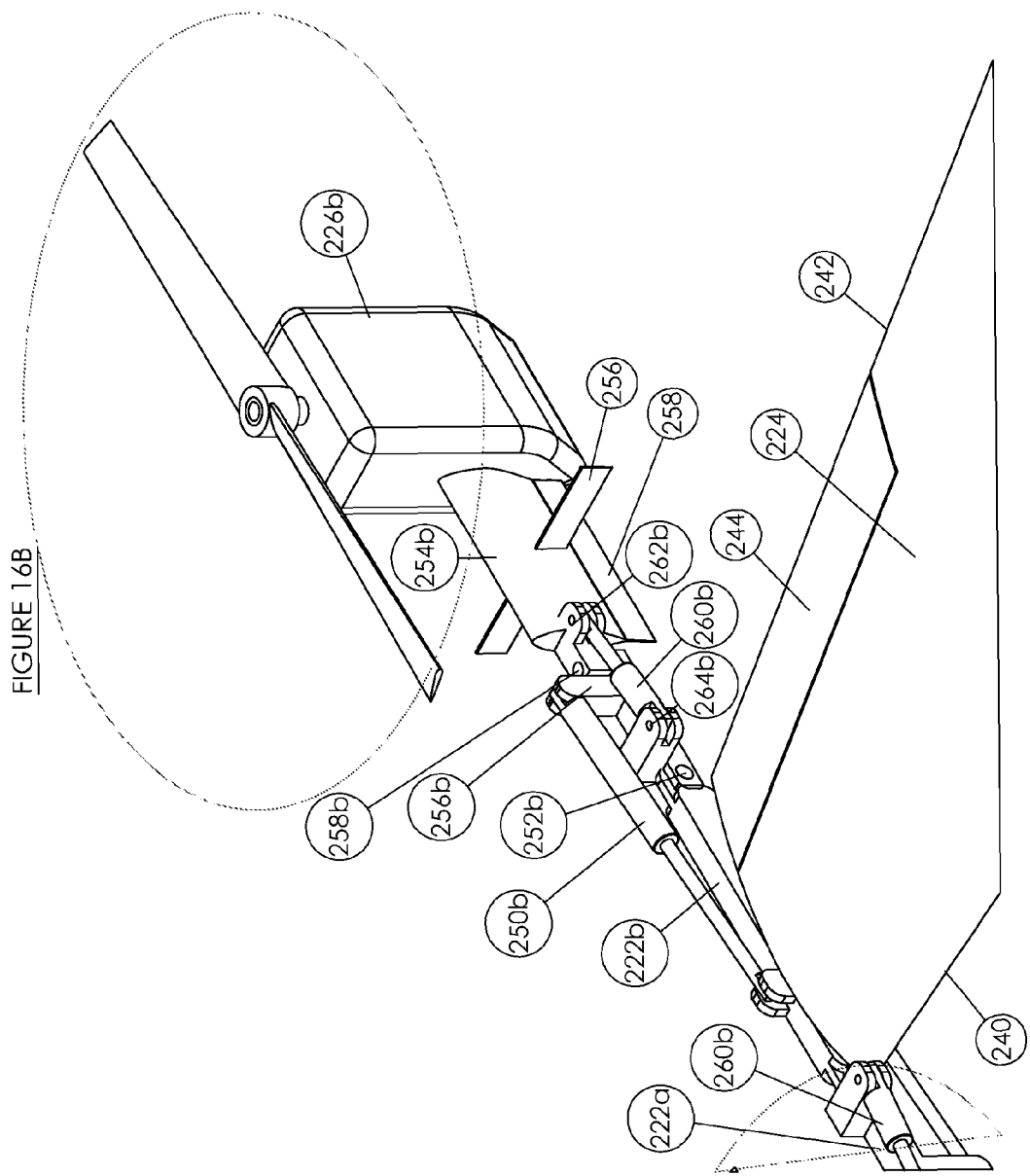

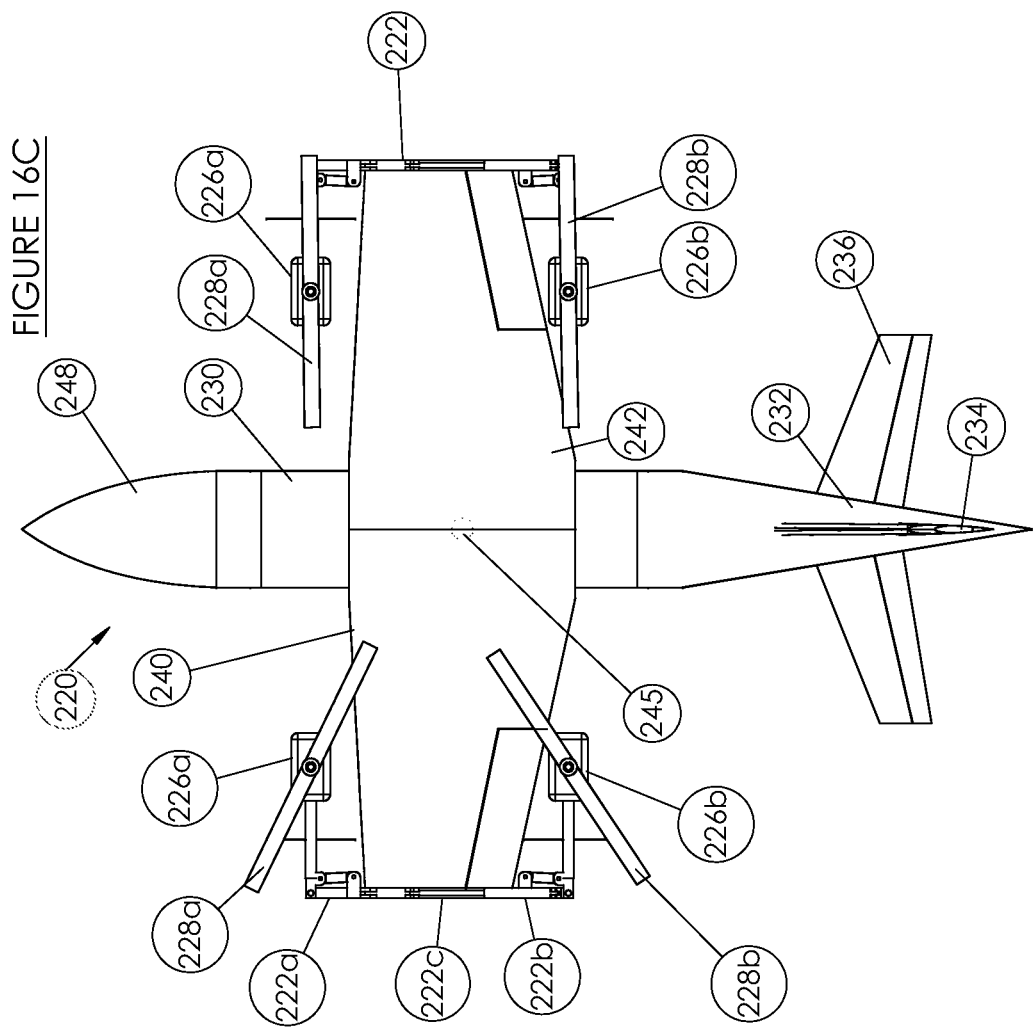

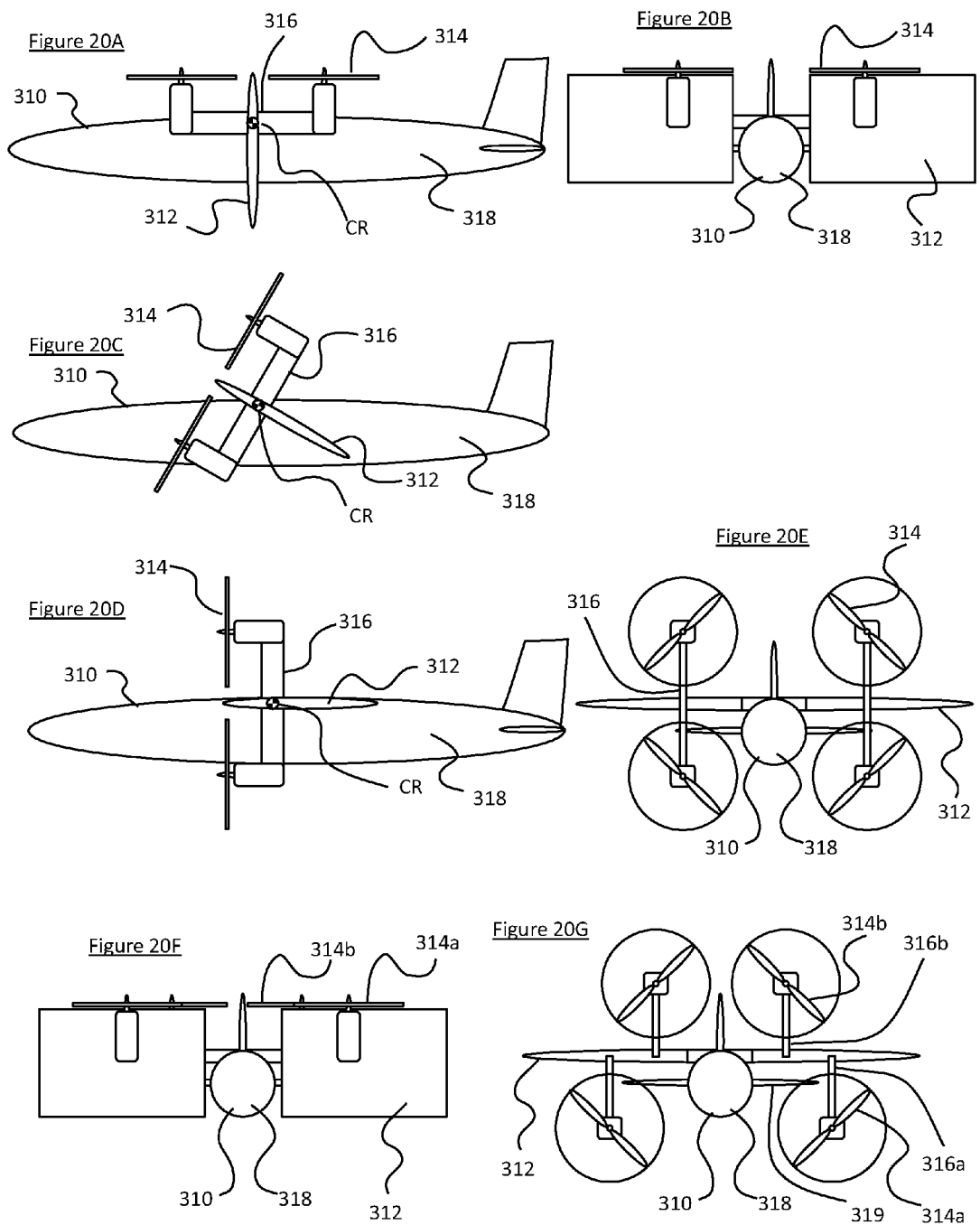

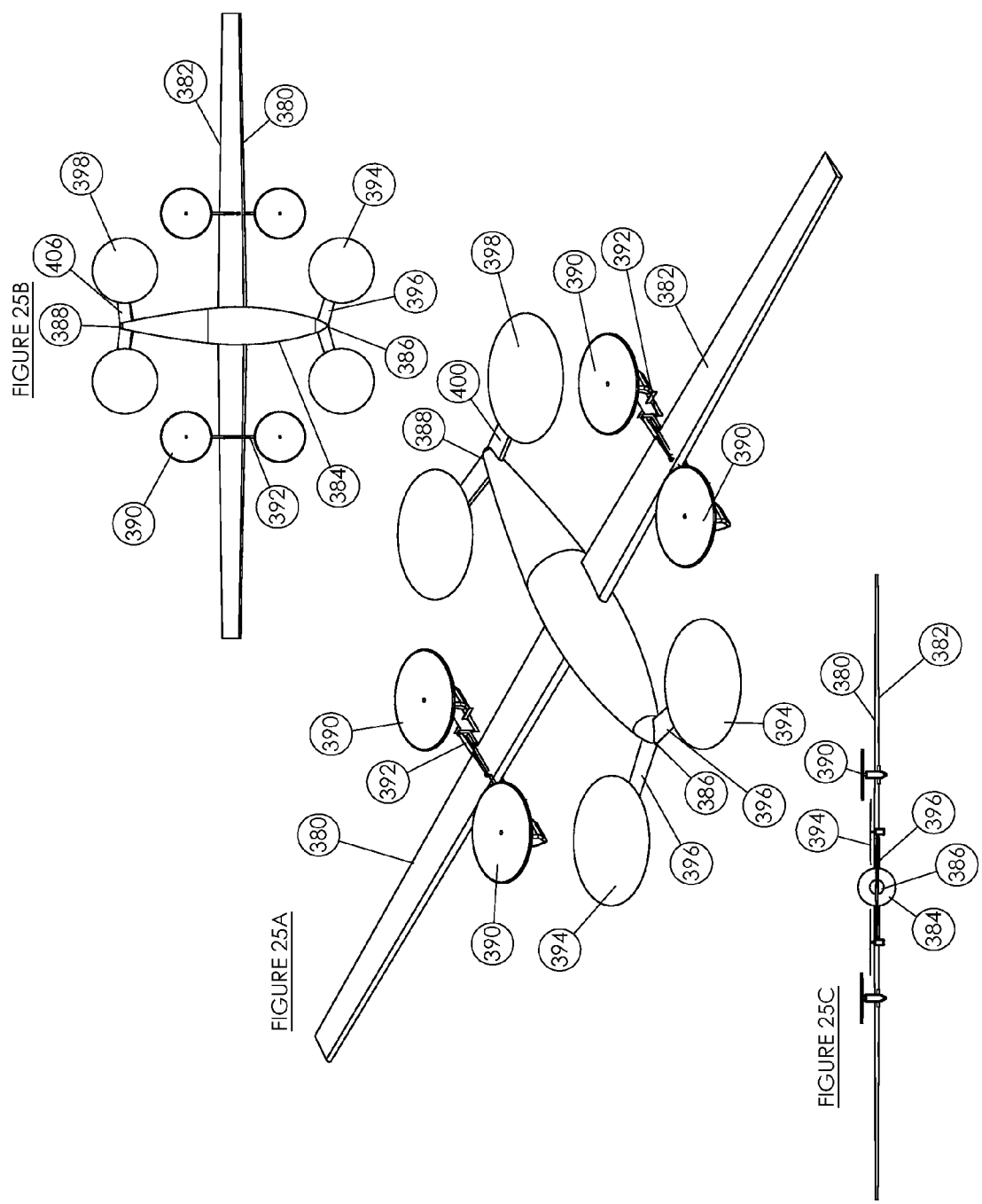

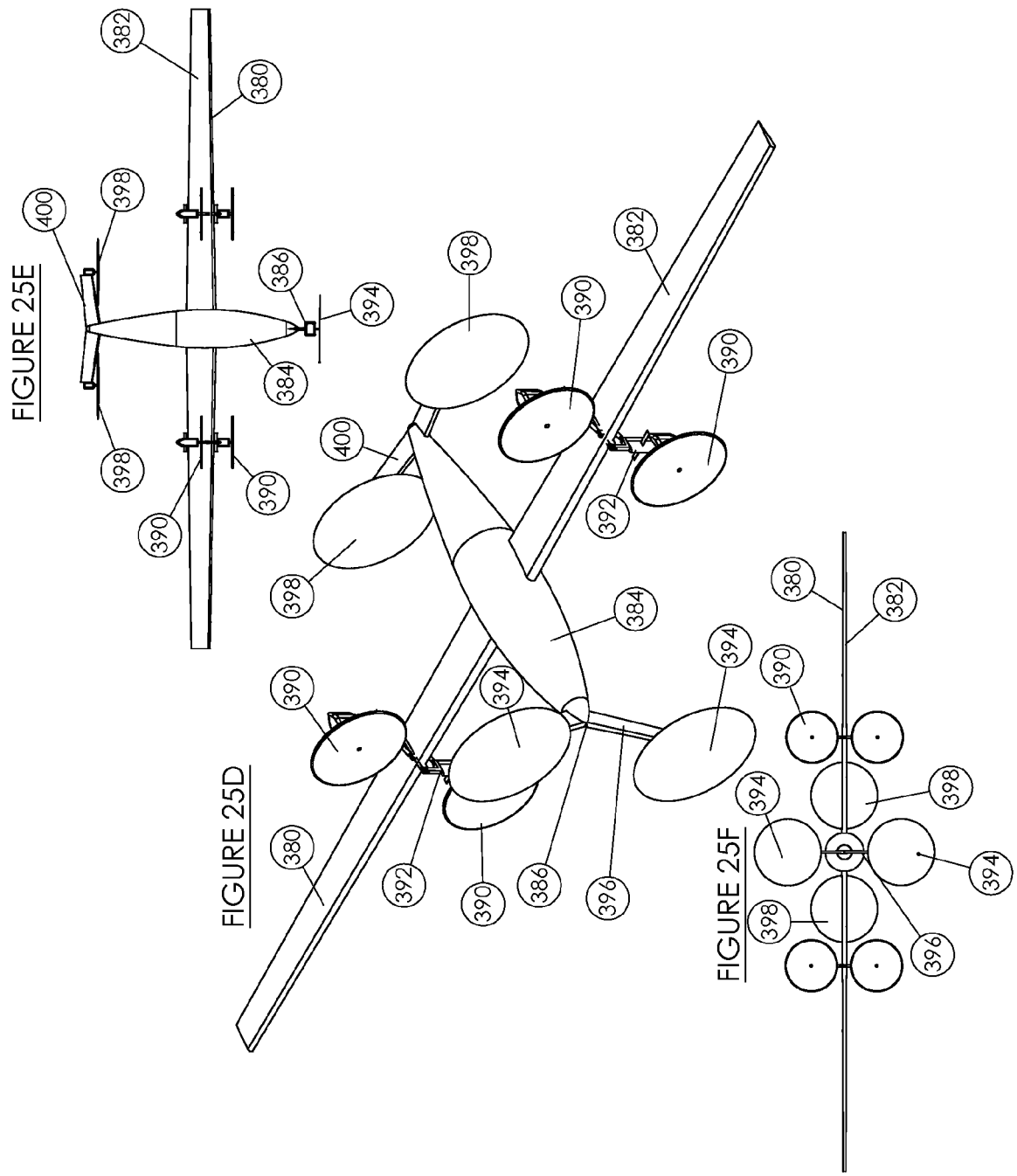

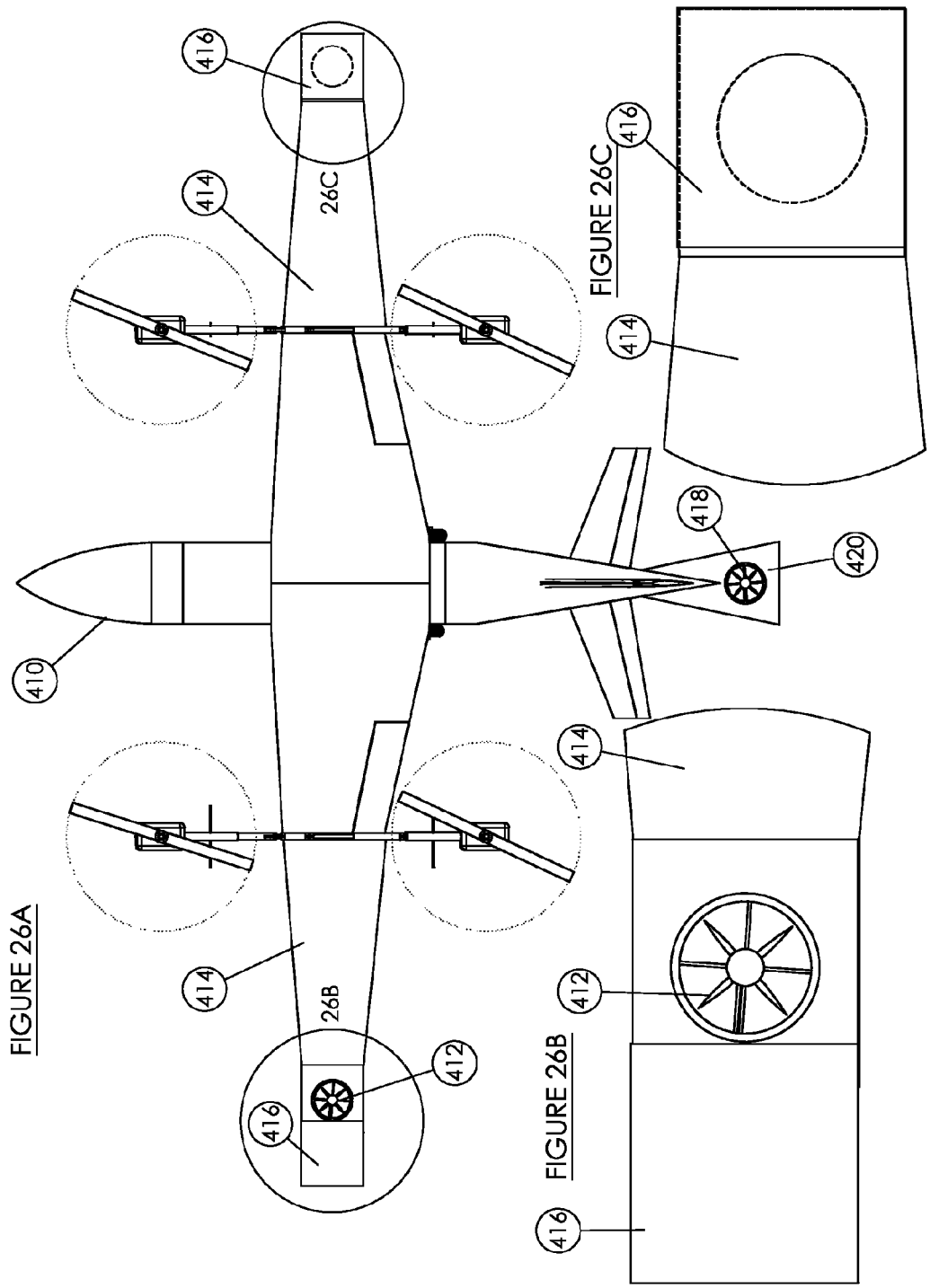

AIRCRAFT WITH WINGS AND MOVABLE PROPELLERS

RELATED APPLICATIONS

The present application claims priority from U.S. Provisional Application No. 61/390,611, filed on Oct. 6, 2010 and entitled "Aircraft with Wings and Movable Propellers," the entire contents of which are expressly incorporated herein by reference. The present application is related to U.S. Provisional Application No. 60/901,809 filed on Feb. 16, 2007, to U.S. Utility application Ser. No. 12/070,669 filed on Feb. 19, 2008, and to U.S. Provisional Application No. 61/332,817, filed on May 10, 2010, the entire contents of each of which are hereby incorporated by reference.

FIELD OF THE INVENTION

The present invention relates to flight vehicles, and more particularly to flight vehicles configured to carry various payloads.

BACKGROUND OF THE INVENTION

Heavier-than-air flight vehicles have been known for that last 100 years or so, and include airplanes and helicopters. Such flight vehicles are used in many applications where speed is necessary to transport people and/or cargo to distant locations.

In many applications, it is desirable to transport people and/or materials to distant locations where the terrain is rugged and facilities may be lacking. For example, in many military applications troops and equipment must be delivered rapidly to intercept enemy troops. The use of flight vehicles is often the quickest method to transport such troops and equipment.

While airplanes have excellent lifting capacity and altitude capabilities, most airplanes lack vertical takeoff or landing (VTOL) or even short takeoff or landing (STOL) capabilities, and they typically require a large open space for takeoff and landing. In many rugged landing sites, traditional airplanes are not suitable.

Helicopters can land and take off vertically, and have exceptional maneuverability. Helicopters are sometimes subject to accidents and failures, such as engine or rotor failures, which in some situations will lead to a failure and loss of the helicopter. Helicopters also use rotors (as opposed to propellers), which involve swash plates and other complicated mechanisms. Additionally, many helicopters have difficulty operating at high altitudes. Helicopters also tend to have slower flight speeds than do traditional aircraft.

Vertical takeoff airplanes are known which have propeller assemblies which can be rotated from a horizontal position (i.e., with propeller blades spinning in a generally horizontal plane, e.g., to provide vertically-directed thrust/lift for vertical takeoff) to a more vertical position (i.e., with propeller blades spinning in a generally vertical plane, e.g., to provide horizontally-directed thrust for forward flight). Examples of such aircraft include the V-22 Osprey. A complication of many tilt-rotor designs is that the wing structure blocks a portion of the propeller or rotor thrust. For example, when the propeller spins in a horizontal plane, i.e., when taking off/landing vertically and/or very short take-off/landing, thrust/propwash from the propeller strikes the top of the wing portion adjacent the propeller. When in the forward flight mode, e.g., with the propellers spinning in a generally vertical plane, thrust/propwash from the propeller strikes the wing and passes/interacts with the wing. This interaction of propwash with the wing reduces the thrust provided for forward thrust and/or vertical/short lift-off/landing, and also can interfere with aircraft controls and stability.

What has been needed is a vehicle that can be easily delivered and deployed for flight, with heavy lift and excellent flight characteristics even at high altitudes, which can fly in horizontal flight at conventional airplane speeds yet take off vertically and/or in very short takeoff mode, that is adaptable to many uses. Due to issues with currently available vertical lift vehicles, a need exists for a vertical lift vehicle that has improved lift characteristics, reduced cost, and increased reliability. The current invention meets those needs.

SUMMARY OF THE INVENTION

The invention is a flight vehicle having traditional aircraft wings combined with propeller assemblies which can be repositioned to redirect the propeller thrust in different directions, e.g., for forward flight, very short take-off and landing (VSTOL), of vertical takeoff and landing (VTOL). The aircraft will be able to fly in forward flight at high speeds while also having vertical takeoff and landing (VTOL) or short takeoff and landing capabilities (STOL).

In an embodiment of the invention, a flight vehicle includes wings extending from either side, or one continuous wing extending across most or all of the width of the aircraft. Propellers are secured to the wing or wings via elongated propeller supports, with the propeller supports rotatably secured to the wings and capable of rotating about a rotational axis passing generally wingtip-to-wingtip along the wings. The rotational axis may coincide with the center of gravity of the flight vehicle. For VTOL and/or STOL, the propeller supports can be rotated to a generally horizontal position wherein the propellers can be positioned in horizontal configuration (i.e., with essentially no forward/backward, and/or side-to-side tilt to the propellers). For forward flight, the propeller supports can be rotated forward to thereby rotate the propellers forward to provide forward thrust.

In an embodiment of the invention, each wing has an assembly of two propellers and a connecting propeller support. Each propeller/support assembly (comprising the two propellers and connecting propeller support) is rotatably secured to a wing at a position generally coincident with the center of gravity of the propeller/support assembly. The propeller/support assembly may be configured to be rotated forward and/or backward. Forward rotation of the propeller/support assembly moves the propellers to a position to supply forward thrust, while backward rotation of the propeller/support assembly moves the propellers to a position to supply backward thrust. Positioning the propeller/support assembly in a horizontal position places the propellers to spin in a generally horizontal plane, which can be used to provide thrust for vertical takeoff/landing or very short takeoff/landing.

The connecting propeller support has sufficient length to position the propellers well clear of the wing in order to reduce or eliminate propeller thrust from striking the wing—regardless of which rotational position the connecting propeller support is rotated. In one embodiment of the invention, the connecting propeller support has a length which is slightly greater than the propeller diameter(s).

In an embodiment of the invention, the aircraft wing does not need to provide substantial lift during takeoff/landing or even at relatively slow speeds. The aircraft wing instead only needs to provide substantial lift at relatively high forward speeds, while also providing sufficient structural support for the aircraft, including supporting the propeller/support assembly. Such an aircraft wing need not have substantial camber, and may also not require substantially large flap assemblies, in contrast to wings designed to generate large amounts of lift at low speeds.

In an embodiment of the invention, the wing may define a relatively large surface area when viewed from above or below. In one example, the wing is generally short in width but has a relatively long chord length. Such a configuration makes the wing more conducive to storing large amounts of fuel therein, and also provides substantial space for structural assemblies to reinforce the wing and support the propeller/support assemblies connected thereto. The wing may have a generally constant chord length across the width of the wing. In another example, the wing may be tapered, starting at a relatively long chord length adjacent the aircraft main body and tapering to a relatively small chord length adjacent the wing tip where the propeller/support assembly is connected to the wing. The wing can be relatively thick (top-to-bottom).

The large surface area of the wing may include a large fixed surface area, i.e., the area of the wing without considering the surface area of the movable control surfaces such as flaps, etc. By contrast, other VTOL or VSTOL aircraft typically have relatively small fixed surface area on the wing but have relatively large flap area. For example, the V-22 Osprey has flaps which account for almost ½ of the chord length of the wing, and thus about 50% of the wing surface area. During VTOL or VSTOL, these flaps must be positioned straight down in order to reduce the effect of the propeller wash hitting the tops of the V-22 wings.

While propellers have been discussed herein, rotors could be used in some versions of such air vehicles, such as where the air vehicles are very large and the associated propellers (rotors) have long lengths.

An embodiment of the invention is a flight vehicle having a flight vehicle central portion (such as a fuselage or center line) having a top, bottom, and first and second sides, wherein the first side is opposite to the second side. A first wing portion extending from the first side of the flight vehicle central portion, and a second wing portion extending from the second side of the flight vehicle central portion, wherein the first wing portion defines a first wing chord line and the second wing portion defines a second wing chord line. The wing portions may form a continuous wing across the entire vehicle, such as a flying wing shape. A first propeller having a first propeller rotational axis, wherein the first propeller comprises at least one propeller blade having a first propeller blade radius extending from the first propeller rotational axis to a first propeller distal blade tip, wherein the first propeller when rotated about its rotational axis defines a first propeller rotational disk defined by the rotation of the first propeller distal blade tip. A first propeller support having a proximal portion and a distal portion, wherein the first propeller support proximal portion comprises a first support pivot point secured to the first wing portion, and the first propeller is supported by and positioned at the first propeller support distal portion, wherein the first propeller support is configured to selectively rotate the first propeller about the second support pivot point from a first position wherein the first propeller rotational disk is substantially parallel to the first wing chord to a second position wherein the first propeller rotational disk is angled away from the first wing chord line by at least 45 degrees, wherein the first propeller support defines a length X1 from the first propeller rotational axis to the first support pivot point. A second propeller having a second propeller rotational axis, wherein the second propeller comprises at least one propeller blade having a second propeller blade radius extending from the second propeller rotational axis to a second propeller distal blade tip, wherein the second propeller when rotated about its rotational axis defines a second propeller rotational disk defined by the rotation of the second propeller distal blade tip. A second propeller support having a proximal portion and a distal portion, wherein the second propeller support proximal portion comprises a second support pivot point secured to the second wing portion, and the second propeller is supported by and positioned at the second propeller support distal portion, wherein the second propeller support is configured to selectively rotate the second propeller about the second support pivot point from a first position wherein the second propeller rotational disk is substantially parallel to the second wing chord to a second position wherein the second propeller rotational disk is angled away from the second wing chord line by at least 45 degrees, wherein the second propeller support defines a length X2 from the second propeller rotational axis to the second support pivot point. The aircraft has a first configuration wherein the first propeller disk is substantially parallel to the first wing chord line and the second propeller disk is substantially parallel to the second wing chord line, and a second configuration wherein the first propeller disk is angled at least 45 degrees from the first wing chord line and the second propeller disk is angled at least 45 degrees from the second wing chord line. Other angles are also within the scope of the invention, including at least 30 degrees, at least 60 degrees, at least 75 degrees, and about 90 degrees. The first and second propeller disks may be at the same angle with respect to their respective wing portions, or may be at different angles. The first propeller blade radius is at least 70% of the length X1, and wherein the second propeller blade radius is at least 70% of the length X2. Other percentages are also within the scope of the invention, including less than 70%, at least 75%, at least 80%, at least 85%, at least 90%, and least 95%, and approaching 100%.

A method of operating an aircraft according to the embodiment of the invention can include positioning the aircraft in the first (takeoff) configuration wherein the first propeller disk is substantially parallel to the first wing chord line and the second propeller disk is substantially parallel to the second wing chord line; applying sufficient power to the propellers to effectuate a vertical takeoff; and transitioning the aircraft to the second configuration to effectuate forward flight. The method may include transitioning the aircraft back to the first configuration and effectuating a vertical landing.

Embodiments of the present invention include a flight vehicle having a main airframe defining an airframe plane, wings extending from either side of the airframe (which could be in the form of one continuous wing extending substantially the width of the vehicle), a rotating support at the tip of each wing, and a plurality of propellers on each rotating support. In one embodiment, each rotating support has two propellers (one at either end of the rotating support), which may be propellers of equal size and/or equal power. In an embodiment of the invention, each propeller is secured to the rotating support such that the rotational plane of the propeller is at a fixed angle, such as between 0 to 10 degrees, with respect to a line passing the length of the rotating support and/or with respect to a line passing across the width of the aircraft. In another embodiment of the invention, the propeller is configured so that the rotational plane of the propeller can be rotated with respect to the rotating support.

One or more of the propellers may include an engine therewith, with the engine located with the propeller at the end of the rotational support. A flight vehicle according to the invention can include a propeller/engine assembly at the end of each rotational support. The rotational support may be configured to tilt forward and/or backward up to 90 degrees, or even further (such as to effectuate yaw control and/or air-braking). The rotational support may also be configured to be tilted sideways, i.e., rotated toward or away from the aircraft main body. Such side-to-side rotation of the rotational support may permit the propeller/engine assembly(ies) to tilt away from or toward the airframe, which may be helpful for maneuvering the aircraft to one side or the other.

The invention includes a method of operating a flight vehicle having a plurality of propellers mounted on supports rotatably connected to wings of an airframe, involving positioning each of the rotatable supports such that each of the propellers has a tilt angle of approximately zero with respect to the airframe plane; providing power to all of the plurality of motors, wherein the power is sufficient to lift the air vehicle off of the ground so the vehicle is airborne; with the vehicle airborne, maintaining or increasing power to one or more of the propellers in order to maintain aircraft stability; with the vehicle airborne, rotating the rotatable supports to a forward angle in order to position the propellers to provide forward thrust; as the aircraft gains forward speed and the wings generate lift, gradually increasing the forward rotation of the rotatable supports to increase the forward thrust and decrease the vertical thrust provided by the propeller.

The vehicle may be configured to be folded into a more compact form for storage and/or transport. The vehicle can be delivered to a desired location via truck, ship, aircraft, etc., and can be deployed quickly for use. In an embodiment of the invention, the propellers are held on propeller supports and wings extending from the airframe. The propeller supports can extend from the wings various angles and lengths. The wings and/or propeller supports can be configured to swing or otherwise move away from the airframe to a deployed (flight) configuration and back to a stowed (storage) configuration where the wings, propeller supports, and associated propellers (potentially including the engines) are stowed against and/or inside the airframe. Electric motors, possibly including an electric clocking system, may used to properly position the wings, propeller supports, and/or propellers for storage.

The air vehicle has vertical takeoff and landing (VTOL) as well as short takeoff and landing (STOL) capabilities. The air vehicle may have the ability to have its wings, propeller supports, and/or propellers swing into a stowed position that makes a tightly compact vehicle that can fit into an aircraft (such as a military C-5 cargo plane), ship, or other transport vehicle. The air vehicle propellers may be configured to rotate (manually or automatically) or otherwise extend outwardly to a deployed (flight) position, whereby the propellers are in position to lift the air vehicle off the ground for flight.

The propellers of the invention may be ducted fans, shrouded propellers, bladed propellers, or other propeller assemblies. A bladed propeller may include any number of blades, depending on the particular application. The engines can be attached directly to or even be internal of the airframe and/or wings and/or propeller supports, with an associated drive to each propeller. The engines to each propeller can be adjacent to and/or even directly connected to the propeller on the propeller supports. The propeller can be directly secured to the engine via a rigid and fixed drive shaft and/or gearbox without clutch or other similar mechanism, so that the propeller RPMs will be the same as the engine RPMs. The propeller/engine assembly may include a clutch, such that the propeller can remain still while the engine is running (i.e., at idle, etc.). The propellers can be variable-pitch propellers, such as electric variable-pitch propellers for atmospheric density changes, etc.

The use of variable pitch propellers can permit the aircraft to be more effectively controlled. For example, the control system can be configured to control the thrust from each propeller by adjusting the pitch of that particular propeller, which can result in a more rapid thrust than varying the propeller rotational speed. For example, the aircraft could be configured to hold engine rpms generally constant between one or more engines, and to vary propeller thrust solely (or predominantly) by varying propeller pitch. The system could include a control system that, when it determined that additional thrust was required at a particular propeller, would change the pitch of that propeller for more/less thrust while maintaining the rpm steady.

The propellers (possibly including attached engines and drive shafts) may be configured to cant front-to-back and/or side-to-side in order to either turn the vehicle in the yaw axis, counter asymmetrical thrust in case of an engine out condition, tilt the aircraft in the air so that the main fuselage can remain more level, etc. The propellers may be tilted in or opposite the direction of motion of the vehicle. The propeller support arms can be telescoping to allow for various propeller sized and/or for repositioning of a propeller.

A vehicle according to the invention could be launched in various methods. The vehicle could launch in a STOL or VTOL technique from land or sea, or from platforms (such as buildings, movable platforms, or ships) on land or sea. The vehicle could include a parachute and/or parafoil or similar device secured to the airframe in order to be launched and/or delivered via air dropping (e.g., from a cargo plane such as a military C-5 or C-130). A drogue chute could stabilize the fall, the wings/propeller supports could be extended, the engines could start to idle as the drogue chute is retrieved via a mechanism, and the engines could then start to apply full power as the drogue chute is retrieved. The vehicle could also be dropped with just a streamer to stabilize the vehicle, and then deploy the wings/propeller supports and start the motors once stability is achieved. Even a freefall with no decelerator may work, with the propellers themselves providing stability and slowing the fall of the vehicle until the engines are fully started. The vehicle could also include an emergency parachute or similar device to be deployed in case of an emergency, such as loss of power to all engines. The emergency parachute could be deployed using an explosive device that throws the parachute into a deployed configuration. A so-called ballistic parachute could be used as an emergency parachute.

The vehicle could be configured for delivery or even launch from a torpedo tube. For example, the diameter of a submarine missile tube is between 6' and 7' in diameter and 28 feet long, and a version of this vehicle can fit in the missile tube and fold away safely for special missions.

The air vehicle may be configured with interchangeable components, including engines, propellers, and corresponding supports. This allows different components to be exchanged in a relatively rapid fashion for repairs and/or different performance requirements. For example, a set of short propellers could be used for applications where rapid acceleration and high speed were desired for the air vehicle, with a set of longer propellers replacing the shorter propellers for use in applications where high lift and high altitude performance are desired for the air vehicle.

Each propeller may have a dedicated engine associated therewith. The engines may be cross-linked with each other via gears/driveshafts, etc., in order to provide power to a propeller in case of an engine failure. Various engine configurations, including cross-linking/driveshafts, not only allow for additional thrust but can also provide redundancy in case of engine loss/failure. The engines can be diesel, (including turbodiesel), electric, hybrid, hydrogen, and other fuel burning motors that turn the propellers sufficiently to propel the aircraft with the payload through the air with good performance.

The air vehicle could be configured to connect with and lift a portable medical treatment facility, such as the LSTAT used by the US Army which is an enlarged medical litter that is essentially a small ICU configured to hold not just a patient but also medical equipment and medical personnel. Such a portable medical treatment facility could fit inside and/or be secured underneath (or to another portion of) an air vehicle of the invention. The air vehicle could be configured to accommodate the medical personnel inside the cockpit of the air vehicle, but still provide access to and from the portable medical treatment facility from the cockpit.

The vehicle may include lifting assemblies for lifting items from the ground/water/etc. up to and airborne vehicle. In one such embodiment, a litter or net-like device is used to lift items up to the vehicle. The net may have a relatively rigid frame or be more sling-like, depending on the particular application.

The vehicle can include external payloads in various forms. External drop tanks configured to carry fuel for the air vehicle (or for delivery to offsite location). Reserve fuel tanks can be located just above the drop fuel tanks for emergency flight if any of the engines quit or is damaged during the flight. Quick fuel dumps can also be done without losing the fuel tanks. The reserve tank would still contain enough fuel to fly to a safe location for landing. The drop tanks are below the reserve tanks since they may have to drop during flight. The fuel tanks, including the drop tanks, can be located almost anywhere on the vehicle including by the engines themselves. If the engines are internal to the aircraft then the fuel tanks can be adjacent thereto. To mate the flight system to the ground vehicle it may be preferred to place the fuel tanks on the lower sections and outside sections of the vehicle, where the ground wheels will not affect their placement.

The air vehicle can be controlled by an onboard pilot or computer system, or can be remotely controlled via computer and/or remote-located pilot. Traditional helicopter controls can be used in the interior of the vehicle for use by an operator along with the autonomous flight controls. There can be a collective and stick as with existing helicopters to give control of the vehicle to an operator when needed. Note that the air vehicle can be remotely controlled, directly controlled from within the cockpit, or controlled by the autopilot. A satellite link through Iridium and others may be useful.

The air vehicle will typically have advanced electronics and computer controls to maintain stability of the vehicle in flight. Such advanced controls can be of particular importance in controlling and adjusting the power from the large numbers of propellers and engines that may be involved. Many such control systems are already known in the art for use with helicopters and other flight vehicles. Modern aircraft navigation systems can work well with this vehicle. A neural net computer system may be employed. Vehicle stability can be provided by gyros located, e.g., on the centerline between engines that goes through the center of gravity of the vehicle when it is empty. Gyros can be used on a centerline from the empty vehicle center of gravity and even from the full vehicle center of gravity, depending on the need. At least one gyro per axis may be preferred, although at times only one gyro may be used depending on the size and complexity of the vehicle. The gyro stabilization may be at least 70 cycles per second for updates to the throttles to each engine, etc.

Navigation systems can include GPS systems and other modern navigation methods. An autopilot can be used, including many of the helicopter-type state of the art autopilots currently available, such as a Piccolo 2 series autopilot when interfaced with neural net computer software like the one that the Naval Research Laboratory has developed for their SPIDER Helicopter. In addition to other navigation systems, an obstacle avoidance system such as a scanning laser system may be employed to find obstacles in the air vehicle flight path. Difficult-to-spot obstacles such as power lines, etc. may be located using map data, etc. Other aircraft can be avoided through the use of transponder information, by receiving secure data by friendly aircraft as to where they are by GPS coordinates, etc.

Vehicle sizes range from very small (e.g., nanorobot size) to very large. This vehicle can also be a toy that is sold to consumers. The larger versions may be configured to lift very large payloads, including tanks, and also to be driven on highways when on the ground.

BRIEF DESCRIPTION OF THE DRAWINGS

FIG. 3 depicts a side view of the aircraft of FIGS. 1A-1D with propellers on one side rotated forward and propellers on the other side rotated rearward;

FIGS. 4A-4D depict perspective, front (cross-section), top, and side views, in close-up, of portions of the propeller support of FIGS. 1A-1D;

FIGS. 6A-6B are front and side views of the aircraft of FIGS. 5A-5C with the propellers rotated forward for forward flight;

FIGS. 8A-8B are front and side views of the aircraft of FIGS. 7A-7B with the propellers rotated forward for forward flight;

FIGS. 9A-9D are various views of an air vehicle according to an embodiment of the invention in various flight configurations;

FIG. 11A is a perspective view of an air vehicle with winglets according to an embodiment of the invention;

FIG. 11B is a perspective view of the air vehicle of FIG. 11A with the winglets folded;

FIGS. 15A and 15B are front perspective views of an aircraft according to an embodiment of the invention;

FIGS. 16A, 16C, and 16D are top views of an aircraft according to an embodiment of the invention, while FIG. 16B is a close-up perspective view of the aircraft of FIG. 16A;

FIGS. 20A-20E depict side, front, side, side, and front views of an aircraft in takeoff, transition, and forward flight modes according to an embodiment of the invention;

FIGS. 20F and 20G depict front views of an aircraft in takeoff and forward flight modes according to an embodiment of the invention;

FIGS. 25A-25C are perspective, top, and front views of an aircraft in vertical flight mode according to an embodiment of the invention;

FIGS. 25D-25F are perspective, top, and front views of the aircraft of FIGS. 25A-25C in a forward flight configuration according to embodiment of the invention;

FIGS. 26A-26C are top views of an aircraft and close-up portions thereof according to an embodiment of the invention.

DETAILED DESCRIPTION OF PREFERRED EMBODIMENTS

Figure 1A:
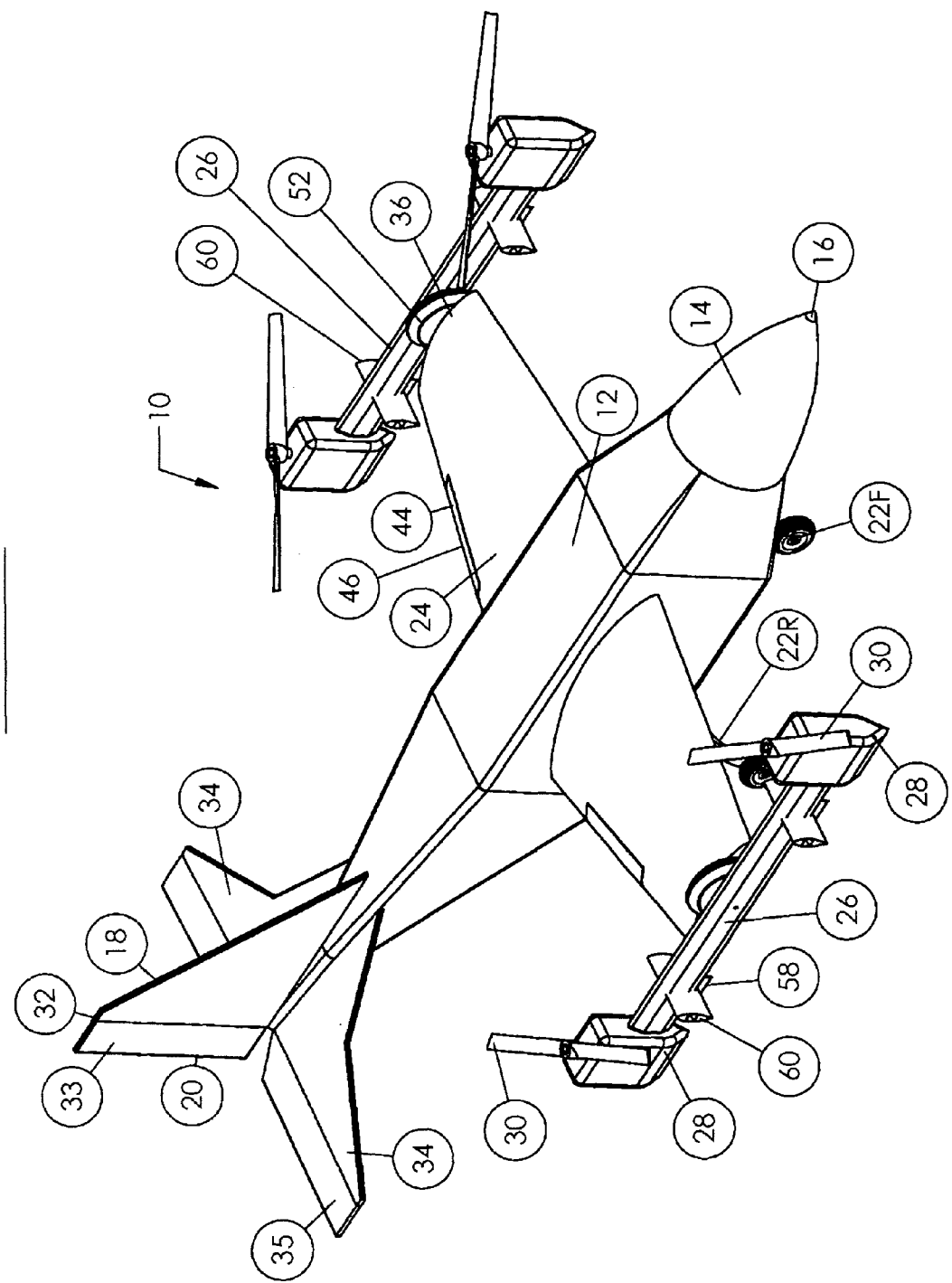
FIGS. 1A-1D are perspective, front, side, and top views of a vehicle according to an embodiment of the invention.
Figure 1B:
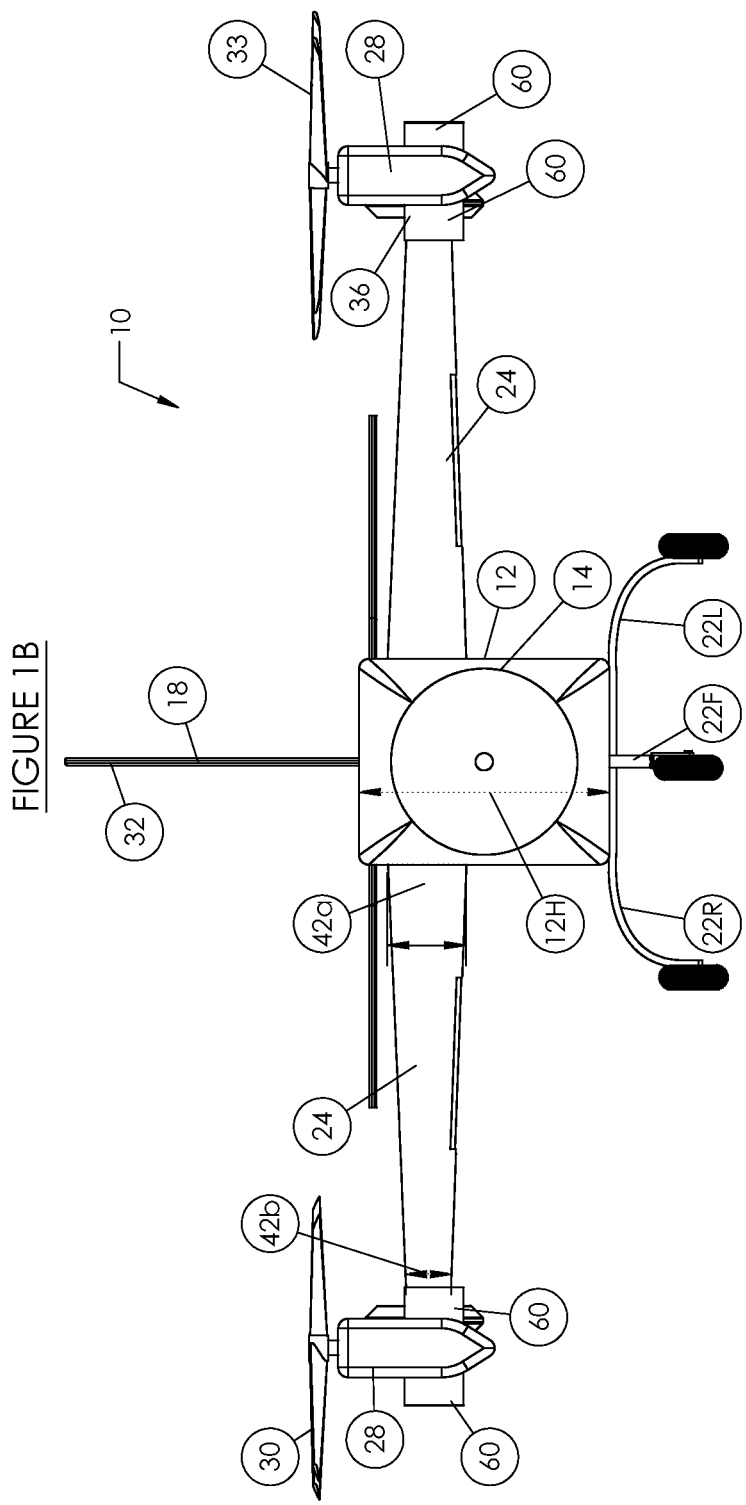
Figure 1C:
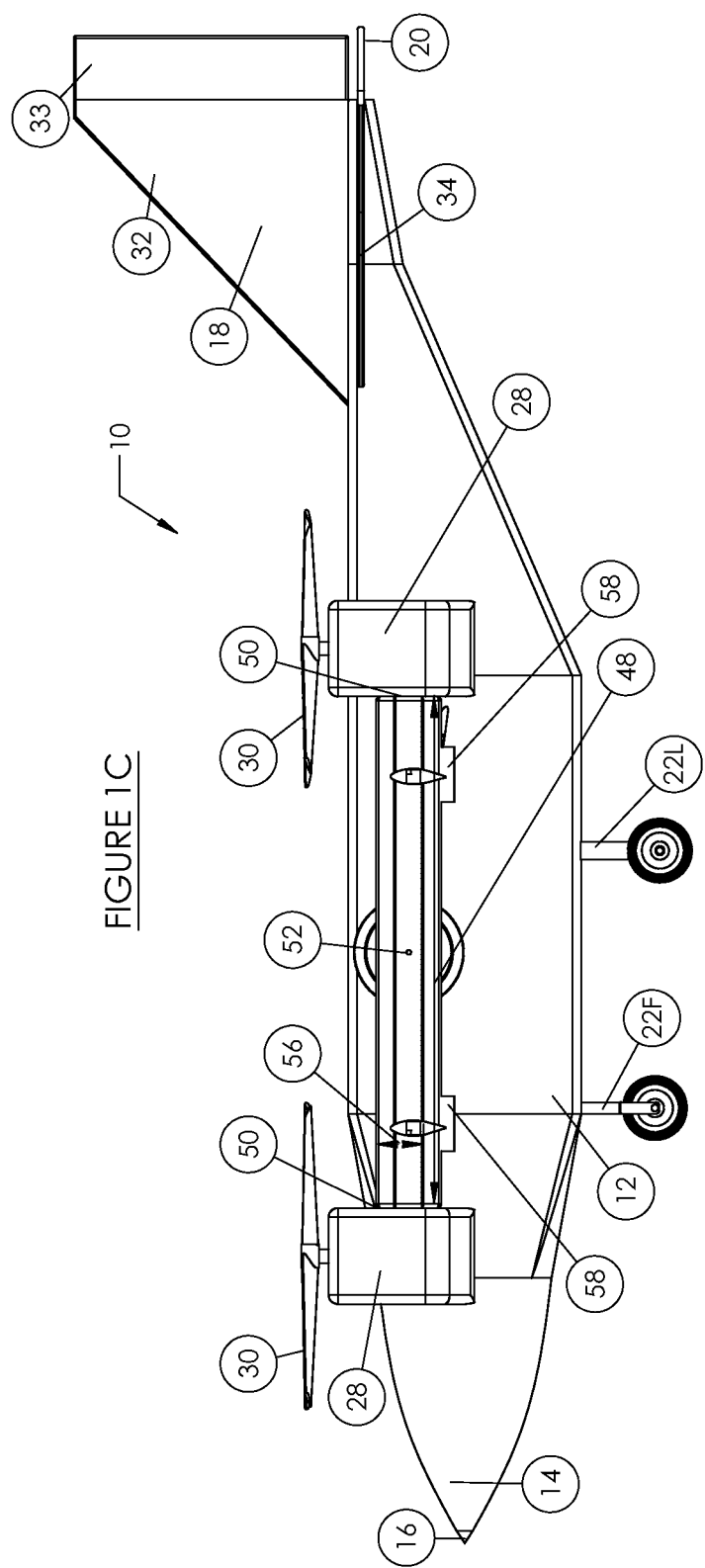
Figure 1D:
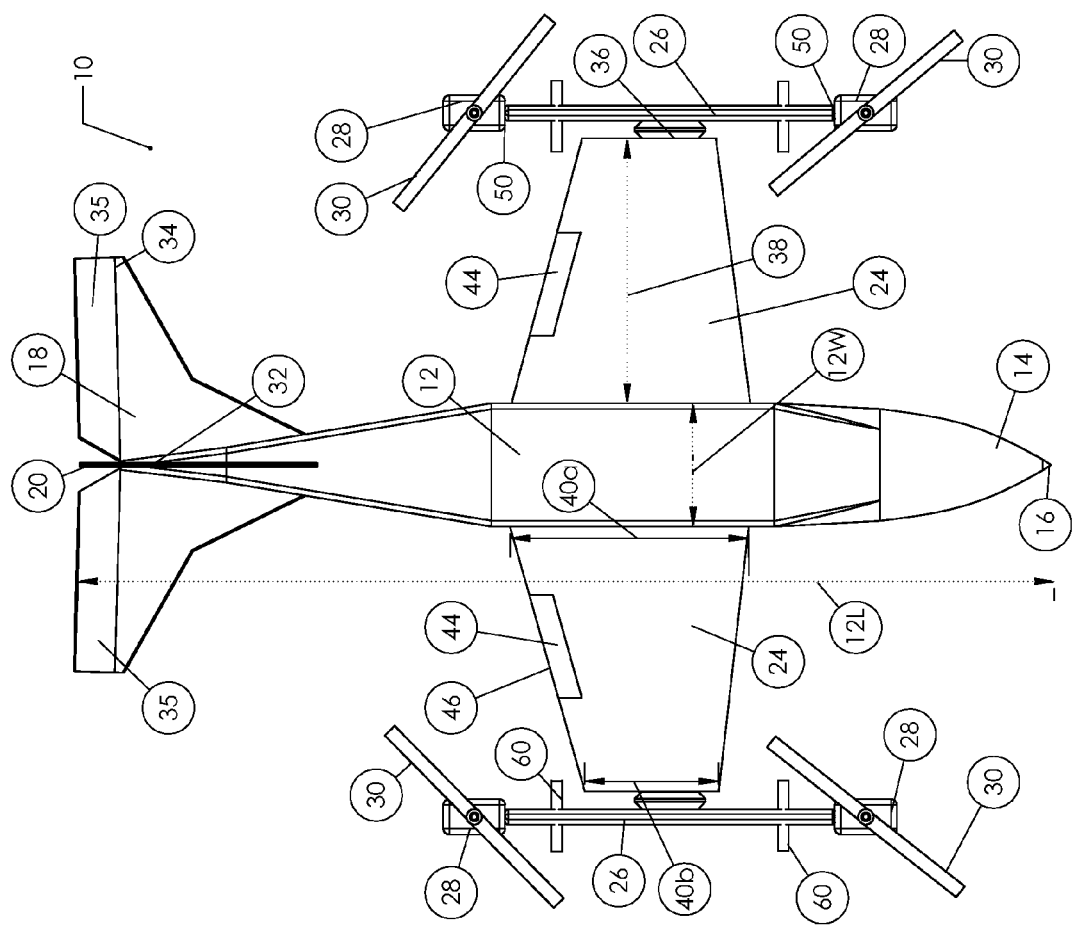

FIGS. 1A-1D depict an aircraft 10 according to the invention. The aircraft 10 includes a fuselage 12, nose 14 positioned at the aircraft front 16, tail assembly 18 positioned at the aircraft rear 20, landing gear (front 22F, left 22L, right 22R), wings 24, propeller supports 26, engines 28, and propellers 30.

The fuselage 12 can be of various sizes, with the specific size dependent on the particular application, including characteristics such as payload, range, speed, etc. In one embodiment of the invention, the fuselage has a length 12L (nose to tail), a width 12W, and a height 12H. Some or all of the landing gear 22F, 22L, 22R may retract into the fuselage 12.

The tail assembly 18 comprises a vertical stabilizer 32 and horizontal stabilizers 34. The vertical stabilizer may be configured to rotate left or right, and/or may include a vertical stabilizer flap 33. In the particular embodiment depicted, the horizontal stabilizers 34 are generally in line with the plane of the wings 24. The horizontal stabilizers may be configured to rotate forward/backward with respect to the plane of the wings 24, and/or may include horizontal stabilizer flaps 35. The tail assembly 18 may be relatively small due to the performance characteristics of the aircraft 10.

Each wing 24 extends from the fuselage and terminates in a wingtip 36. In the particular embodiment depicted, the wing has a length 38 (fuselage to wingtip), with a chord length 40a adjacent the fuselage which tapers to a smaller chord length 40b at the wing tip 36. The wing has a thickness 42a (top to bottom) adjacent the fuselage which tapers to a thickness 42b at the wing tip 36. The wing 24 may have very little or no camber, and will generally not need to generate larger amounts of lift except at very high forward speeds. The wing 24 may include flaps 44 at its trailing edge 46, but the flaps will generally not need to be very large as compared with other vertical lift aircraft with wings. For example, the flaps 44 can constitute just 25%, 20%, 15%, 10%, or even 5% or less of the overall surface area of each wing 24.

A rotatable propeller support 26 is rotatably secured to each wingtip 36. The propeller support 26 has a length 48 between opposing ends 50, with an engine 28 and propeller 30 assembly secured to each opposing end 50. In the embodiment depicted, the propeller support 26 is secured to the wingtip 36 at a position 52 generally the same as the center of gravity of the combined propeller support/engine/propeller assembly. The propeller support length 48 may be sufficient to keep the propeller blades from extending substantially, or at all, over a portion of the wingtip 36 and/or wing 24, and thus to prevent substantial propwash from striking the wingtip 36 or other portion of the wing 24. The propeller support length 48 should be sufficient to prevent the blades of adjacent propellers from contacting each other. The propeller support 26 may have a generally narrow width 54 (side-to-side with respect to aircraft) in order to reduce drag, but may have a relatively large height/thickness 56 (top-to-bottom) in order to increase structural strength.

Rotation of the propeller support 26 can be achieved using an electric motor, hydraulic system, or other appropriate means for controlling the rotation of the propeller support 26. The aircraft 10 may be configured so that the propeller supports 26 on either side of the aircraft 10 must rotate together, or the aircraft 10 may be configured to permit the propeller supports 26 on either side to rotate independent of each other.

FIGS. 1A-1D depict the propeller supports 26 rotated to a position generally in planar alignment with, i.e., at 0 degrees rotation to, the chord 40 of the wings 24, which in the embodiment depicted is also in generally planar alignment with the length of the fuselage 12. This positioning of the propeller supports 26 positions the propellers 30 to direct the airflow downward with respect to the aircraft, thus providing upward thrust for the aircraft. This positioning is generally conducive to vertical flight, VTOL/VSTOL, and "hover" modes of aircraft operation.

Figure 2A:
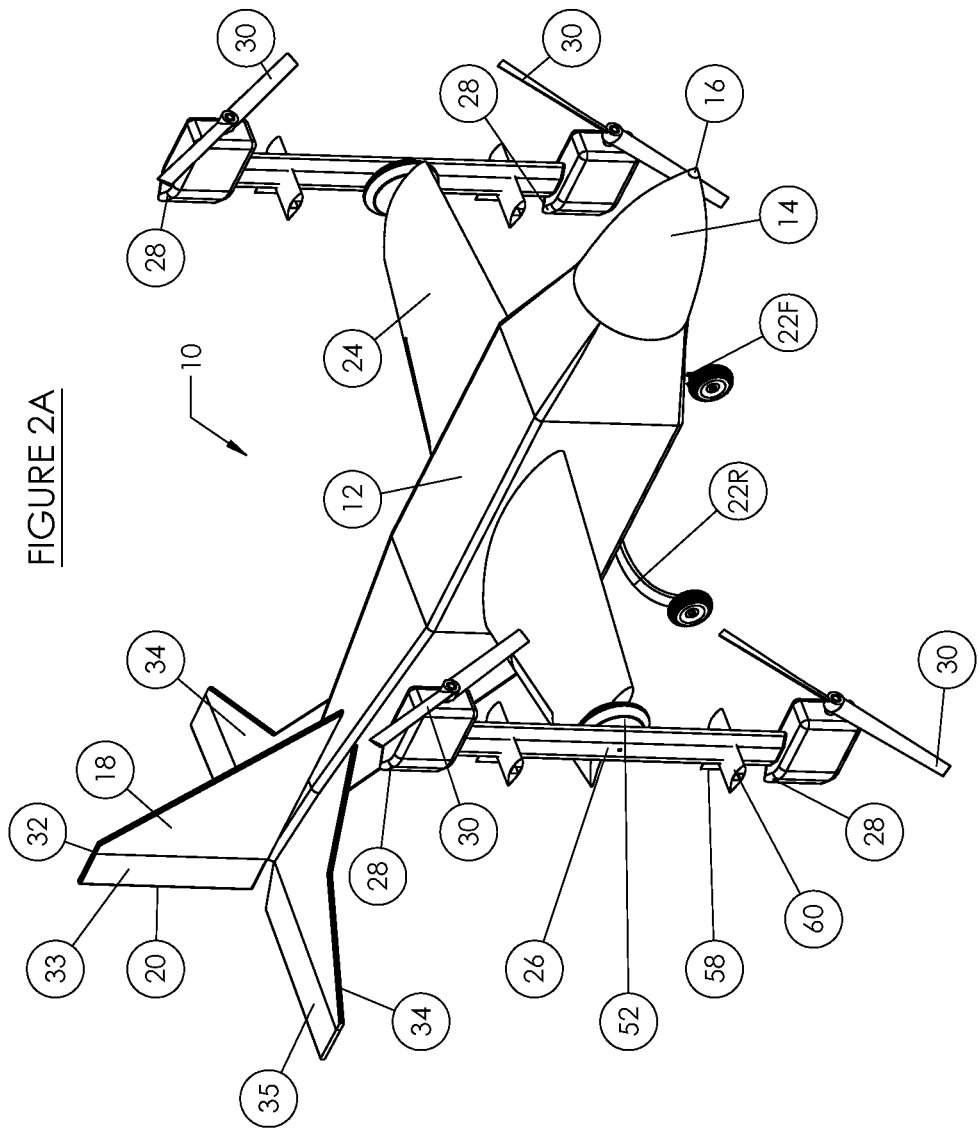
FIGS. 2A-2C are perspective, front, and side views of the aircraft of FIGS. 1A-1D with the propellers rotated forward for forward flight.
Figure 2B:
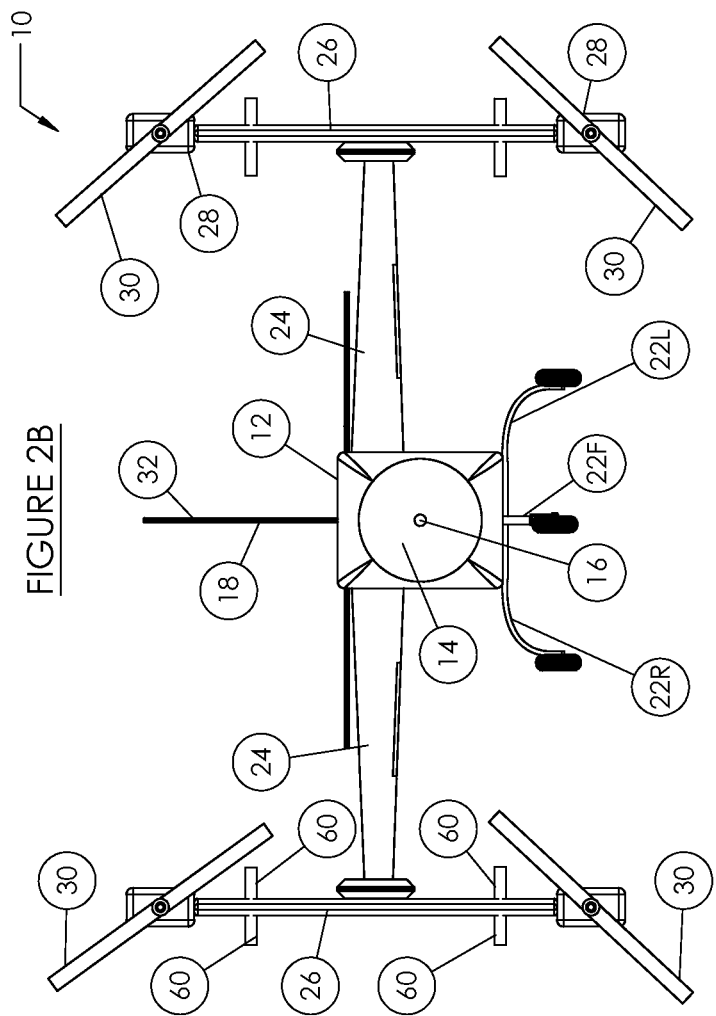
Figure 2C:
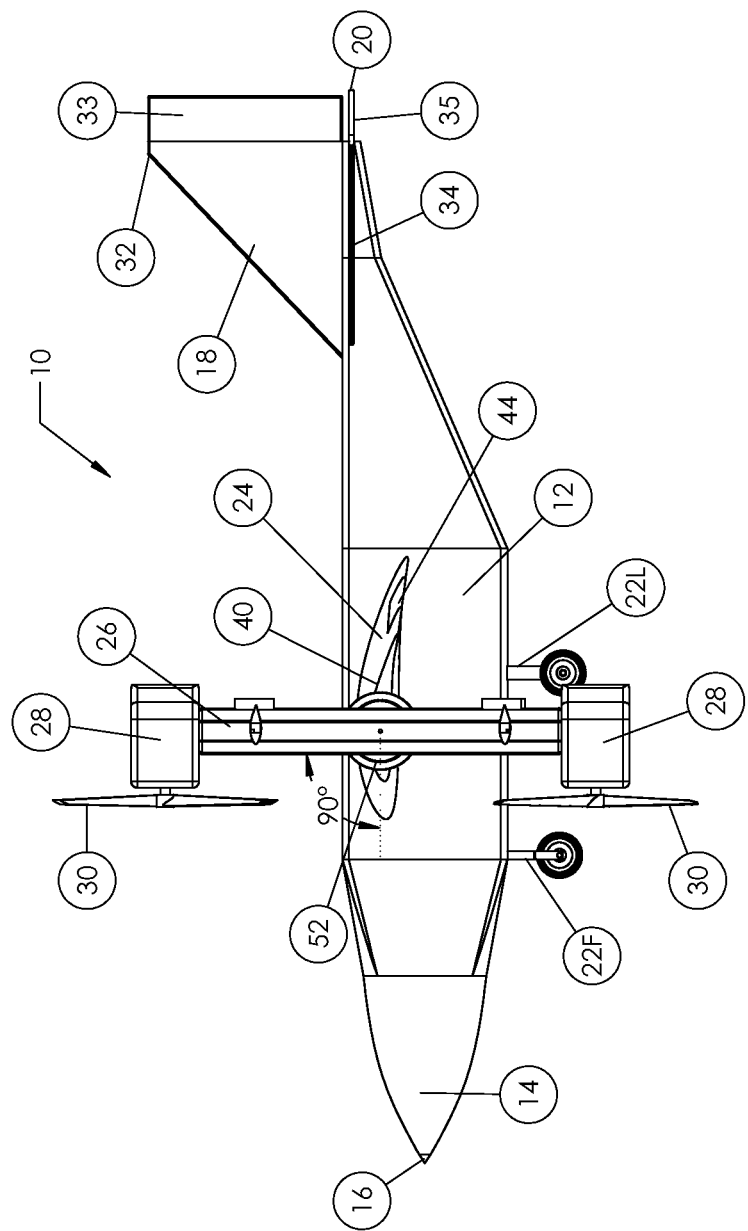
Figure 5A:
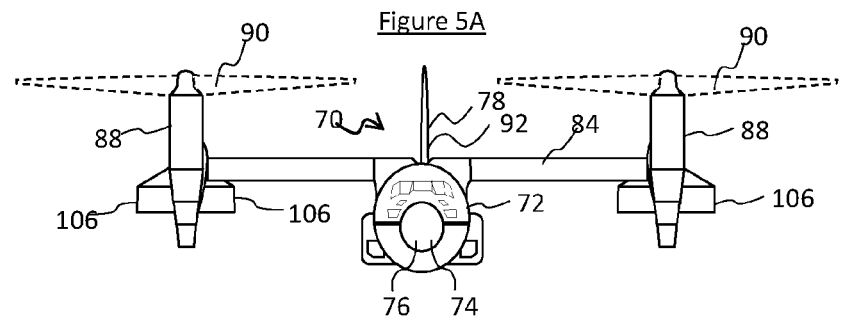
FIGS. 5A-5C are front, side, and top views of various configurations of an air vehicle according to an embodiment of the invention.
Figure 5B:
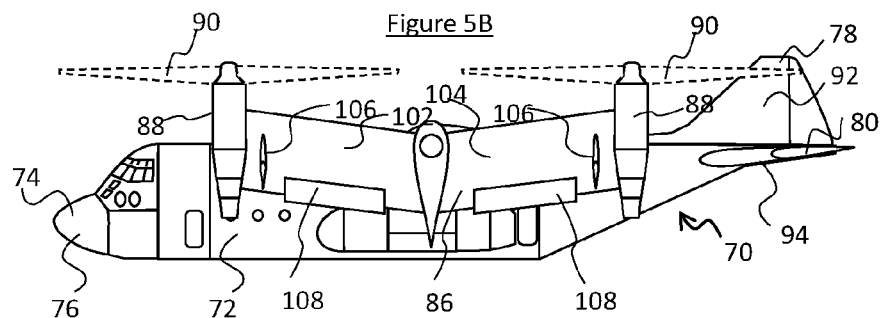
Figure 5C:
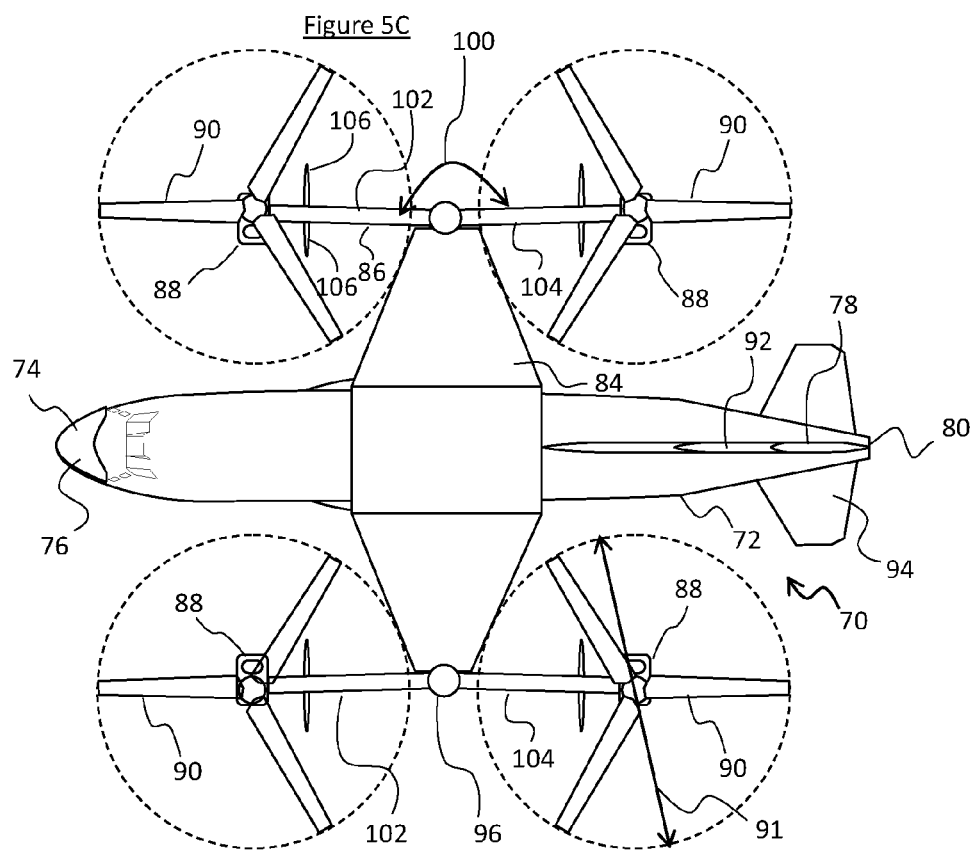

FIGS. 2A-2C depict the propeller supports 26 rotated to a position generally perpendicular to, i.e., at about 90 degrees to, the chord 40 of the wings 24. This positioning of the propeller supports 26 directs the wash from the propellers 30 rearward with respect to the aircraft, thereby providing forward thrust for the aircraft. This positioning is generally conducive to forward flight. Note that other angles of the propeller supports are also within the scope of the invention. For example, to minimize fuel consumption while still providing a very short takeoff, the propeller supports may be rotated slightly forward, e.g., to angles between 10 and 25 degrees, thereby providing upward as well as forward thrust. For such VSTOL operations, it is important that the propeller supports not be rotated so far forward that the propellers extend below the landing gear, as this could lead to the propellers coming into contact the ground before actual takeoff and/or landing. In a configuration such as that depicted in FIGS. 2A-2C, the wings 24 of the aircraft provide almost all of the lift (along with other lift from the tail structure and some small amount from the fuselage), while the propellers 30 are entirely vertical to provide forward thrust (and minimal, or even zero, lift).

In FIGS. 1A-1D and 2A-2C, the propeller supports 26 are aligned with each other, which can be useful for various flight modes and maneuvers. For example, slight forward rotation of both propeller supports 26 at the same time can pitch the aircraft forward, while slight backward rotation of the propeller supports 26 can pitch the aircraft 10 backward.

Depending on the particular embodiment and mode of operation, the propeller supports may be rotated independently of each other to different angles. For example, as depicted in FIG. 3, one propeller support 26A could be rotated slightly forward at an angle 27 (measured with respect to the wing chord and/or fuselage), with the other propeller support (not shown) rotated slightly backward. The resulting positioning of the propellers results in slight forward thrust at the near (left in FIG. 3) wingtip, with slight rearward thrust at the opposing wingtip, which can induce yaw of the aircraft in a desired direction of rotation. Varying the angles of the propeller supports can thus be used to induce or otherwise control the yaw of the aircraft, i.e., the rotation of the aircraft about a vertical axis, such as may be desired in vertical flight/hover operations.

In the particular embodiment depicted in FIGS. 1A-1D, the propeller supports 26 include additional control surfaces in the form of vanes 58 and fins 60. FIGS. 4A-4D depict close-up views of the vanes 58 and fins 60.

Vanes 58 extend from the bottom of the propeller supports 26, and can swing side-to-side at different angles to deflect the airflow to either side with respect to the propeller supports 26. When the aircraft is in the vertical flight/"hover" mode with the propeller supports 26 generally aligned with the wing chords and/or fuselage of the aircraft, the vanes 58 can be swung slightly sideways (i.e., with the trailing edge of the vanes 58 shifted sideways) to divert some of the airflow from the propellers slightly sideways, thus providing some amount of side thrust in the opposite direction in which the vanes are swung. Such controlled side thrust could be used to move the aircraft slightly sideways from its current position while still maintaining the vehicle in a general hover mode, to compensate for wind gusts that might otherwise shift the aircraft sideways, and/or to achieve a stable and controlled roll of the aircraft. For example, the vanes 58 could be swung toward the direction of a desired roll in order to achieve such a controlled roll maneuver. The vanes 58 could all be swung together in a similar fashion (i.e., same directions and same angles), or one or more (e.g., all) vanes could be independently swung to different angles and/or in different directions. For example, the aircraft could be yawed (rotated about its vertical axis) by swinging the forward-most vanes 58 of the aircraft in a first direction and angle(s) (thereby providing sideways thrust to the front of the aircraft), while simultaneously having the rear-most vanes of the aircraft either remain in their un-swung position (i.e., in generally vertical configuration) or be swung in a direction opposite to the swinging of the forward-most vanes (thereby providing sideways thrust to the rear of the aircraft, but in the opposite direction to the sideways thrust provided to the front of the aircraft). The result would be that the front of the aircraft would be pushed/pulled to one side, while the rear of the aircraft would be pushed/pulled to the opposite side, so that the aircraft would yaw or otherwise swing in a horizontal plane while still maintaining general hover mode. The vanes 58 could also be rotated to provide general aircraft control and balance, such as by swinging to counteract wind gusts or to counteract disparities in thrust between engines/propellers on the aircraft.

During forward flight, e.g., with the propeller support arms rotated to their forward-most position such as that depicted in FIGS. 2A-2C, the vanes 58 could be swung for improved aircraft control and maneuverability, such as to provide for turns without banking the aircraft. For example, the vanes 58 on one or both side of the aircrafts (i.e., the vanes on the left side propeller support arm and/or on the right side propeller support arm) could be swung to move their trailing edges sideways with respect to the aircraft, thus pulling/pushing the aircraft somewhat to one side, which could be used to provide for aircraft turns without banking the aircraft. Other maneuvers could also be produced using the vanes 58, either alone or in combination with other aircraft elements (e.g., engine power, propeller support arm position, flap positions, stabilizer flap positions, etc.). For example, vanes 58 at the top arm portions of the aircraft (e.g., on the most upward portions of the left and right propeller support arms) could be swung somewhat to the left (or to the right), while simultaneously having the vanes 58 on the lowermost arm portions of the aircraft either remain in their unswung position or be swung slightly to the right (or to the left—whichever is opposite to the swinging of the vanes 60 on the opposing arm portions). The result is that the vanes 58 pull/push the top of the aircraft to one side, while simultaneously either (a) remaining neutral on the bottom portion of the aircraft or (b) pulling/pushing the bottom portion of the aircraft to the opposite side. The aircraft could thus use swinging of the vanes 58 (either alone or in combination with propeller thrust control, support arm rotation, conventional flap/control surfaces operation, etc.) to achieve turns and/or spinning maneuvers, and also to compensate for uneven lift generated on different sides of the aircraft by the wings and/or engines.

As an alternative, or in addition, to the ability to swing side-to-side, one or more of the vanes 58 may include vane flaps 62 at its lower trailing edge 64. Diverting the vane flaps 62 to one side would deflect the airflow somewhat to that side, so that diverting a vane flap 62 in one direction would have a similar effect to swinging the vane flap 60 to move its trailing edge in that same direction.

Fins 60 extend from the sides of the propeller supports 26. Fins 60 can rotate through different angles to deflect the airflow passing over the propeller supports 26 to enhance control of the aircraft. Rotation of the fins 60 can deflect the airflow passing over the propeller supports 26. For example, when the aircraft is in the vertical flight/"hover" mode with the propeller supports 26 generally aligned with the wing chords and/or fuselage of the aircraft, the fins can be rotated slightly forward (i.e., towards the nose of the aircraft). Such forward rotation of the fins can cause the aircraft nose to pitch forward. Turning the fins backward can cause the aircraft to pitch backward. Such controlled forward thrust could also be used to move the aircraft slightly forward from its current position while still maintaining the vehicle in a general hover mode. Similarly, rotating the fins slightly rearward would divert some of the airflow forward, thus providing some amount of rearward thrust. Such controlled rearward thrust could be used to move the aircraft slightly backward from its current position while still maintaining the vehicle in a general hover mode. The fins could also be rotated to achieve other flight maneuvers while in general hover mode. For example, the aircraft could be yawed (rotated about its vertical axis) by rotating the fins 60 on one side of the aircraft (i.e., on one of the propeller support arms) to a forward position (thereby providing forward thrust to that side of the aircraft) while simultaneously having the fins on the opposite side of the aircraft either remain in their unrotated position (i.e., in generally vertical configuration) or be rotated slightly backward in order to provide some amount of rearward thrust to that side of the aircraft. The result would be forward thrust to one side of the aircraft, with rearward (or no) thrust to the other side of the aircraft, so that the aircraft would yaw or otherwise swing in a horizontal plane while still maintaining general hover mode. The fins 60 could also be rotated to provide general aircraft control and balance, such as by rotating to counteract wind gusts or to counteract disparities in thrust between engines/propellers on the aircraft.

During forward flight, e.g., with the propeller support arms rotated to their forward-most position such as that depicted in FIGS. 2A-2C, the fins 60 could be rotated for improved aircraft control and maneuverability. For example, the fins 60 could be rotated to move their leading edges downward with respect to the aircraft, thus pulling/pushing the aircraft somewhat downward. The fins 60 could be rotated to move their leading edges upward, thus pulling/pushing the aircraft somewhat upward. Fins 60 on one side of the aircraft (e.g., on the left propeller support arm) could be rotated somewhat upward (or downward), while simultaneously having the fins 60 on the opposite side of the aircraft either remain in their unrotated position or be rotated slightly downward (or upward—whichever is opposite to the rotation of the fins 60 in the opposing side of the aircraft). The result is that the fins 60 pull/push one side of the aircraft up (or down) while simultaneously either (a) remaining neutral on the other side of the aircraft or (b) pulling/pushing the other side of the aircraft down (or up, whichever is opposite to the pull/push applied to the other side of the aircraft). The aircraft could thus use rotation of the fins 60 (either alone or in combination with propeller thrust control, support arm rotation, conventional flap/control surfaces operation, etc.) to achieve banked turns and/or spinning maneuvers, and also to compensate for uneven lift generated on different sides of the aircraft by the wings and/or engines.

As an alternative, or in addition, to the ability to rotate, one or more of the fins 60 may include fin flaps 66 at its lower trailing edge 68. For example, diverting the fin flaps 66 rearward would deflect the airflow somewhat to the rear, so that diverting a fin flap 66 rearward would have a similar effect to rotating the entire fin 60 forward.

The various embodiments of the aircraft can control various aspects thereof to control the vehicle's flight. For example, the aircraft could control and/or vary, alone or in combination, any of the following: (a) the power and/or thrust of individual propellers; (b) the propeller support arm positions; (c) the positions of the vanes and/or fins; and (d) the positions of other control surfaces, such as the vertical and/or horizontal stabilizers, wing trailing edge flaps, etc. For example, the 4 individual propellers could be used to balance the aircraft in hover mode by either pitch control of the individual propeller blades and/or by varying the power provided to each propeller, e.g., by controlling the RPMs of the propeller by increasing/decreasing the current provided to electrical engines or increasing/decreasing fuel provided to fuel-drive engines. Roll control could be achieved by providing increased/decreased power to the propellers on one side of the aircraft (e.g., the right side) with respect to the power provided to the propellers on the opposite side of the aircraft. Yaw control could be achieved by speeding up one diagonal pairing of engines (which, in one embodiment of the invention, both rotate in the same direction, e.g., clockwise), while simultaneously slowing down (in an equivalent amount) the rotation of the other diagonal pair of engines, which, in an embodiment of the invention, both rotate in the opposite (e.g., counterclockwise) direction to first diagonal pairing of engines (wherein diagonal pairs are engines which are diagonally opposite from each other across the square pattern formed when the engines are positioned as viewed from above in an embodiment such as that depicted in FIG. 1D). This provides the same overall lift to the vehicle, but permits the aircraft to yaw in a desired direction as the torque is changed.

FIGS. 5A-5C and FIGS. 6A-6B depict a large aircraft 70 according to an embodiment of the invention. The aircraft 70 may be used for heavy transport purposes, and can have dimensions similar to that of a C-130. The aircraft 70 includes a fuselage 72 having a length 73 extending from the nose 74 at the front 76 of the aircraft 70 to the tail assembly 78 at the aircraft rear 80. Landing gear (not shown) is retracted into the aircraft for flight, but can be extended for takeoff/landing. Wings 84 extend from the fuselage 72, with propeller supports 86 secured to the wingtips 96.

The propeller supports 86 are similar in size, shape, and structure to the wings of a V-22 Osprey, with engines 88 mounted at the ends thereof to drive the propellers 90. The propeller supports 86 have sufficient length to provide a distance 87 between the propeller centers of about 46 feet. The propellers 90 define a propeller diameter 91 of about 38 feet. The overall length 89 of a propeller support/engine/propeller assembly (i.e., at the extreme tips of opposing propellers on a single propeller support) is on the order of 85 feet.

The aircraft 70 includes a tail assembly 78 having a vertical stabilizer 92 and horizontal stabilizers. Because the cross-shafted engines can provide additional stability to the aircraft 70, the tail assembly 78 may be somewhat smaller than the tail assembly on a typical C-130.

The wings 84 extend from the fuselage 72 to the wingtip 96 with a length 98. The wings 84 are generally short in length 98 and have a relatively long chord 99, which shortens from a chord 99a adjacent to the fuselage 72 to a chord 99b adjacent the wingtip 96.

The particular propeller support 86 depicted is not a straight line along its entire length, but instead defines an angle 100 between its forward 102 and rearward 104 sections. The propeller support 86, which is itself a lifting body, includes fins 106 extending from the sides of the propeller support 86, with vanes 108 extending from the trailing edge of the propeller support 86. The fins 106 and vanes 108 help to control (and in some cases maintain the smoothness of) the airflow across the propeller supports 86. Each fin 106 can rotate about an axis passing generally parallel to the length of the wings, and can thus provide fine control for the forward, backward, and yaw motions of the aircraft during vertical/hover flight operations. The vanes 108 can swing side-to-side, and thus be used to provide fine control of the side-to-side, roll, and yaw of the aircraft 70.

The operation of a vehicle according to an embodiment of the invention includes take-off operations, which can be VTOL, STOL, or more conventional take-off modes. For VTOL takeoff, the propeller support arms would be positioned generally parallel to ground, which in the embodiments depicted is also generally parallel to the aircraft fuselage as well as generally parallel to the chord lines of the wings. Power would be provided to drive the propellers, with power being adjusted to maintain the vehicle in a generally level configuration as it takes off from the ground. All lift necessary for the takeoff would thus be provided by the propellers, and the wings would not provide substantial lift until the transition to forward flight mode. The fins and vanes on the propeller support arms could be adjusted to assist in maintaining the aircraft balance.

For VSTOL takeoff (which may save on fuel and also permit heavier takeoff weights than pure VTOL takeoffs), the propeller support arms can be tilted slightly forward from their horizontal position. Power is supplied to drive the propellers, with power being adjusted to maintain the aircraft in a balanced configuration. The propellers in such a configuration provide forward thrust to move the aircraft forward while also providing vertical thrust to lift the aircraft.

For more conventional takeoffs, similar to that of conventional (non-VTOL/VSTOL aircraft), the propeller support arms could be tilted as far forward as possible without risking the propellers contacting the ground. An example of such a configuration is depicted in FIGS. 8A and 8B. Power can be applied to the propellers to provide forward thrust to the aircraft, with the aircraft taking off from a runway or other appropriate surface in a conventional manner—i.e., with the wings providing the lift while the propellers provide forward thrust.

Figures 7A, 7B:
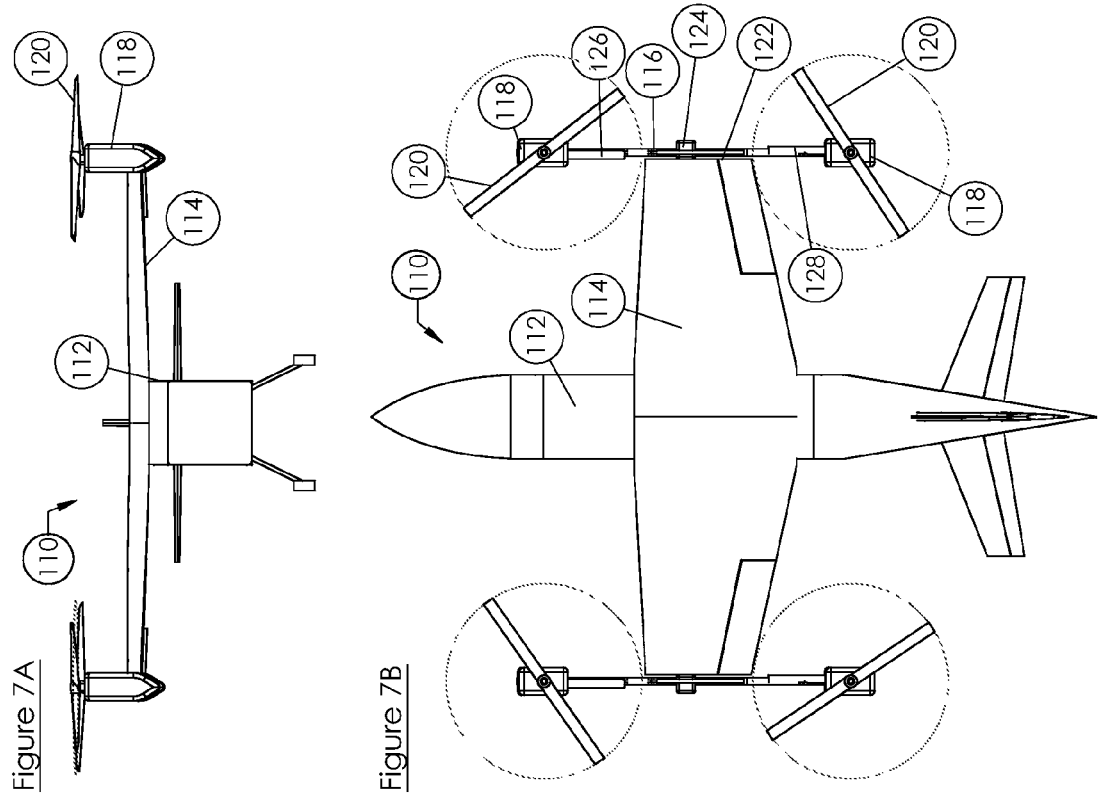
FIGS. 7A-7B are front and top views of various configurations of an air vehicle according to an embodiment of the invention.

FIGS. 7A-7B and 8A-8B depict a further embodiment of an aircraft 110 according to an embodiment of the invention. The aircraft 110 includes a fuselage 112, wings 114, propeller supports 116, engines 118, and propellers 120. FIGS. 7A-7B depict the aircraft 110 in hover/vertical flight mode, with the propeller supports 116 generally parallel to the fuselage 112. The propeller supports 116 are secured to the wingtips 122 via a joint/hinge assembly 124 which permits the propeller supports 116 to be rotated forward and at the same time to permit the rearward sections 126 of the propeller supports 116 to be extended outward while the forward sections 128 of the propeller supports 116 to be extended inward with respect to the fuselage 112. As depicted in FIG. 8A, the resulting positioning of the propellers 120 maintains the propellers 120 well above the lowest portion of the deployed landing gear 130, so that the aircraft 110 can takeoff and land in both the horizontal/hover configuration of FIGS. 7A-7B as well as the forward flight configuration of FIGS. 8A-8B.

Figure 9B:
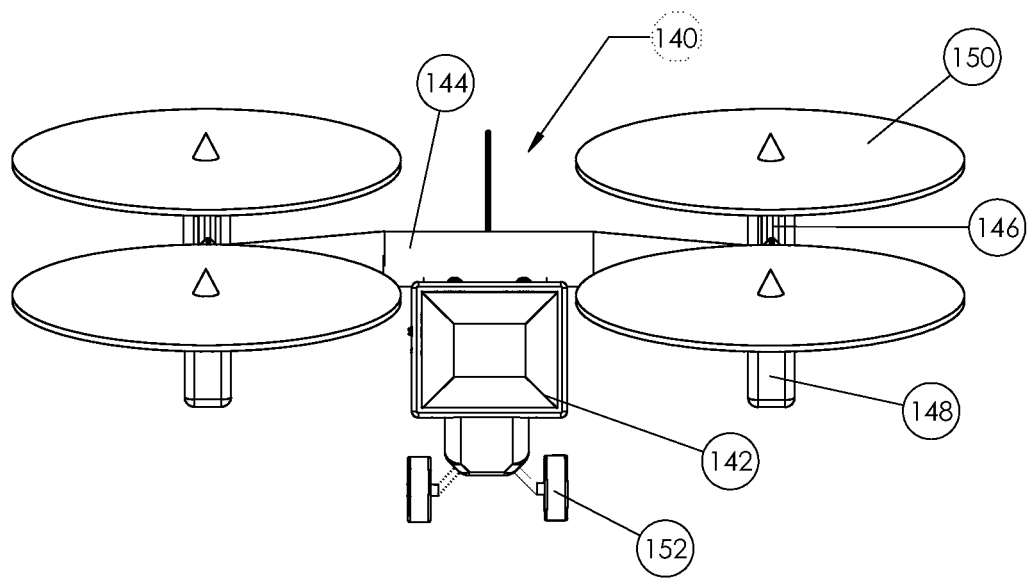
Figure 9D:
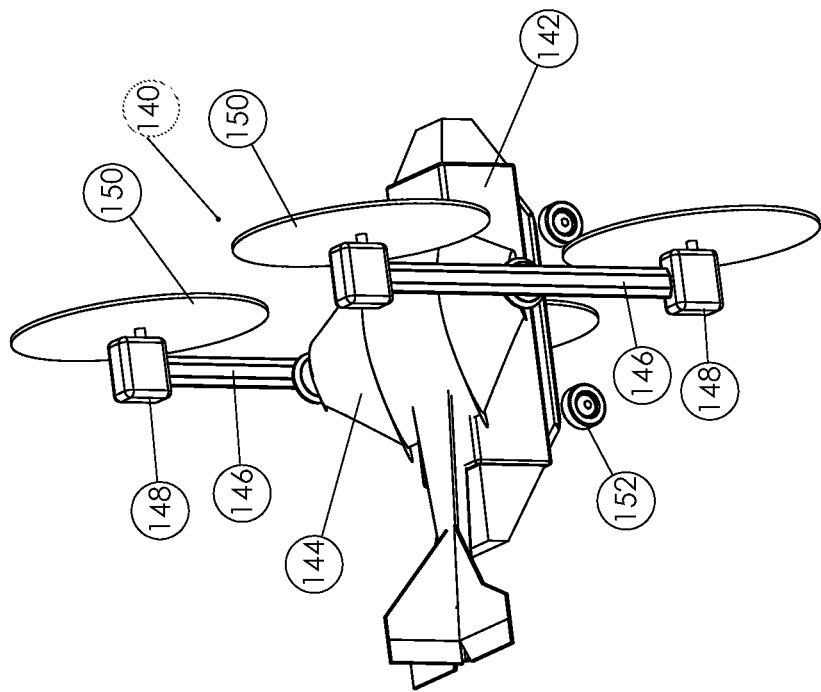
Figure 9C:
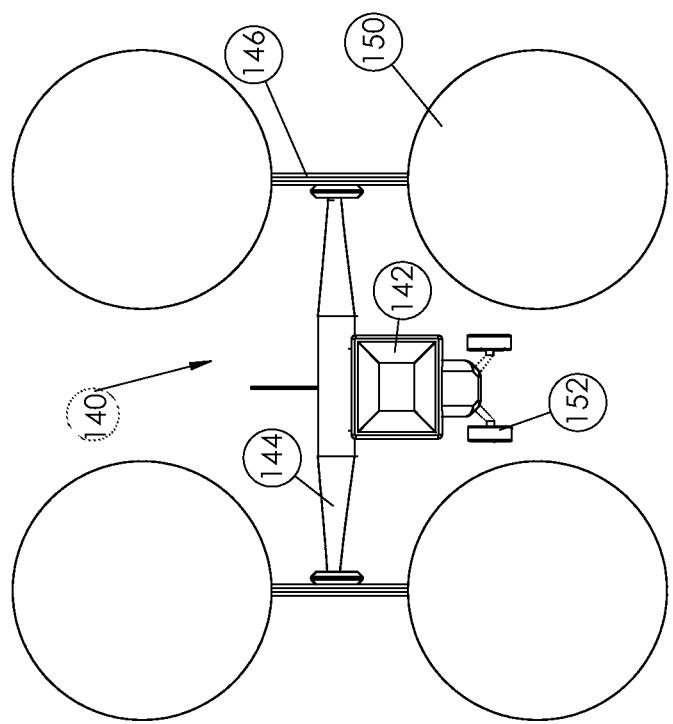

FIGS. 9A-9D depict an aircraft 140 according to a further embodiment of the invention. The aircraft 140 includes a fuselage 142, wings 144, propeller supports 146, engines 148, and propellers 150. The aircraft 140 includes wheels 152 which can serve as landing gear as well as transport for the aircraft 140 on- and off-road. The aircraft 140 may include a drive system (not shown) configured to power the wheels 152 to drive the aircraft 140 on the ground. The drive system for the wheels 152 may be the same as, or separate from, the engines 148 which drive the propellers 150. FIG. 9A depicts the aircraft 140 with the propeller supports 146 in the vertical flight/hover configuration, with the propeller supports 146 generally parallel to the fuselage 142. FIG. 9B depicts the aircraft 140 with the propeller supports 146 in a VSTOL and/or transition configuration, with the propeller supports rotated forward at about 15 degrees from the fuselage 142. FIGS. 9C-9D depict the aircraft 140 with the propeller supports 146 in the forward flight configuration, with the propeller supports 146 generally perpendicular to the fuselage 142.

Figure 10A:
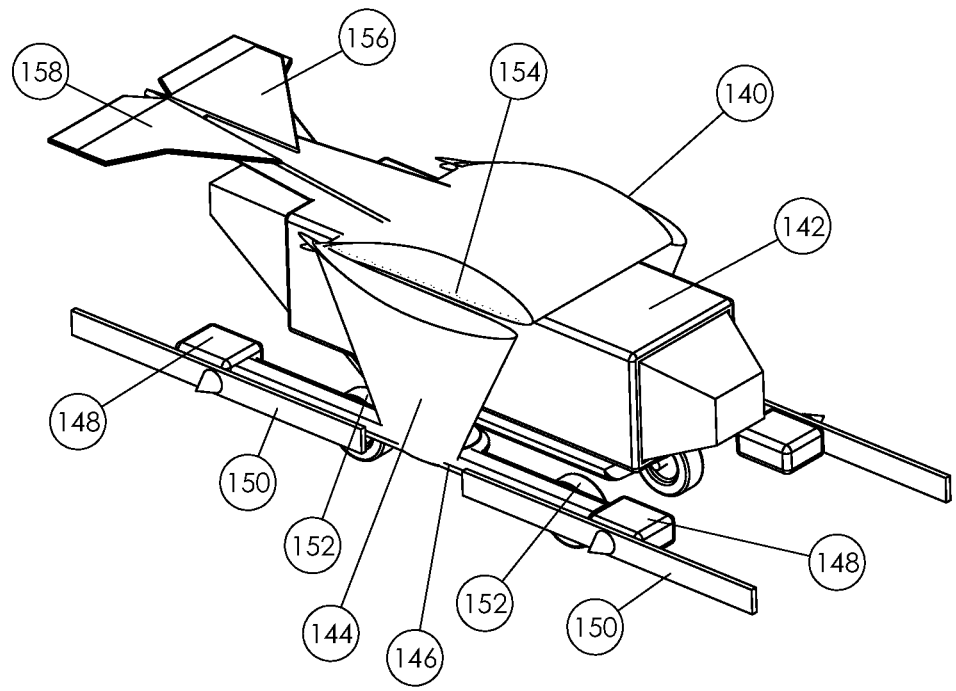
FIGS. 10A and 10B are perspective and front views of the air vehicle of FIGS. 9A-9D with the wings stowed for ground travel.
Figure 10B:
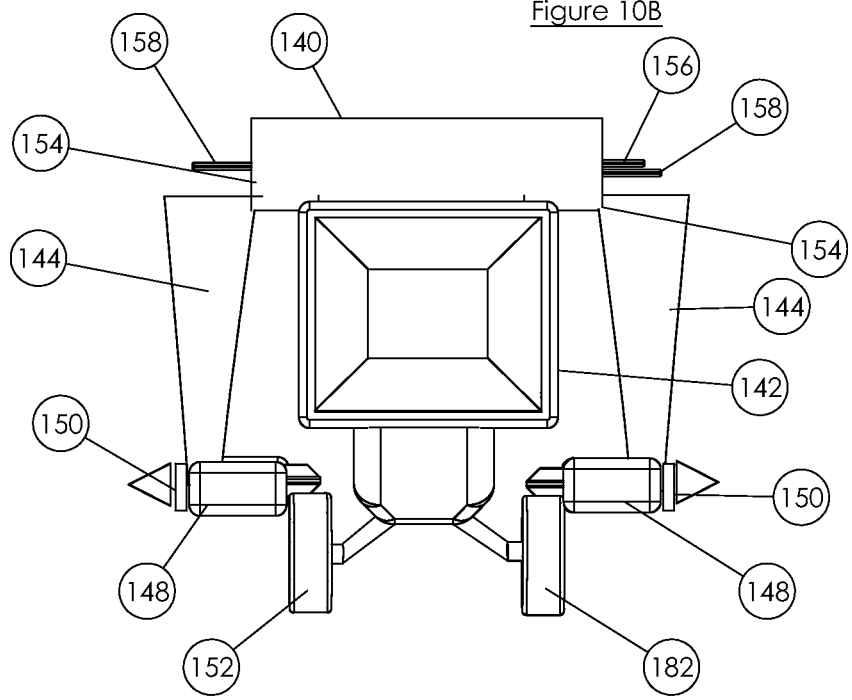

FIGS. 10A-10B depict the aircraft 140 of FIGS. 9A-9D, but with the wings 144 folded for transport and/or ground travel. The wings 144 fold at a hinge 154, with the folded wings 144 positioning the propeller supports 146, engines 148, and propellers 150 down and adjacent the wheels 152. The propellers 150 are positioned parallel to the ground for maximum ground clearance. The aircraft 140 may be configured so that one or more of the engines 148 engage with and drive (via gears, driveshafts, etc.) one or more of the wheels 152 in ground operations. Note that the vertical stabilizer 156 is folded down against the horizontal stabilizers 158, providing improved vertical clearance for road travel as well as reduce profile for transport (e.g., if the aircraft 140 is to be transported in a relatively large transport aircraft, etc.).

In a further embodiment of the invention depicted in FIGS. 11A-11B, an aircraft 160 includes a fuselage 162, wings 164, propeller supports 166, engines 168, and propellers 170. FIG. 11A depicts the aircraft 160 with the propeller supports 166 positioned generally perpendicular to the fuselage 162 and wing chord line for forward flight. The aircraft includes winglets 172 which extend past the rotatable propeller supports 166. The winglets 172 provide extra lift, which can allow for higher takeoff weights, support longer flight times, and permit the aircraft to operate at increased altitudes. The winglets 172 may be configured to remain fixed with respect to the aircraft/wings as the propeller supports 166 are rotated from horizontal to vertical positions, so that the winglets 172 remain in general alignment with the plane of the wings 164 regardless of the propeller support rotation. Alternatively, the winglets 172 may be configured to rotate with the propeller supports 166, so that the winglets 172 are generally vertical during VTOL or VSTOL and are turned more horizontal during forward flight. As depicted in FIGS. 11B, the winglets 172 may be configured to swing backward about a hinge 174 for storage, or during high-speed forward flight where less wing area is required to generate lift.

Figure 12A:
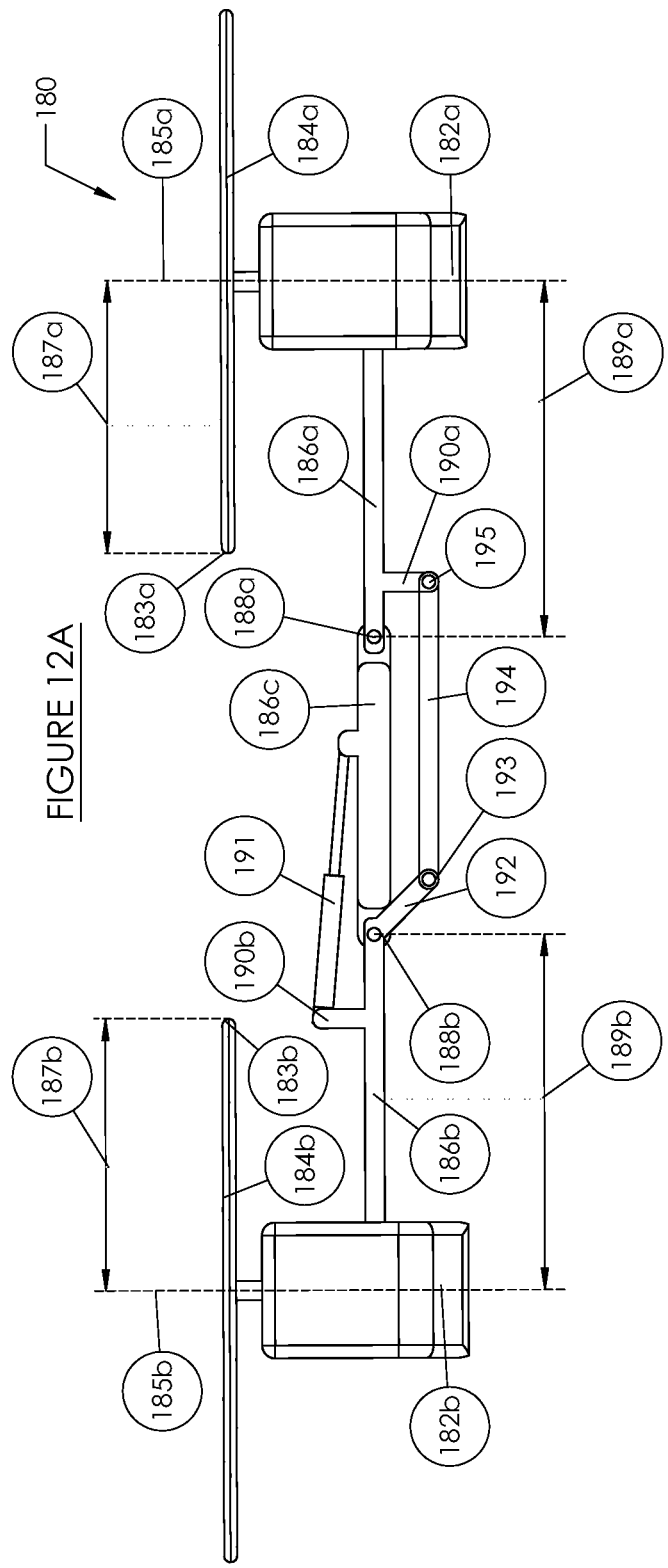
FIGS. 12A and 12B are side views of an engine support structure according to an embodiment of the invention.
Figure 12B:
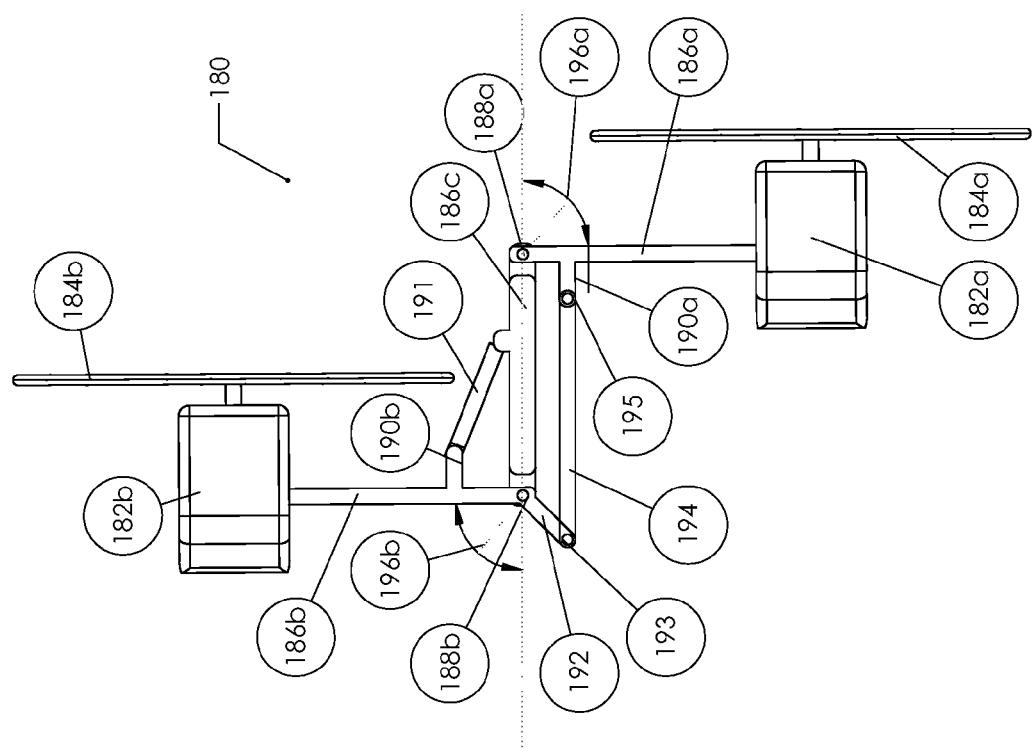

FIGS. 12A and 12B depict a further embodiment of a propeller support 180 for use with embodiments of the invention, including the embodiments discussed elsewhere herein. The propeller support 180 holds a forward engine 182a and forward propeller 184a, and a rearward engine 182b and rearward propeller 184b. The propeller support 180 includes three sections—forward 186a, rearward 186b, and central 186c. The forward propeller support section 186a is secured to the central section 186c via a hinge assembly 188a which permits the forward support section 186a to swing with respect to the plane of the central section 186c. Similarly, the rearward propeller section 186b is secured to the central section 186c via a hinge assembly 188b which permits the rearward support section 186b to swing with respect to the plane of the central section 186c. In FIG. 12A, the forward and rearward support sections 186a, 186b are in general alignment with the plane of the central section 186, but in FIG. 12B the forward and rearward sections 186a, 186b are swung out of alignment with the central section 186c. To control the angle of the rearward support section 186b, an actuator 191, which in the embodiment depicted is a hydraulic arm, is secured to the central section 186c and to a lever arm 190b fixedly secured at the rearward support section 186b. Note that other options to, or in addition to the hydraulic arm include cable assemblies, belt assemblies, gearboxes, electric actuators, etc. that can be linked to the engine supports so as to allow controlled actuation in the full range of motion. The hydraulic arm is retracted to pull the rearward support section 186b out of alignment with the plane of the center support section 186c. The rearward support section 186b includes a linkage arm 192 (which is rigidly secured to and/or forms a rigid portion of the rearward support section 186b). The linkage arm 192 is secured via a rear hinge 193 to a linkage bar 194, which is in turn secured via a front hinge 195 to a lever arm 190a of the forward support section 186a. Accordingly, rotational movement of the rearward support section 186b and its linkage arm 192 with respect to the central support section 186c is translated, via the linkage bar 194, to the forward support section 186a and its lever arm 190a. For example, as depicted in FIG. 12B, rotation of the rearward support section 186b caused a corresponding rotation of the forward support section 186a, so that the forward and rearward support sections 186a, 186b are each rotated by 90 degrees away from the plane of the central support section 186c. This rotation of the respective support sections has the corresponding impact of rotating the respective propellers, so that the forward and rearward propellers 184*a*, 184*b* are rotated from the horizontal position of FIG. 12A to the vertical position of FIG. 12B. Note that, as discussed previously with other embodiments, the support arm and/or support arm section may be rotated to any desired angle to bring the propellers to any desired angle of attack.

FIGS. 12A and 12B depict one of the key features of the invention, which is the spacing of the propellers 184*a*, 184*b* being maintained during pivoting of the supports in order to keep the propellers away from other structures in order to provide "clear" air to the propellers and also to prevent propeller "wash" from striking aircraft structures. As depicted in FIG. 12A, the forward propeller 184*a* has an axis of rotation 185*a* and a blade tip 183*a*, with a blade radial length 187*a* extending therebetween. The propeller when it spins thus defines a disk area within the swinging blade tip. Similarly, the rearward propeller 184*b* has an axis of rotation 185*b* and a blade tip 183*b*, with a blade radial length 187*b* extending therebetween. Each propeller when it spins thus defines a disk area within the swinging blade tip. The support arms 186*a*, 186*b* rotate about pivot points 188*a*, 188*b*, with lengths 189*a*, 189*b* defined between propeller axes of rotation 185*a*, 185*b* and the respective pivot points 188*a*, 188*b*. The lengths 189*a*, 189*b* may be preferably longer than the blade radial lengths 187*a*, 187*b*, but in order to maximize thrust the blade radial lengths 187*a*, 187*b* may be a substantial portion of the lengths 189*a*, 189*b*. for example, blade radial lengths may be at least 70%, at least 80%, at least 90%, at least 95%, or even approaching 100% of the lengths 189*a*, 189*b*.

Figure 13A:
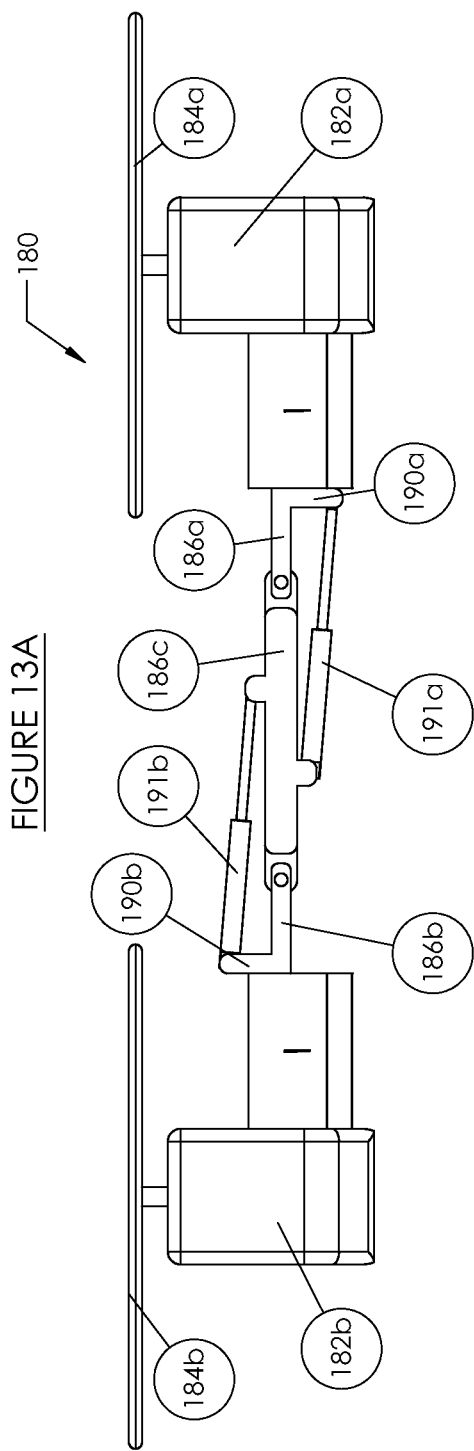
FIGS. 13A and 13B are side views of an engine support structure according to an embodiment of the invention.
Figure 13B:
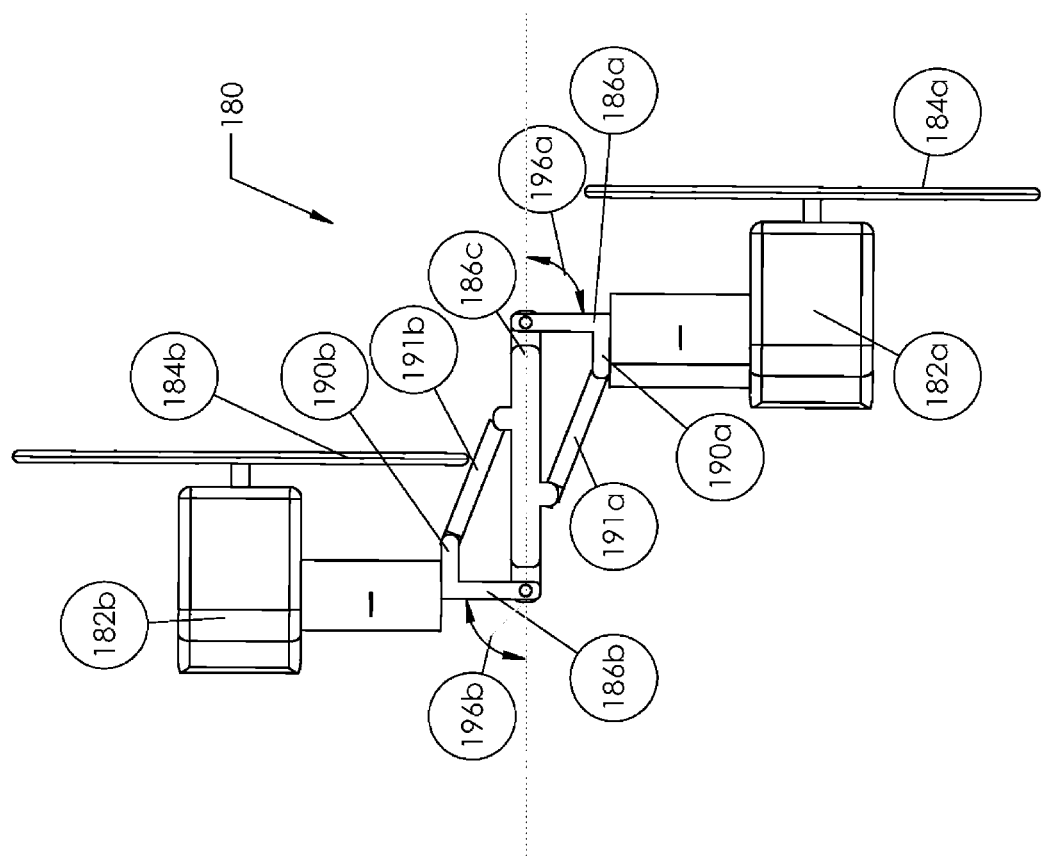

FIGS. 13A and 13B depict a propeller support 180 where the forward and rearward support sections 186*a*, 186*b* each have an individual actuator 191*a*, 191*b*, which in the particular embodiment depicted are hydraulic arms which are secured at one end to the central support section 186*c* and at the other end to a lever arm 190*a*, 190*b*. The actuators 191*a*, 191*b* drive the respective support sections 186*a*, 186*b* to angles 190*a*, 190*b* from the plane of the central support section 186*c*, with corresponding movement of the propellers and their angles of attack. Note that the individual actuators 191*a*, 191*b* could rotate the respective support sections 186*a*, 186*b* to identical angles from the plane of the central support section 186*c*, such as the approximately 90 degree angles 196*a*, 196*b* depicted in FIG. 13B. The individual actuators 191*a*, 191*b* could be used to rotate the respective support sections 186*a*, 186*b* to different angles from each other. For example, the rearward support section 186*a* could be rotated out of the plane of the central support section to a greater extent than the forward support section 186*b*, or vise-versa. For example, the rearward support section could be rotated upward by about 30 degrees or more while leaving the forward support section 186*b* in the aligned position (i.e., about 0 degrees rotation) with respect to the plane of the central section 186*c*.

Figure 14A:
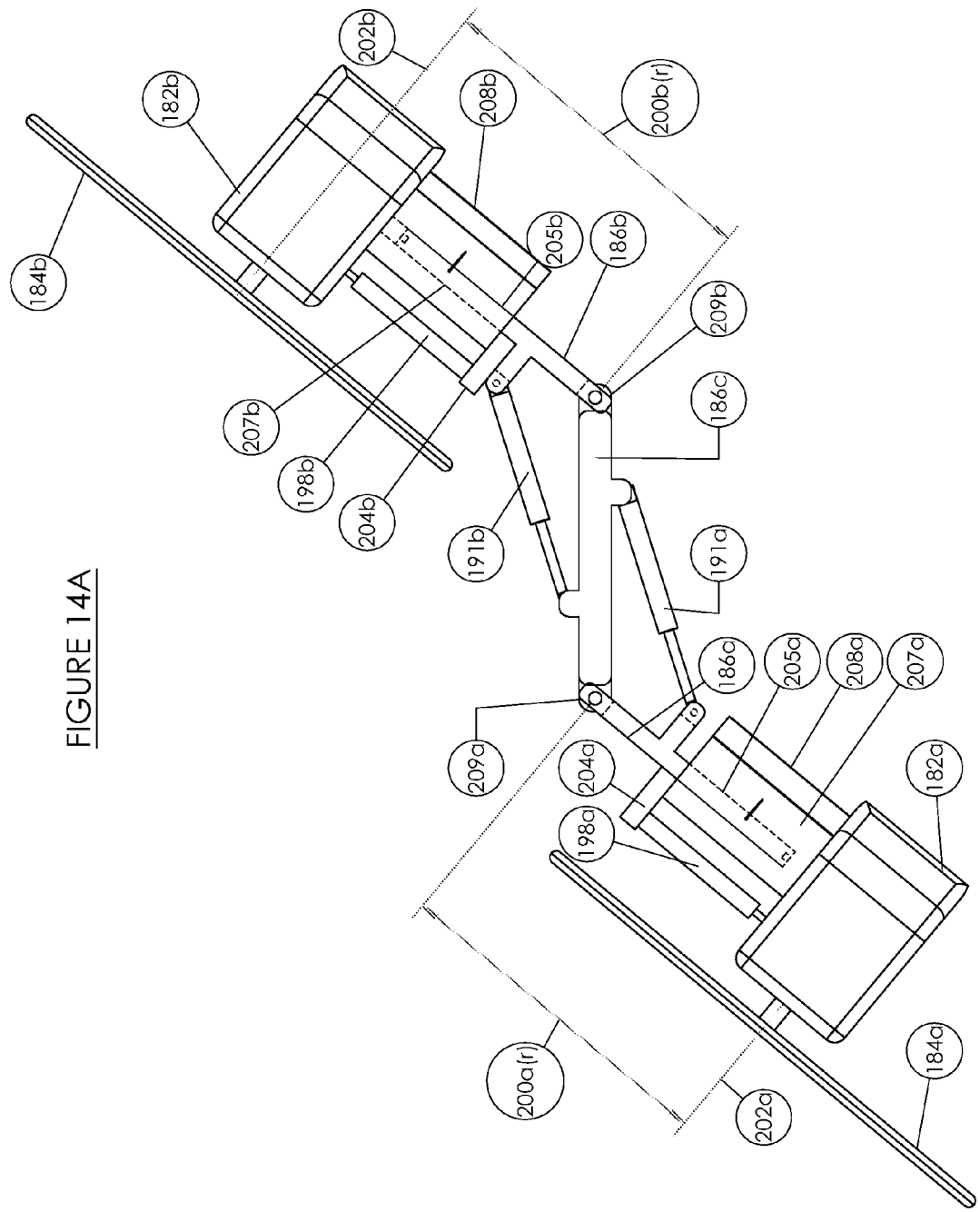
FIGS. 14A-14C are side, side, and perspective views of an engine support structure according to an embodiment of the invention.
Figure 14B:
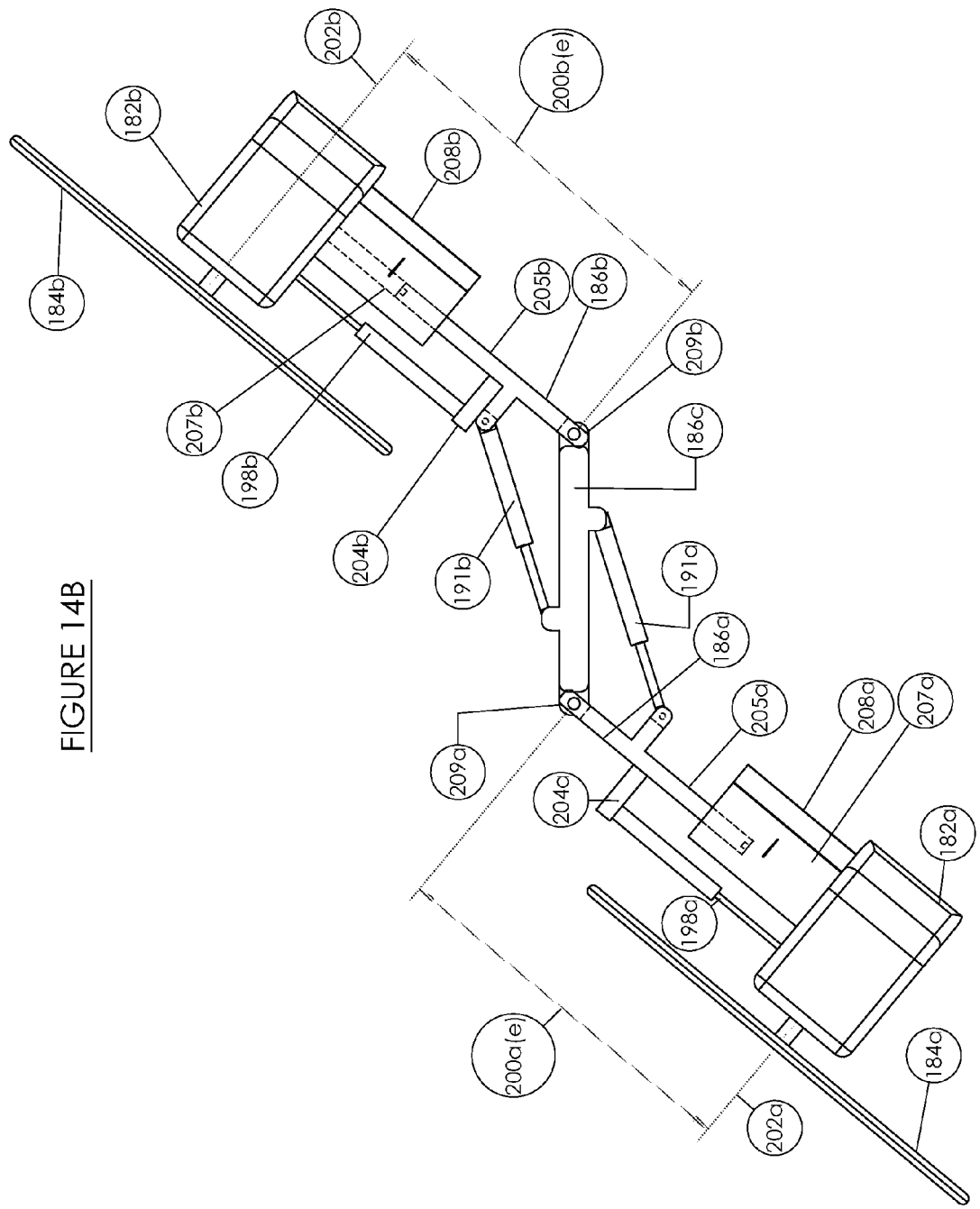
Figure 14C:
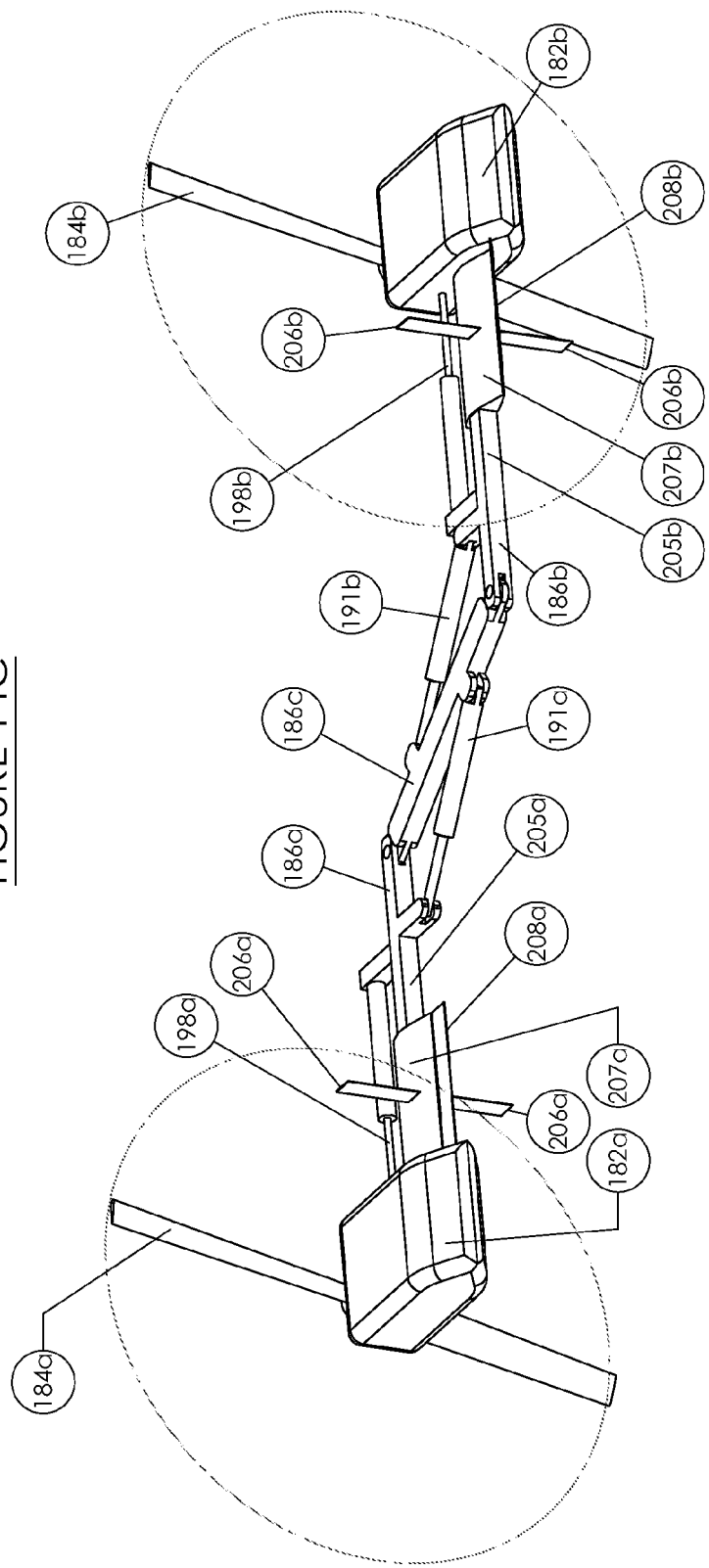

FIGS. 14A-14C depict a further embodiment of a propeller support 180 where the effective lengths 200*a*, 200*b* of individual support sections 186*a*, 186*b* can be varied. In the particular embodiment depicted, the length change is achieved using length-changing actuators 198*a*, 198*b* (which in the embodiment depicted are hydraulic devices, although other devices are within the scope of the invention). The length-changing actuators 198*a*, 198*b* are secured at one end to an engine 202*a*, 202*b*, and at the other end to a lever arm 204*a*, 204*b* secured to and/or part of the respective support section 186*a*, 186*b*. As the actuators 198*a*, 198*b* are extended from a retracted position (in FIG. 14A) to an extended position (depicted in FIGS. 14B and 14C), the engines 182*a*, 182*b* and propellers 184*a*, 184*b* (and also the assembly 207 holding the fins 206 and vanes 208 in the embodiment depicted) move distally while supported by a distal support rod assembly 205*a*, 205*b*, which is slidingly received within the assembly 207. The result is that the effective lengths 200*a*, 200*b* (i.e., the distance from the proximal end 209*a*, 209*b* of a support section 186*a*, 186*b* to the rotational axis 202*a*, 202*b* of its respective propeller 184*a*, 184*b*) are increased from an initial retracted length 200*a*(r), 200*b*(r) to an extended length 200*a* (e), 200*b*(e). This extension of the lengths 200*a*, 200*b* can place the propellers further away from aircraft structures (such as wings, fuselage, tail surfaces, etc.), which can have numerous advantages, such as reducing the amount of propeller wash striking aircraft surfaces and thereby improving aircraft effective drag and the thrust delivered from the particular propeller.

Figure 15B:
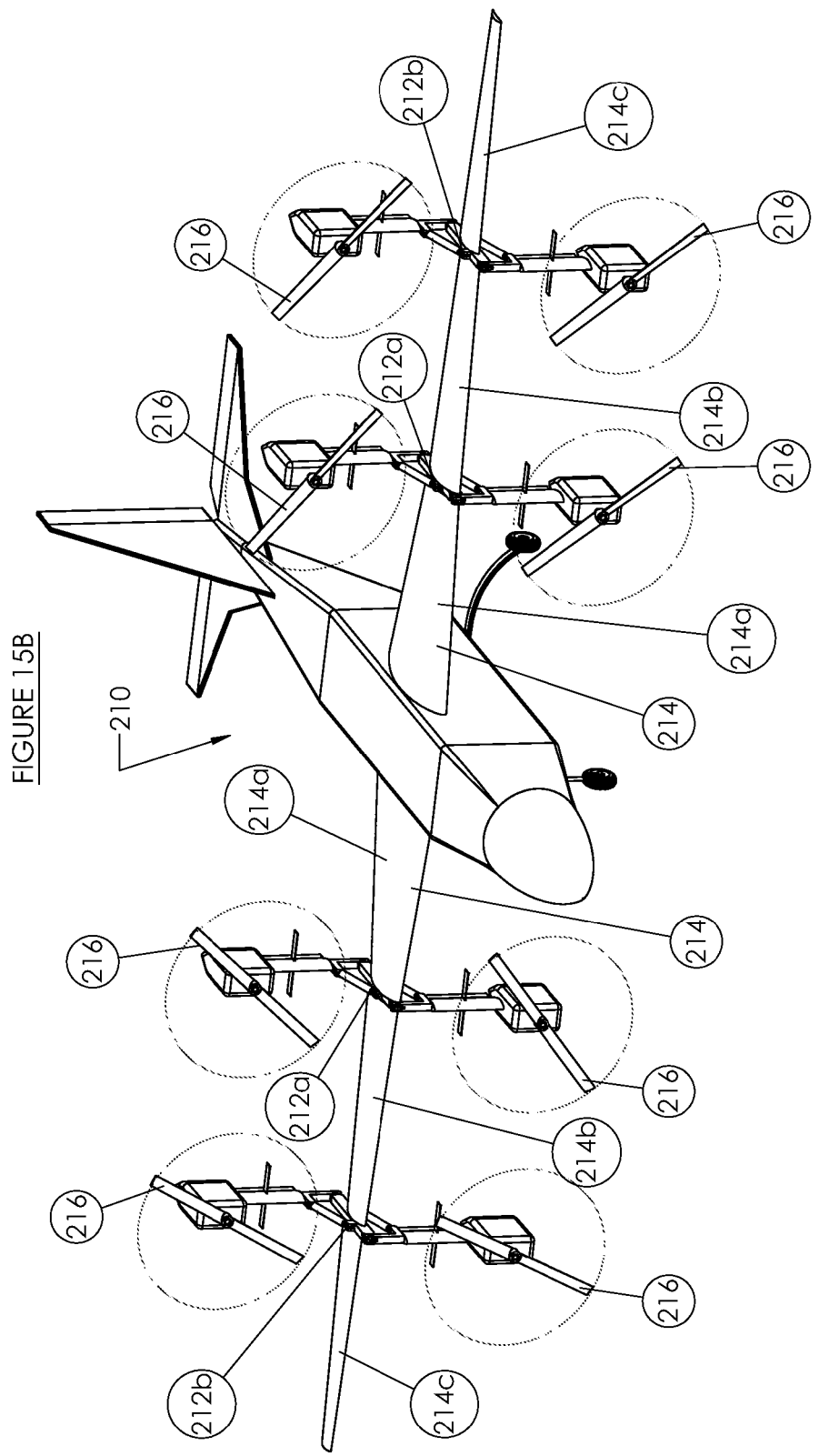

FIGS. 15A and 15B depict another aircraft 210 according to the invention. The aircraft 210 includes multiple propeller support assemblies 212*a*, 212*b* extending along the length of each wing 214. Each propeller support assembly 212*a*, 212*b* is similar to those depicted previously in FIGS. 12A-14C, although other propeller support assemblies disclosed in this application are also applicable. In the particular embodiment depicted, each wing 214 has three sections: a first (inner) wing section 214*a*, a second (central) wing section 214*b*, and a third (outer) wing section 214*c*. A first propeller support assembly 212*a* is positioned between the first wing section 214*a* and second wing section 214*b*, and a second propeller support assembly 212*b* is positioned between the third wing section 214*b* and the third wing section 214*c*. FIG. 14A depicts the aircraft 210 with the propeller support assemblies 212*a*, 212*b* in a position for horizontal take-off/landing or very short take-off/landing, where the propellers 216 defining rotational planes which are substantially parallel to the wings 214. FIG. 14B depicts the aircraft 210 with the propeller support assemblies 212*a*, 212*b* rotated for forward flight, where the propellers 216 are rotated forward. This embodiment may be of particular use for aircraft configured for long duration flights, such as aircraft having relatively long and narrow wings, e.g., wings with relatively large spans and relatively small chord lengths, aka wings with relatively high aspect ratios. If longer durations are required, the overall wing length can be further increased by configuring an aircraft with additional wing sections and propeller support assemblies.

FIGS. 16A-16D depict propeller supports 222 having the additional ability to fold sections thereof inwardly against the wing 224 for improved stowability of the aircraft 220 for transportation, etc. The engines 226 and propellers 228 can thus be folded inwardly against the wing 224. Optionally, the wing 224 can then be rotated to align with the fuselage 230 for improved stowage. The aircraft 220 in the embodiment depicted includes a tail assembly 232 with vertical stabilizer 234 and horizontal stabilizers 236. The wing 224 has a wingspan 238, and includes a leading edge 240, trailing edge 242, and aileron 244. The fuselage 230 has an overall length 246, with a nose 248 at the front end and the tail assembly 232 at the back end.

Figure 16A:
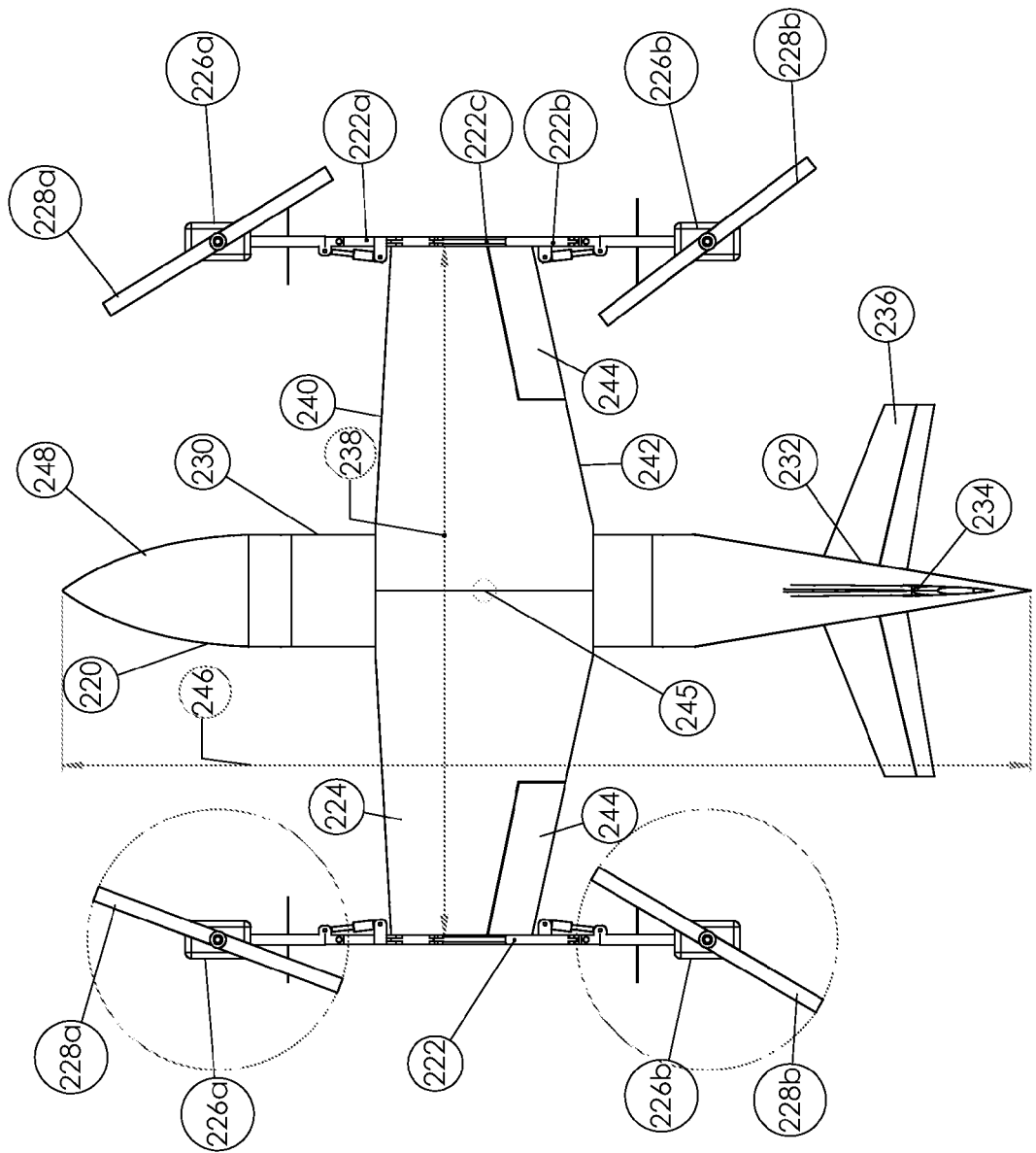

FIG. 16A is a top view of the aircraft 220, with the front propeller support sections 222*a* and rear propeller support sections 222*b* in their extended (aka flight) positions, with the engines 226*a*, 226*b* and propellers 228*a*, 228*b* extended away from the wing 224. In the particular configuration depicted, the engines 226*a*, 226*b* and propellers 228*a*, 228*b* are also positioned for vertical take-off. FIG. 16B depicts a close-up view of the propeller support 222 assembly, including the mechanisms to accomplish the inward folding. The propeller support 222 has a forward support section 222a (depicted in part), a rearward support section 222b, and a central support section 222c. As was depicted in FIGS. 13A-13B, the rearward support section 222b can be rotated (e.g., from vertical take-off/landing position to forward flight position) upward, such as by using a rotational actuator 250a (e.g., hydraulic piston) and hinge 252a assembly. A similar actuator (not shown) or other mechanism (such as an electric motor, or hinged linkage bar/arm assembly like that depicted in FIGS. 12A-12B) may be included to rotate the forward support section 222a downward. The rearward support section 222b consists of a distal portion 254b (which includes the fins 256 and vanes 258 and is secured to the engine 226b and propeller 228b) and a proximal portion 256b (which is secured to the central support section 222c via hinge 252b). The distal and proximal portions 254b, 256b are rotatably secured to each other, such as via a hinge 258b, in order to permit the distal portion 254b to rotate inwardly against the wing 224. The inward rotation of the distal portion 254b may be controlled via an actuator 260b, such as a hydraulic assembly as depicted or other rotational control mechanism (e.g., electric motor, mechanical locks, etc.). In the embodiment depicted, the actuator 260b is secured at one end to a pivot point 262b on the distal portion 254b, and at the other to a pivot point 264b on the proximal portion 256b of the rearward propeller support 222b.

Figure 16D:
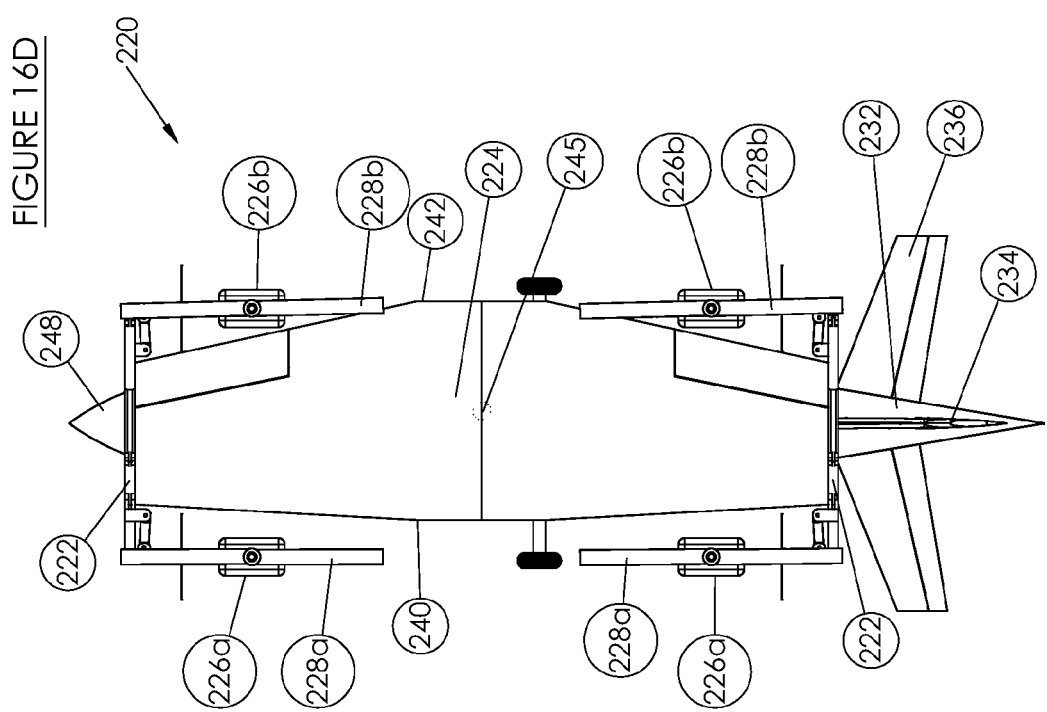

FIG. 16C depicts the aircraft 220 with the propeller support sections 222a, 222b folded at their respective hinges 258a, 258b by an angle of about 90 degrees so that the engines 226a, 226b and propellers 228a, 228b are positioned adjacent the wing 224. For further stowage, the wing 224 itself can be rotated about a rotation point 245 with respect to the fuselage 230, which may include rotating the wing 224 until it is in alignment lengthwise with the fuselage 230, as depicted in FIG. 16D.

Figure 17A:
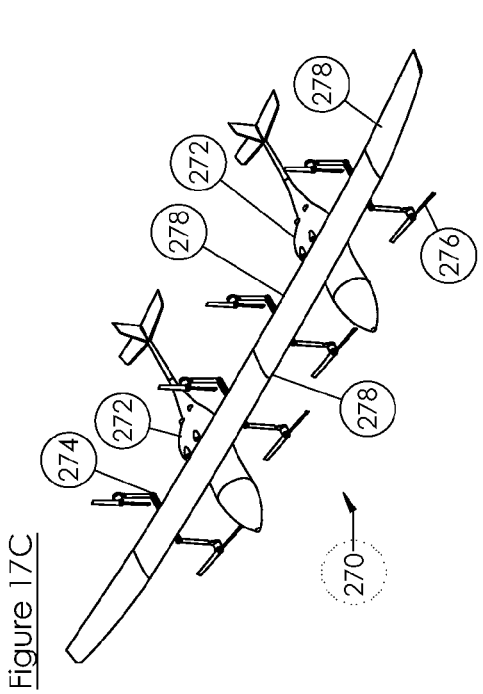
FIGS. 17A-17D are perspective views of aircraft according to embodiments of the invention.
Figure 17C:
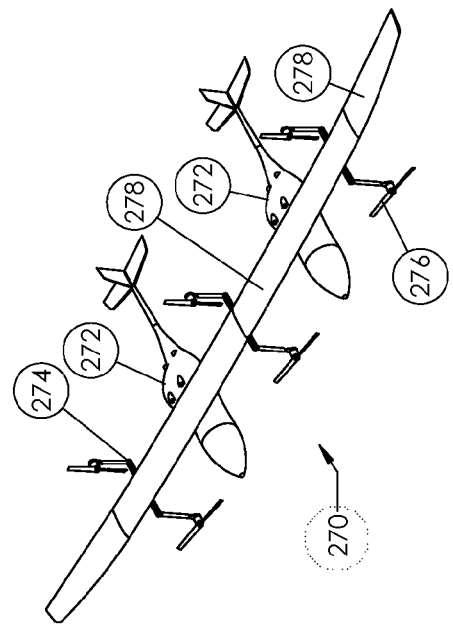
Figure 17B:
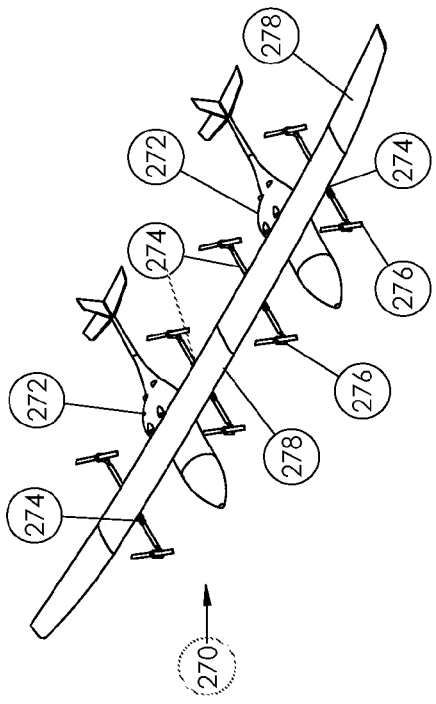
Figure 17D:
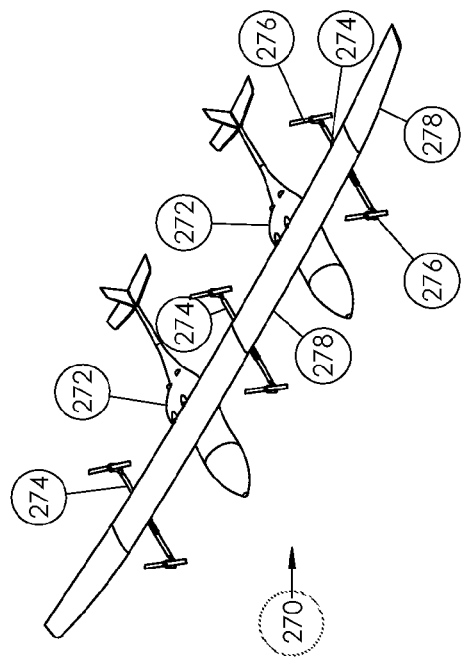

FIGS. 17A-17D depict variations of aircraft 270 having multiple fuselages 272, with multiple propeller supports 274 and propellers 276 along the wing 278. In FIG. 17A, two fuselages 272 are positioned on the wing 278 with four propeller supports 274, with two of the propeller supports 274 positioned between the fuselages 272 on a center portion of the wing 278. In FIG. 17B, just one propeller support 274 is positioned between the fuselages 272. FIGS. 17A and 17B depict the aircraft with the propellers 276 in position for vertical or very-short takeoff/landing, while FIGS. 17C and 17D depict the aircraft 270 with the propeller supports 274 rotated to position the propellers 276 for forward flight.

Figure 18A:
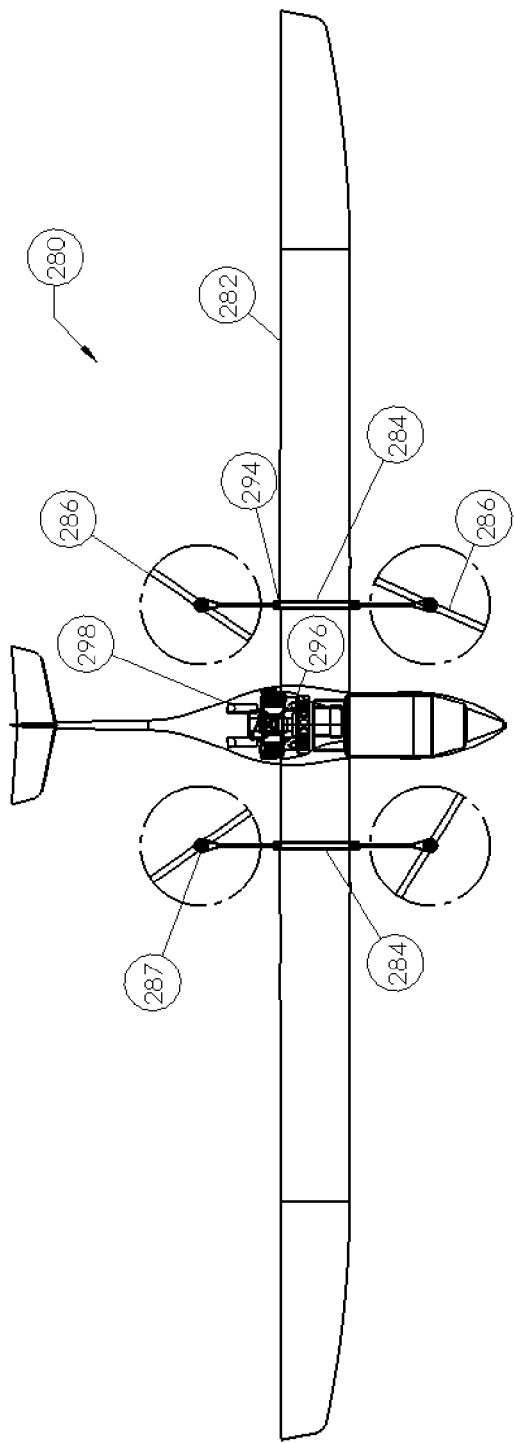
FIGS. 18A and 18B are top and side views, in partial cross-section, of an aircraft according to an embodiment of the invention.
Figure 18B:
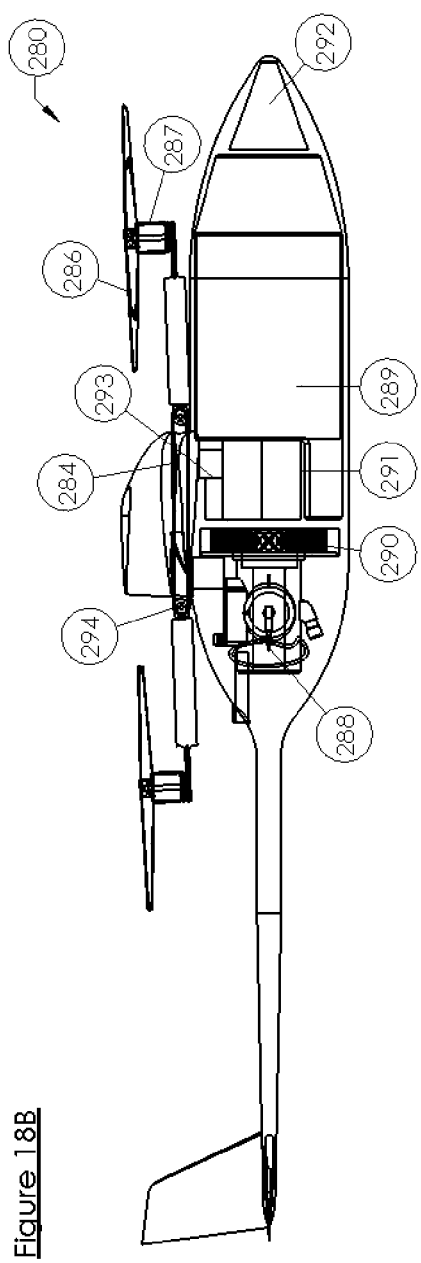

FIGS. 18A and 18B depict an aircraft 280 according to the invention having a hybrid drive system. The aircraft 280 has a wing 282 with two propeller supports 284, with each propeller support 284 supporting two propellers 286. Each propeller 286 is driven by a dedicated electric motor 287. An engine 288 (which can be a combustion engine such as a turbine engine, rotary, reciprocating, etc.) draws fuel from a fuel tank 289, and drives a generator 290 which produces electricity which is provided (e.g., via wires, rectifiers, etc.) to the electric motors 287. The electricity from the generator 290 charges batteries 291 and may also be used to power the aircraft electronics such as sensors 292 and one or more computers 293, etc. Positioning of the propellers 286 is accomplished by activating electric actuators 294 which reconfigure the propeller supports 284 to raise and/or lower the electric motors 287 and propellers 286 from vertical take-off position (depicted in FIGS. 18A and 18B) to forward flight positions where the propellers face forward. Air intakes 296 are provided for cooling and/or air for the combustion process, with exhaust vented via exhaust ducts 298.

In operation, the aircraft 280 can take off vertically, with the propellers 286 positioned as depicted in FIGS. 18A-18B, with the electric motors 287 using electricity provided by both the generator 290 (actively powered by the engine 288) as well as from the batteries 291. Once the aircraft 280 is in forward flight with the propellers 286 tilted forward, power requirements are typically substantially reduced and the generator 290 (without the use of batteries) may power all of the electric motors 287 while simultaneously recharging the batteries 291. When the aircraft 280 lands vertically, power will once again be drawn from the generator 290 as well as the batteries 291. While on the ground, the aircraft 280 can be hooked into an external (e.g., ground-based) electrical power supply to recharge the batteries 291, and/or the generator 290 and engine 288 can be run on the ground to charge the batteries 291. When it is desired to start the engine 288, the batteries 291 or ground power source can provide the electricity to initiate engine start.

Figure 19B:
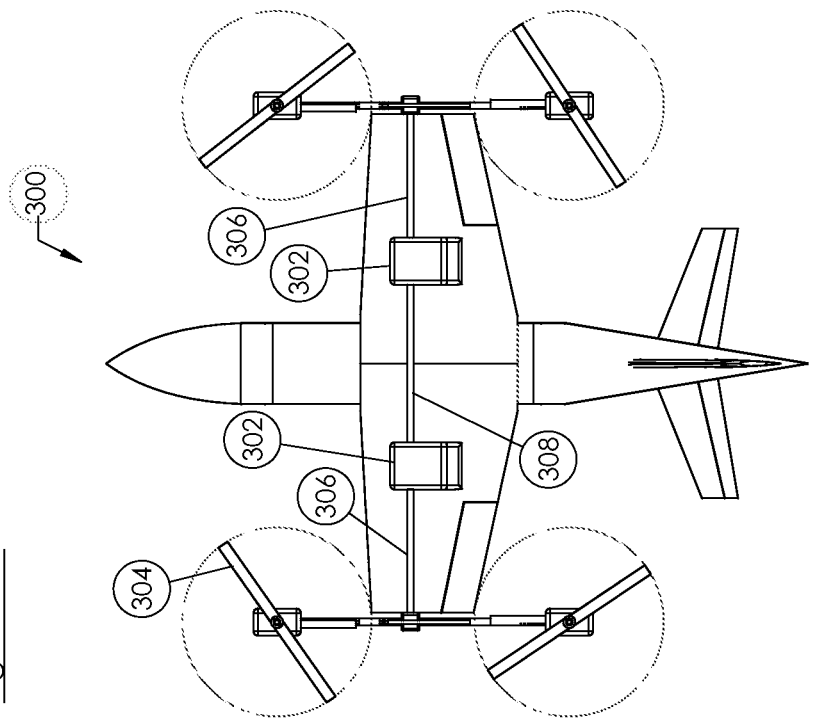
FIGS. 19A and 19B depict top views of aircraft according to embodiments of the invention.
Figure 19A:
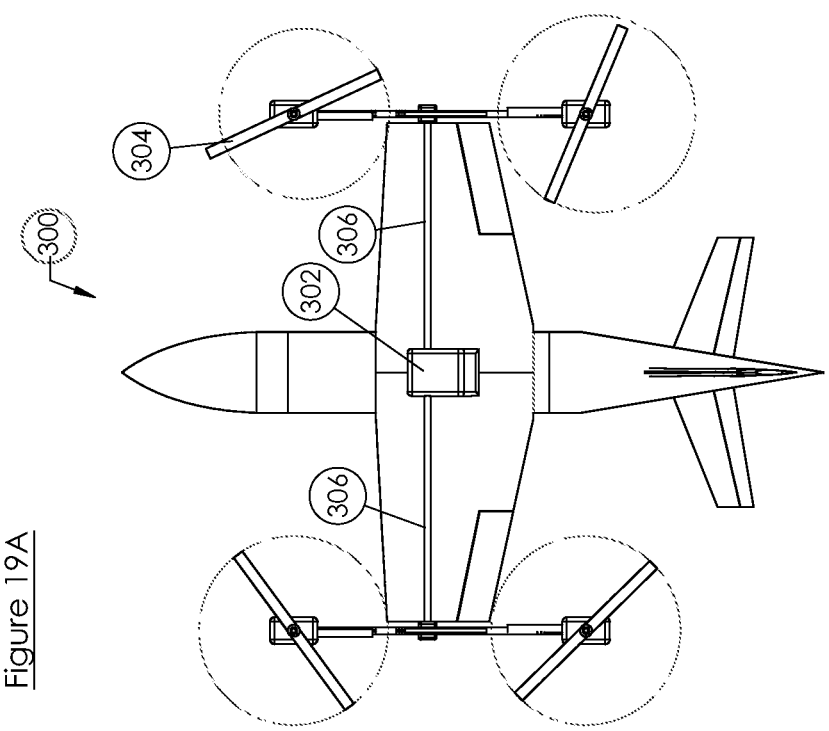

FIGS. 19A and 19B depict aircraft 300 according to the invention. In FIG. 19A, a single power source 302 (such as a single combustion engine, or single assembly of multiple engines) is used to drive all propellers 304 of the aircraft 300, with the power delivered via drive shafts 306 or other appropriate power delivery assemblies/methods (e.g., wires if the power source is a generator/batteries, etc.). In FIG. 19B, two power sources 302 are used to drive the propellers 304, with each power source 302 providing power to all propellers on one side of the aircraft 300. Power is again provided via drive shafts 306 or other appropriate power delivery assemblies/methods, with the option of including a cross-linking device 308 such as a cross shaft which can provide power between the two power sources 302 and/or between the opposite sides of the aircraft. Such a cross-linking device could be desirable for sharing power between the two sides of the airplane, such as in the case of the failure of one of the power sources, in which the cross-linking device could be used to provide power from the remaining operational power source to all propellers.

FIGS. 20A-20G depict aircraft 310 according to the invention in which the wings 312, with propellers 314 and propeller supports 316 secured thereto, are rotated with respect to the fuselage 318 to transition from vertical to forward flight, etc. In FIGS. 20A-20B, the aircraft 310 is configured for vertical takeoff/landing, with the propellers positioned facing upward and with the wings 312 positioned generally perpendicularly to the fuselage 318. In FIG. 20C, the aircraft 310 is transitioning between vertical and forward flight, with the wings 312 and propellers 314 angling forward. In FIGS. 20D and 20E, the aircraft 310 is in forward flight configuration, with the wings 312 generally aligned with the fuselage and the propellers 314 directed forward. FIGS. 20F and 20G depict a further embodiment, where the lower propellers 314a are positioned further out along the wings 312 from the fuselage than the upper propellers. This outward positioning can place the lower propellers so that their airflow is further away from the fuselage 318 and horizontal stabilizers 319 for a "main wing high" configuration such as that depicted in FIGS. 20F and 20G. For an aircraft with a tail with the horizontal stabilizers mounted high (i.e., a so-called T-Tail), the upper propellers could be the ones that are positioned further out along the wing than the lower propellers.

Figure 21A:
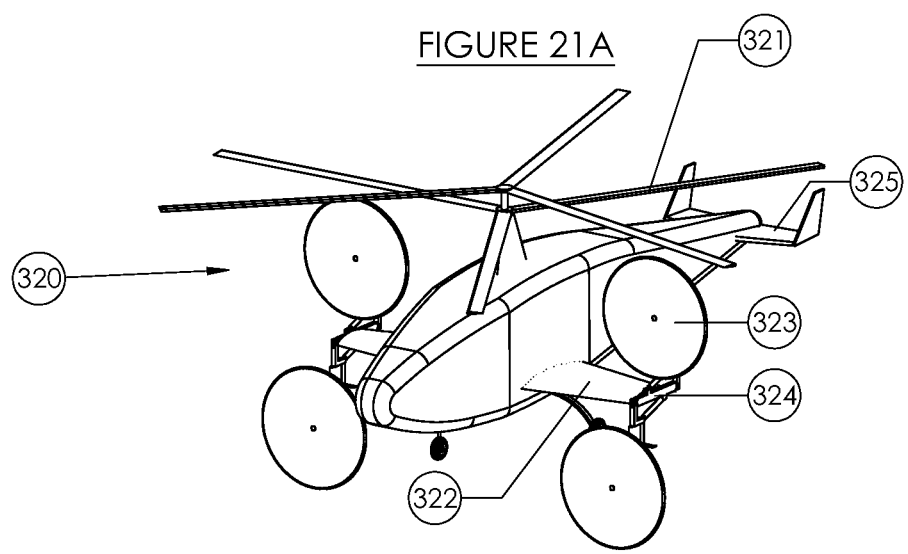
FIGS. 21A and 21B depict front perspective views of aircraft according to embodiments of the invention.

FIG. 21A depicts an aircraft 320 where helicopter blades 321 (or autorotating gyro blades) are provided in lieu of, or in addition to, wings 322 for vertical lift. In the particular embodiment depicted, the two sets of helicopter blades 321 are counter-rotating, although other blade assemblies are also within the scope of the invention. Four propellers 323 are provided on propeller supports 324. For vertical takeoff, the propellers 323 may positioned in the upward-facing position so that their thrust adds to the lift provided by the helicopter blades 321. For forward flight, the propellers 323 are repositioned to a forward facing configuration, such as that depicted in FIG. 21A, such that the helicopter blades 321 provide most of the lift while the propellers 323 provide forward thrust. The rear of the aircraft 320 includes a tail structure 325, which may include ducted fans and/or other control and/or propulsion systems.

FIG. 21A depicts an aircraft 326 in a so-called flying wing configuration, where the aircraft wing 327 defines the aircraft body. Propeller supports 328 extend from the aircraft 326 to support propellers 329. The aircraft wing may house ducted fans or turbine engines to provide additional thrust and/or lift for VTOL or forward flight.

Figure 23A:
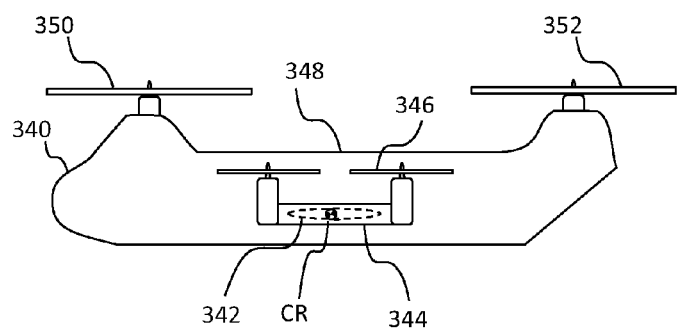
FIGS. 23A-23F depict side, front, top, side, side, and front views of a helicopter in takeoff, transition, and forward flight modes according to an embodiment of the invention.
Figure 23B:
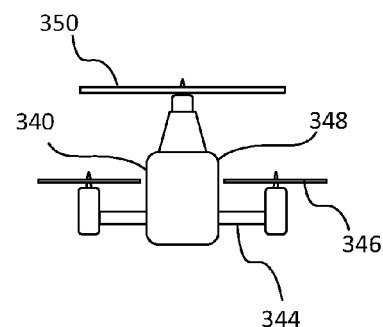
Figure 23D:
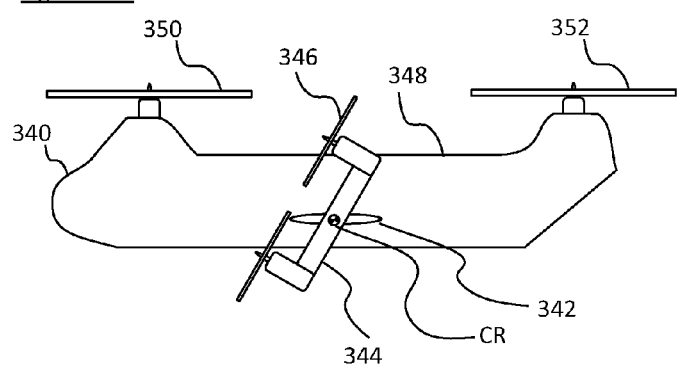
Figure 23C:
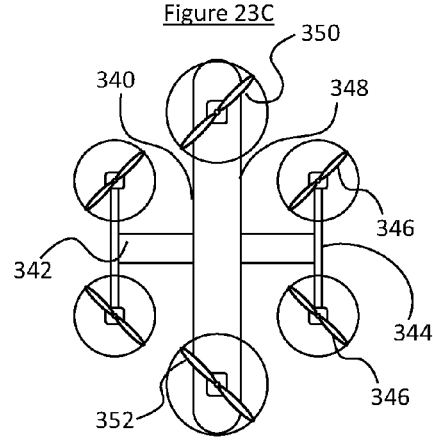
Figure 23E:
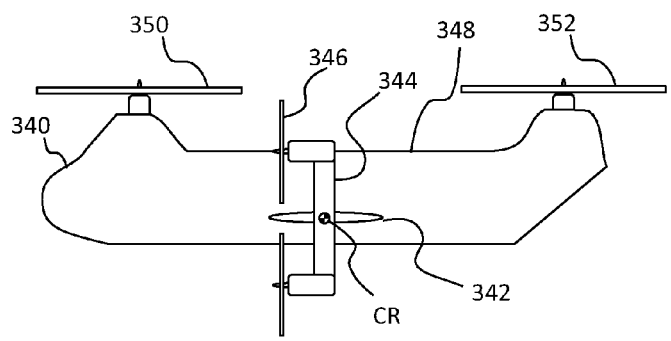
Figure 23F:
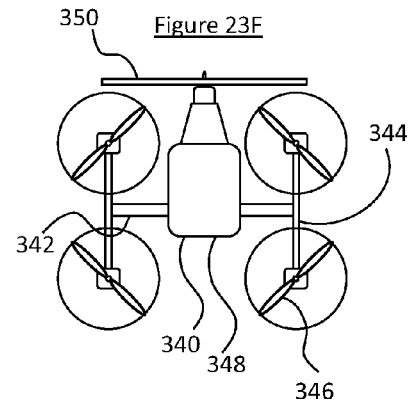

Other aircraft according to the invention are depicted in FIGS. 22A-22E and 23A-23F. FIGS. 22A-22E depict an airship 330 having wings 332 on which the propeller supports 334 and propellers 336 are positioned. The wings 332 can rotate with respect to the airship body 338 about a rotational point CR. Note that this rotation of the wings could be used with the other aircraft herein, and is not limited to the airship embodiment. Note that with the airship (as with the other aircraft herein) the wings could be fixed, with propeller repositioning achieved by rotating the propeller supports with respect to the wings, etc., as discussed in other embodiments herein. FIGS. 23A-23F depict an helicopter 340 having relatively short wing-like extensions 342 on which the propeller supports 344 and propellers 346 are positioned. The propeller supports 346 can rotate with respect to the helicopter body 348 and extensions 342 about a rotational point CR. The helicopter 340 depicted includes a front helicopter blade assembly 350 and a rear helicopter blade assembly 350, which may be counter-rotating. In the particular embodiment depicted, the front and rear helicopter blade assemblies are sufficiently short in length to prevent the blades of the front assembly 350 from contacting those of the rear assembly 352. If the blades were longer, the front and rear assemblies could be configured to mesh in an egg-beater like fashion in order to prevent blade collisions. In the particular embodiment depicted, the propellers 346 when in the fully forward position (as depicted in FIGS. 23E-23F) are positioned aft of, and below, the rotational arc of the front blade assembly, and are also away from the rotational arc of the rear blade assembly. Additionally, when in the vertical take-off position, the propellers 346 are positioned away from the downwash of the blade assemblies 350, 352 (seen most clearly in FIG. 23C) so that the thrust from the blade assemblies 350, 352 is not blocked by the propellers 346, and so the propellers 346 are providing thrust to clear air.

Figure 24A:
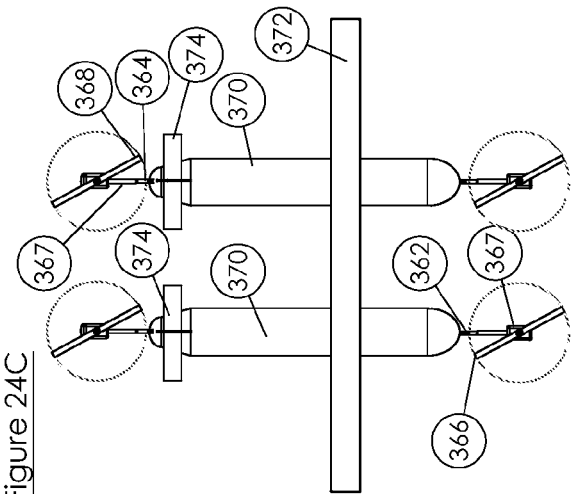
FIGS. 24A and 24B are top and perspective views of an aircraft according to an embodiment of the invention.
Figure 24B:
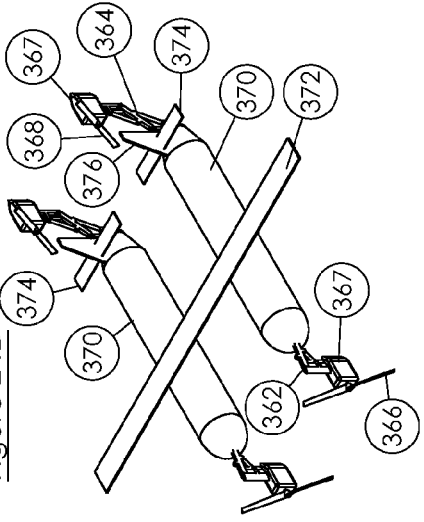
Figure 24C:
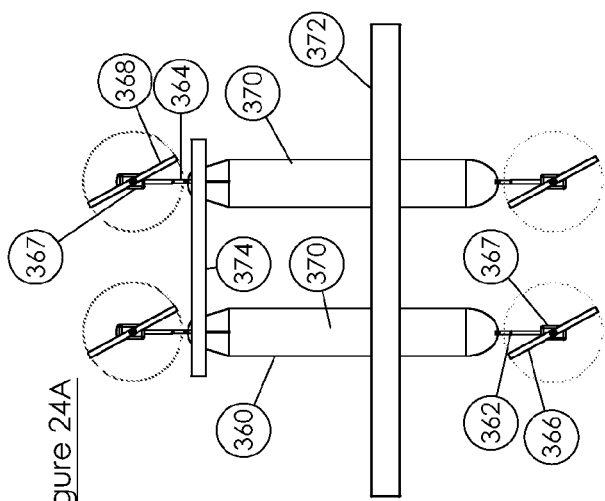
FIGS. 24C and 24D are top and perspective views of an aircraft according to an embodiment of the invention.
Figure 24D:
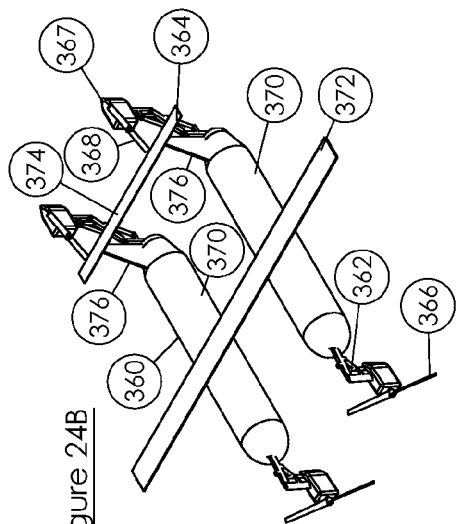

FIGS. 24A-24D depict aircraft 360 according to the invention, wherein propeller supports 362, 364 are used to hold propellers 366, 368 (and may also hold their associated engines 367) away from the fuselage and other parts of the aircraft 360. The aircraft 360 have two fuselages 370 joined by a common wing 372. In the embodiment of FIGS. 24A-24B, the fuselages 370 share a common tail structure wherein a single horizontal stabilizer 374 extends across the aircraft. In the particular embodiment depicted in FIGS. 24A-24B, the horizontal stabilizer 374 is in a "T-Tail" configuration, wherein the horizontal stabilizer 374 is positioned at the top of the vertical stabilizers 376. FIGS. 24C-24D depict a different tail configuration, with each fuselage 370 having its own separate tail structure with separate horizontal stabilizers 374. Note that FIGS. 24A and 24C are depicted in vertical takeoff/landing configuration with propellers facing upward, while FIGS. 24B and 24D are in the forward flight configuration with propeller facing forward.

Figure 25G:
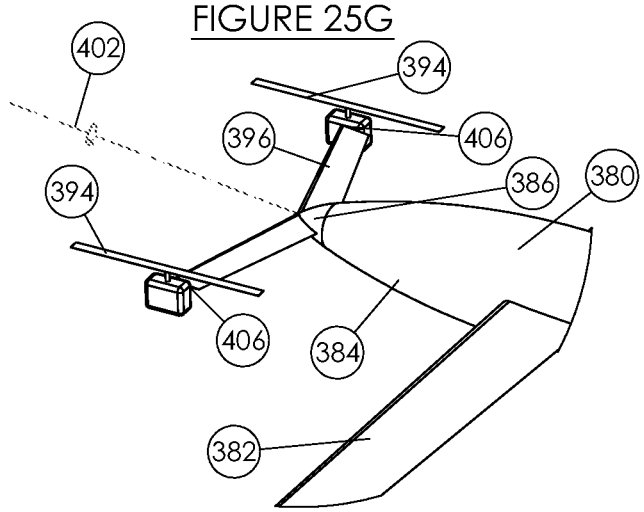
FIGS. 25G-25H are perspective closeup views of the aircraft of FIG. 25A.

FIGS. 25A-25H depict an aircraft 380 according to the invention where multiple propellers are positioned at various places. The aircraft 380 includes wings 382 and a fuselage 384, with a nose 386 and tail 388. Propellers 390 extend from the wings 382 on propeller supports 392 using methods and assemblies (e.g., engines, hinges, actuators, etc.) discussed elsewhere in the application. The aircraft 38 also includes two front propellers 394 extending from the nose 386 on front propeller supports 396, as well as two rear propellers 398 extending from the tail 388 on rear propeller supports 400. As depicted in FIGS. 25A-25C, when in the vertical/short takeoff/landing configuration, all propellers 390, 394, 398 are facing upward to provide upward thrust to the aircraft 380. Note that, as depicted most clearly in FIG. 25A, in vertical takeoff mode no propellers overlap any other propellers with respect to the incoming airflow, so that each propeller is be advanced primarily through "clear" air, i.e., air that has not yet been driven through a propeller.

When transitioned to forward flight, as depicted in FIGS. 25D-25F, all propellers 390, 394, 398 are facing forward. Note that, as depicted most clearly in FIG. 25F, in forward flight no propellers overlap any other propellers with respect to the incoming airflow, so that each propeller is be advanced primarily through "clear" air, i.e., air that has not yet been driven through a propeller.

Figure 25H:
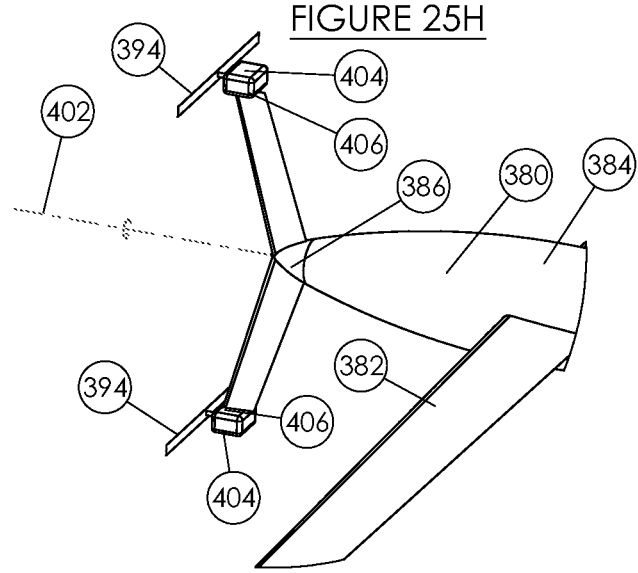

FIGS. 25G and 25H depict close-up views of the aircraft nose 386, including the front propeller supports 396 and front propellers 394. As depicted in FIG. 25G, when in the vertical/short takeoff and landing configuration the propellers 394 face upwards and the propeller supports 396 are substantially horizontal (which is also generally parallel to the aircraft wings 382). To transition to forward flight configuration (depicted in FIG. 25H), the entire front propeller support assembly is rotated by 90 degrees with respect to the fuselage 384 and wings 382 about a rotational axis 402 passing generally parallel to the length of the fuselage 384. This rotation brings the front propellers 394 away from the wings 382 with respect to oncoming airflow, and also out of alignment (with respect to the oncoming air flow) with the rear propellers (seen most clearly in FIG. 25F). Also, each individual propeller 394 (and in the particular embodiment shown, the associated engines 404) are rotated forward about a rotation point 406 with respect to the front propeller support 396.

For the rear propellers 398, the propeller supports 400 do not need to be rotated about the longitudinal axis 402, and instead only the forward tilting of the rear propellers 398 is necessary. Note that in a further embodiment (not shown) the front propeller support could be held still about the rotational axis (i.e., remain unrotated), and instead the rear propeller support assembly could be rotated about the longitudinal axis 402.

Figure 21B:
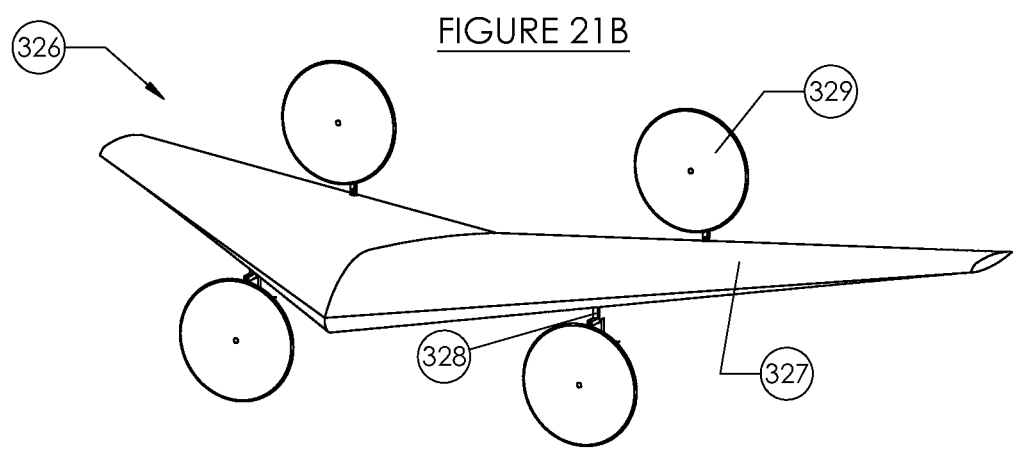
Figure 22A:
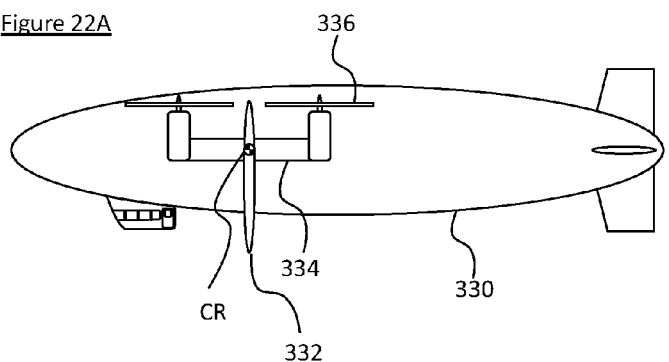
FIGS. 22A-22E depict side, front, side, side, and front views of an airship in takeoff, transition, and forward flight modes according to an embodiment of the invention.
Figure 22B:
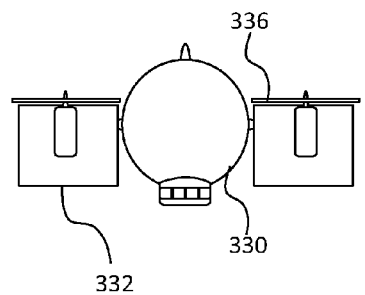
Figure 22C:
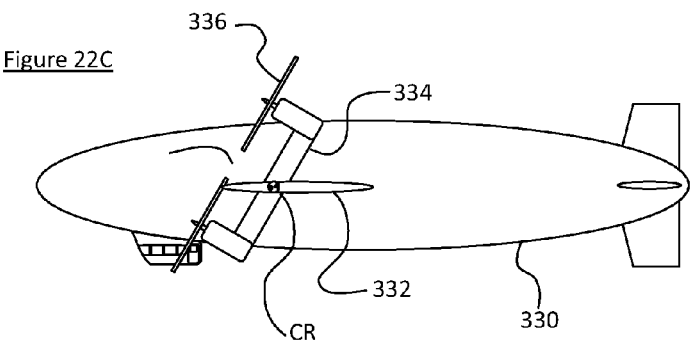
Figure 22D:
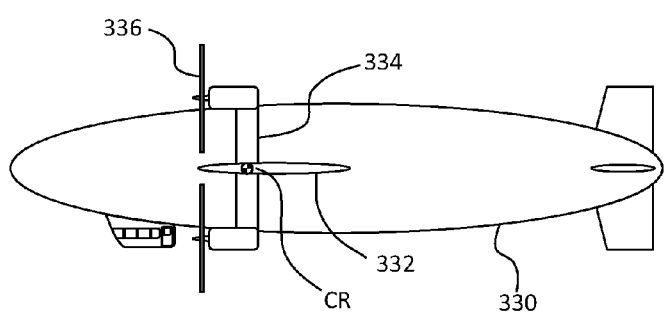
Figure 22E:
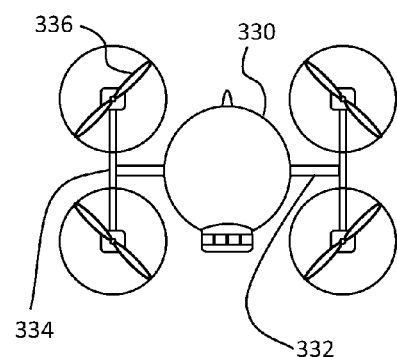

FIGS. 26A-26C depict an aircraft 410 according to the invention using vertical thrust elements (e.g., fans 412) positioned within the wing 414 which can be exposed via a movable cover 416. As depicted in FIG. 26B (and also in the left side of the wing of FIG. 26A), for vertical/short take-off and landing mode the cover 416 is distally advanced from the tip of the wing 414 in order to reveal the fan 412. Once the aircraft 410 is airborne and in forward flight, the fan 412 can be shut off and the cover 416 can be retracted back over the fan 412, as depicted in FIG. 26C and also in the right-hand side of the wing in FIG. 26A. Vertical thrust elements may be included elsewhere in the aircraft, such as the rear fan 418 in the tail structure 420, and that retractable covers for thrust elements (such as element 416 in the figures) may or may not be included. The vertical thrust elements positioned in a wing disclosed herein, with or without sliding covers, may be particularly useful for flying wing configurations such as that shown in FIG. 21B.

Figure 27:
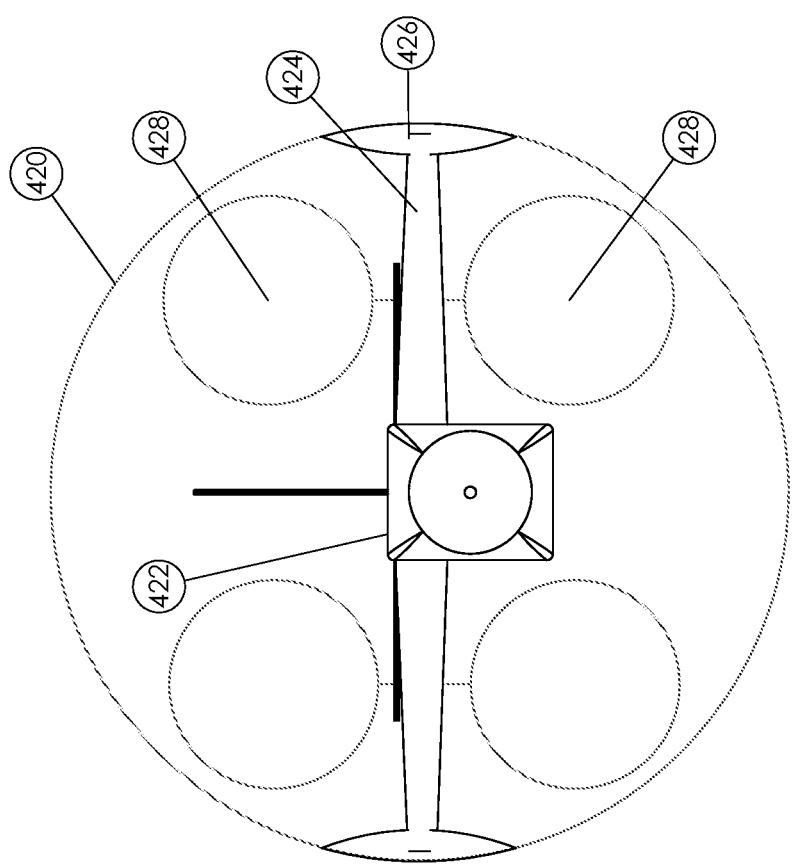
FIG. 27 is a front view of an aircraft in a launch tube according to an embodiment of the invention.

FIG. 27 depicts a launch tube 420 for use with an aircraft 422 according to the invention. The wings 424 terminate at sliders 426, which may be part of the wings 424 or may be configured to drop away when the aircraft is out of the tube 420. To launch the aircraft 422, the propellers 428 can be powered up to provide thrust, with the propeller thrust used to drive the aircraft 422 out of the tube 420. The tube 420 may include other launch drivers, such as providing an electromagnetic rail (not shown) which is used to accelerate the sliders 426 to drive the aircraft 422 out of the tube 420. Such additional launch drivers may be used in lieu of, or in addition to, the thrust from the aircraft propellers.

The propellers of the embodiments herein may include two, three, four, or more blades, depending on the particular embodiment.

In the embodiments depicted, the landing gear is secured to the aircraft fuselage. However, landing supports can also be secured to other portions of the aircraft, such as the propeller supports and/or to the engine/propeller assemblies. For example, engine/propeller/support assemblies could include wheels, floats, etc. extending beneath them to provide increased stability in situations where an engine/propeller assembly might contact the ground, such as where the air vehicle is landing on uneven terrain and/or water. Such landing supports on the engine/propeller assemblies and/or supports could also facilitate movement of the engine/propeller assemblies and/or supports when detached from the air vehicle, such as where such assemblies are being replaced or repaired.

In the embodiments depicted, the propellers are powered by engines directly secured to the propellers. However, various engines and engine assemblies can be used with the invention. The engines can be mounted at the end of the supports along with propellers, as in the embodiments of FIGS. 1A-1D, or the engine or engines can be mounted elsewhere (such as in or on the main fuselage and/or wings and/or propeller supports) and connected to the propellers via a drive shaft assembly. Cross-shafting could be used to connect multiple engines and propellers. For example, left and right engines could be cross-shafted, as could front and back engines.

The specific engine type and power to be used depends on the particular application, including the air vehicle size, number and size of propellers, desired flight characteristics such as lift and speed, etc.

Although combustion-engine-drive unducted propellers have been depicted in the embodiments discussed above, alternate methods of propulsion are also within the scope of the invention. For example, ducted assemblies such as ducted fans, turbofans, jet engines, ramjet engines, etc., could be used in place of, in addition to, and/or in combination with, the unducted propellers depicted herein.

Alternate methods of power are also within the scope of the invention. For example, the propellers could be directly powered by electric motors, with electricity provided by batteries and/or solar cells. Electricity could also be provided by a conventional engine that consumes fuel (e.g., gas, diesel, jet fuel, hydrogen, etc.) and acts as a generator to provide electricity to the electric motors and/or batteries in a so-called "hybrid" arrangement. In a configuration using electric motors, during flight some of the propellers may not need to be powered and the power thereto can be disconnected. Moreover, these unpowered propellers may begin to autorotate, particularly when the vehicle is in forward flight. Such autorotation of a propeller or propellers could cause a corresponding turning of the corresponding electric motor(s), and this turning of the electric motor could be used to act as a generator, thereby generating electricity which could be fed into the batteries and/or into the other electric motors.

While propellers have been discussed herein, rotors could be used in some versions of such air vehicles, such as where the air vehicles are very large and the associated propellers (rotors) have long lengths.

Although the invention has been described in terms of particular embodiments and applications, one of ordinary skill in the art, in light of this teaching, can generate additional embodiments and modifications without departing from the spirit of or exceeding the scope of the claimed invention. For example, although the above devices and methods are described for use in a particular manner, the devices and methods described herein could be used in a variety of different methods of use. As a further example, it will be recognized that the embodiments described above and aspects thereof may be modified, via changes in propeller and/or engine numbers and placement, etc., to adapt a particular situation or device to the teachings of the invention without departing from the essential scope thereof. Accordingly, it is to be understood that the drawings and descriptions of specific embodiments herein are proffered by way of example to facilitate comprehension of the invention, and should not be construed to limit the scope thereof.

What is claimed is:

1. A flight vehicle, comprising:
a flight vehicle central portion having a top, bottom, and left and right sides, wherein the left side is opposite to the right side;
a left wing portion extending from the left side of the flight vehicle central portion, and a right wing portion extending from the right side of the flight vehicle central portion, wherein the left wing portion defines a left wing chord line and the right wing portion defines a right wing chord line;
a left propeller assembly comprising:
a front left propeller secured to a front left engine extending on a front left propeller support from the left wing, the front left propeller having
a front left propeller rotational axis, wherein the front left propeller comprises at least one propeller blade having a front left propeller blade radius extending from the front left propeller rotational axis to a front left propeller distal blade tip, wherein the front left propeller when rotated about its rotational axis defines a front left propeller rotational disk defined by the rotation of the front left propeller distal blade tip; and
a rear left propeller secured to a rear left engine extending on a rear left propeller support from the left wing, the rear left propeller having a rear left propeller rotational axis, wherein the rear left propeller comprises at least one propeller blade having a rear left propeller blade radius extending from the rear left propeller rotational axis to a rear left propeller distal blade tip, wherein the rear left propeller when rotated about its rotational axis defines a rear left propeller rotational disk defined by the rotation of the rear left propeller distal blade tip;
wherein the left propeller assembly has a left propeller assembly first configuration wherein the front left engine is positioned forward of the left wing with the front left propeller rotational disk substantially parallel to the left wing chord line and the rear left engine is positioned rearward of the left wing with the rear left propeller rotational disk substantially parallel to the left wing chord line, and a left propeller assembly second configuration wherein the front left engine and front left propeller rotational disk are positioned below the left wing chord line with the front left propeller rotational disk at an angle of about 90 degrees from the left wing chord line and the rear left engine and rear left propeller rotational disk are positioned above the left wing chord line with the rear left propeller rotational disk at an angle of about 90 degrees from the left wing chord line;

a right propeller assembly comprising:
  a front right propeller secured to a front right engine extending on a front right propeller support from the right wing, the front right propeller having a front right propeller rotational axis, wherein the front right propeller comprises at least one propeller blade having a front right propeller blade radius extending from the front right propeller rotational axis to a front right propeller distal blade tip, wherein the front right propeller when rotated about its rotational axis defines a front right propeller rotational disk defined by the rotation of the front right propeller distal blade tip; and
  a rear right propeller secured to a rear right engine extending on a rear right propeller support from the right wing, the rear right propeller having a rear right propeller rotational axis, wherein the rear right propeller comprises at least one propeller blade having a rear right propeller blade radius extending from the rear right propeller rotational axis to a rear right propeller distal blade tip, wherein the rear right propeller when rotated about its rotational axis defines a rear right propeller rotational disk defined by the rotation of the rear right propeller distal blade tip;
  wherein the right propeller assembly has a right propeller assembly first configuration wherein the front right engine is positioned forward of the right wing with the front right propeller rotational disk substantially parallel to the right wing chord line and the rear right engine is positioned rearward of the right wing with the rear right propeller rotational disk substantially parallel to the right wing chord line, and a right propeller assembly second configuration wherein the front right engine and front right propeller rotational disk are positioned below the right wing chord line with the front right propeller rotational disk at an angle of about 90 degrees from the right wing chord line and the rear right engine and rear right propeller rotational disk are positioned above the right wing chord line with the rear right propeller rotational disk at an angle of about 90 degrees from the right wing chord line;

a left propeller assembly rotational mechanism comprising a front left pivot point about which the front left propeller support can rotate up and down with respect to the left wing chord line and further comprising a rear left pivot point about which the rear left propeller support can rotate up and down with respect to the left wing chord line, wherein the rear left pivot point is displaced from the front left pivot point, wherein the left propeller assembly rotational mechanism is configured to selectively move the left propeller assembly from the left propeller assembly first configuration to the left propeller assembly second configuration and back to the left propeller assembly first configuration by rotating the front left propeller support about the front left pivot point and by rotating the rear left propeller support about the rear left pivot point;

a right propeller assembly rotational mechanism comprising a front right pivot point about which the front right propeller support can rotate UP and down with respect to the right wing chord line and further comprising a rear right pivot point about which the rear right propeller support can rotate up and down with respect to the right wing chord line, wherein the rear right pivot point is displaced from the front right pivot point, wherein the right propeller assembly rotational mechanism is configured to selectively move the right propeller assembly from the right propeller assembly first configuration to the right propeller assembly second configuration and back to the right propeller assembly first configuration by rotating the front right propeller support about the front right pivot point and by rotating the rear right propeller support about the rear right pivot point.

2. The flight vehicle of claim 1, wherein the left propeller assembly rotational mechanism and the right propeller assembly rotational mechanism each comprise a rigid linkage arm.

3. The flight vehicle of claim 1, wherein the left propeller assembly rotational mechanism and the right propeller assembly rotational mechanism each comprise a cable assembly.

4. The flight vehicle of claim 1, wherein the front left propeller blade radius is at least 70% of the length of the front left propeller support, the rear left propeller blade radius is at least 70% of the length of the rear left propeller support, the front right propeller blade radius is at least 70% of the length of the front right propeller support, and the rear right propeller blade radius is at least 70% of the length of the rear right propeller support.

5. A flight vehicle, comprising:
  a flight vehicle central portion having a top, bottom, and left and right sides, wherein the left side is opposite to the right side;
  a left wing portion extending from the left side of the flight vehicle central portion, and a right wing portion extending from the right side of the flight vehicle central portion, wherein the left wing portion defines a left wing chord line and the right wing portion defines a right wing chord line;
  a left propeller assembly comprising:
    a front left propeller secured to a front left engine extending on a front left propeller support from the left wing, the front left propeller having a front left propeller rotational axis, wherein the front left propeller comprises at least one propeller blade having a front left propeller blade radius extending from the front left propeller rotational axis to a front left propeller distal blade tip, wherein the front left propeller when rotated about its rotational axis defines a front left propeller rotational disk defined by the rotation of the front left propeller distal blade tip; and
    a rear left propeller secured to a rear left engine extending on a rear left propeller support from the left wing, the rear left propeller having a rear left propeller rotational axis, wherein the rear left propeller comprises at least one propeller blade having a rear left propeller blade radius extending from the rear left propeller rotational axis to a rear left propeller distal blade tip, wherein the rear left propeller when rotated about its rotational axis defines a rear left propeller rotational disk defined by the rotation of the rear left propeller distal blade tip:

wherein the left propeller assembly has a left propeller assembly first configuration wherein the front left engine is positioned forward of the left wing with the front left propeller rotational disk substantially parallel to the left wing chord line and the rear left engine is positioned rearward of the left wing with the rear left propeller rotational disk substantially parallel to the left wing chord line, and a left propeller assembly second configuration wherein the front left engine and front left propeller rotational disk are positioned below the left wing chord line with the front left propeller rotational disk at an angle of about 90 degrees from the left wing chord line and the rear left engine and rear left propeller rotational disk are positioned above the left wing chord line with the rear left propeller rotational disk at an angle of about 90 degrees from the left wing chord line;

a right propeller assembly comprising:

a front right propeller secured to a front right engine extending on a front right propeller support from the right wing, the front right propeller having a front right propeller rotational axis, wherein the front right propeller comprises at least one propeller blade having a front right propeller blade radius extending from the front right propeller rotational axis to a front right propeller distal blade tip, wherein the front right propeller when rotated about its rotational axis defines a front right propeller rotational disk defined by the rotation of the front right propeller distal blade tip; and a rear right propeller secured to a rear right engine extending on a rear right propeller support from the right wing, the rear right propeller having a rear right propeller rotational axis, wherein the rear right propeller comprises at least one propeller blade having a rear right propeller blade radius extending from the rear right propeller rotational axis to a rear right propeller distal blade tip, wherein the rear right propeller when rotated about its rotational axis defines a rear right propeller rotational disk defined by the rotation of the rear right propeller distal blade tip;

wherein the right propeller assembly has a right propeller assembly first configuration wherein the front right engine is positioned forward of the right wing with the front right propeller rotational disk substantially parallel to the right wing chord line and the rear right engine is positioned rearward of the right wing with the rear right propeller rotational disk substantially parallel to the right wing chord line, and a right propeller assembly second configuration wherein the front right engine and front right propeller rotational disk are positioned below the right wing chord line with the front right propeller rotational disk at an angle of about 90 degrees from the right wing chord line and the rear right engine and rear right propeller rotational disk are positioned above the right wing chord line with the rear right propeller rotational disk at an angle of about 90 degrees from the right wing chord line;

a left propeller assembly rotational mechanism configured to selectively move the left propeller assembly from the left propeller assembly first configuration to the left propeller assembly second configuration and back to the left propeller assembly first configuration;

a right propeller assembly rotational mechanism configured to selectively move the right propeller assembly from the right propeller assembly first configuration to the right propeller assembly second configuration and back to the right propeller assembly first configuration;

wherein the front left propeller support and rear left propeller support comprise forward and rearward portions of a single continuous left propeller support arm, and the front right propeller support and rear right propeller support comprise forward and rearward portions of a single continuous right propeller support arm.

6. The flight vehicle of claim 5, wherein the single continuous left propeller support arm is a left lifting body having at least one movable vane extending from a trailing edge thereof, and the single continuous right propeller support arm is a right lifting body having at least one movable vane extending from a trailing edge thereof.

7. The flight vehicle of claim 6, wherein the left lifting body has at least one fm extending from at least one side thereof, and the right lifting body has at least one fin extending from at least one side thereof.

8. The flight vehicle of claim 1, wherein the left wing and right wing are fixed wings.

9. The flight vehicle of claim 1, wherein in the left propeller assembly is secured to the left wing at a left wing distal end, and the right propeller assembly is secured to the right wing at a right wing distal end.

\* \* \* \* \*